(12) United States Patent
Wilson et al.

(10) Patent No.: US 11,346,851 B2
(45) Date of Patent: May 31, 2022

(54) SAMPLE SORTING SYSTEM AND METHODS OF SORTING SAMPLES

(71) Applicant: Laboratory Corporation of America Holdings, Burlington, NC (US)

(72) Inventors: David Wilson, Windsor, CT (US); Jay Krajewski, Windsor, CT (US); Kevin Meyer, Windsor, CT (US)

(*) Notice: Subject to any disclaimer, the term of this patent is extended or adjusted under 35 U.S.C. 154(b) by 306 days.

(21) Appl. No.: 16/263,942

(22) Filed: Jan. 31, 2019

(65) Prior Publication Data

US 2019/0234970 A1  Aug. 1, 2019

Related U.S. Application Data

(60) Provisional application No. 62/624,486, filed on Jan. 31, 2018, provisional application No. 62/624,419, (Continued)

(51) Int. Cl.
| | |
|---|---|
| *G01N 35/00* | (2006.01) |
| *G01N 35/04* | (2006.01) |
| *B01L 9/06* | (2006.01) |

(52) U.S. Cl.
CPC ............ *G01N 35/0092* (2013.01); *B01L 9/06* (2013.01); *G01N 35/00732* (2013.01); *G01N 35/04* (2013.01); *B01L 2300/021* (2013.01); *B01L 2300/0609* (2013.01); *B01L 2300/0861* (2013.01); *B01L 2300/0864* (2013.01); *G01N 2035/0096* (2013.01); *G01N 2035/00752* (2013.01); *G01N 2035/0406* (2013.01); (Continued)

(58) Field of Classification Search
CPC ......... G01N 35/0092; G01N 35/00732; G01N 35/04; G01N 2035/0472; G01N 2035/047; G01N 2035/0465; G01N 2035/0096; G01N 2035/0484; G01N 2035/0406; G01N 2035/00752; B01L 9/06; B01L 2300/0864; B01L 2300/0861; B01L 2300/021; B01L 2300/0609
See application file for complete search history.

(56) References Cited

U.S. PATENT DOCUMENTS

| | | | |
|---|---|---|---|
| 6,151,535 A | * | 11/2000 | Ehlers .................... G01N 35/04 198/340 |
| 6,220,451 B1 | | 4/2001 | Hoffmann |

(Continued)

FOREIGN PATENT DOCUMENTS

| | | |
|---|---|---|
| DE | 2519111 | 7/1976 |
| DE | 4301131 | 7/1994 |

(Continued)

OTHER PUBLICATIONS

PCT/US2019/016067, "International Search Report and Written Opinion", dated May 3, 2019, 14 pages.

(Continued)

*Primary Examiner* — Jill A Warden
*Assistant Examiner* — John McGuirk
(74) *Attorney, Agent, or Firm* — Kilpatrick Townsend & Stockton LLP

(57) ABSTRACT

Disclosed are high-throughput vessel sorting systems and methods of sorting sample vessels, such as samples stored in test tubes. A system for sorting a plurality of individual vessels that each contains a sample is disclosed.

20 Claims, 27 Drawing Sheets

Related U.S. Application Data filed on Jan. 31, 2018, provisional application No. 62/624,359, filed on Jan. 31, 2018, provisional application No. 62/624,530, filed on Jan. 31, 2018, provisional application No. 62/624,450, filed on Jan. 31, 2018.

(52) U.S. Cl.
CPC .............. *G01N 2035/047* (2013.01); *G01N 2035/0465* (2013.01); *G01N 2035/0472* (2013.01); *G01N 2035/0484* (2013.01)

(56) References Cited

U.S. PATENT DOCUMENTS

| | | | |
|---|---|---|---|
| 2010/0233754 A1* | 9/2010 | Guex | G01N 35/02 |
| | | | 435/29 |
| 2010/0288056 A1 | 11/2010 | Clark et al. | |
| 2011/0150619 A1* | 6/2011 | Nilsson | B65B 35/38 |
| | | | 414/738 |
| 2013/0085597 A1 | 4/2013 | Koch et al. | |
| 2013/0123089 A1 | 5/2013 | Johns et al. | |
| 2014/0037517 A1 | 2/2014 | Takai | |
| 2014/0318927 A1 | 10/2014 | Pedrazzini | |
| 2016/0229642 A1 | 8/2016 | Mulet Valles | |
| 2017/0152109 A1 | 6/2017 | Mizuki | |

FOREIGN PATENT DOCUMENTS

| | | | |
|---|---|---|---|
| EP | 3128314 | 2/2017 | |
| FR | 2957671 | 9/2011 | |
| FR | 2957671 A1 * | 9/2011 | ......... G01N 35/0099 |
| JP | 2008268033 | 11/2008 | |
| JP | 2011209045 | 10/2011 | |
| WO | 2017/047240 | 3/2017 | |

OTHER PUBLICATIONS

PCT/US2019/016067, International Preliminary Report on Patentability, dated Aug. 13, 2020, 9 pages.
PCT/US2019/016062, International Preliminary Report on Patentability, dated Aug. 13, 2020, 12 pages.
PCT/US2019/016062, International Search Report and Written Opinion, dated May 6, 2019, 15 pages.
PCT/US2019/016059, International Preliminary Report on Patentability, dated Aug. 13, 2020, 12 pages.
PCT/US2019/016059, International Search Report and Written Opinion, dated May 3, 2019, 16 pages.

* cited by examiner

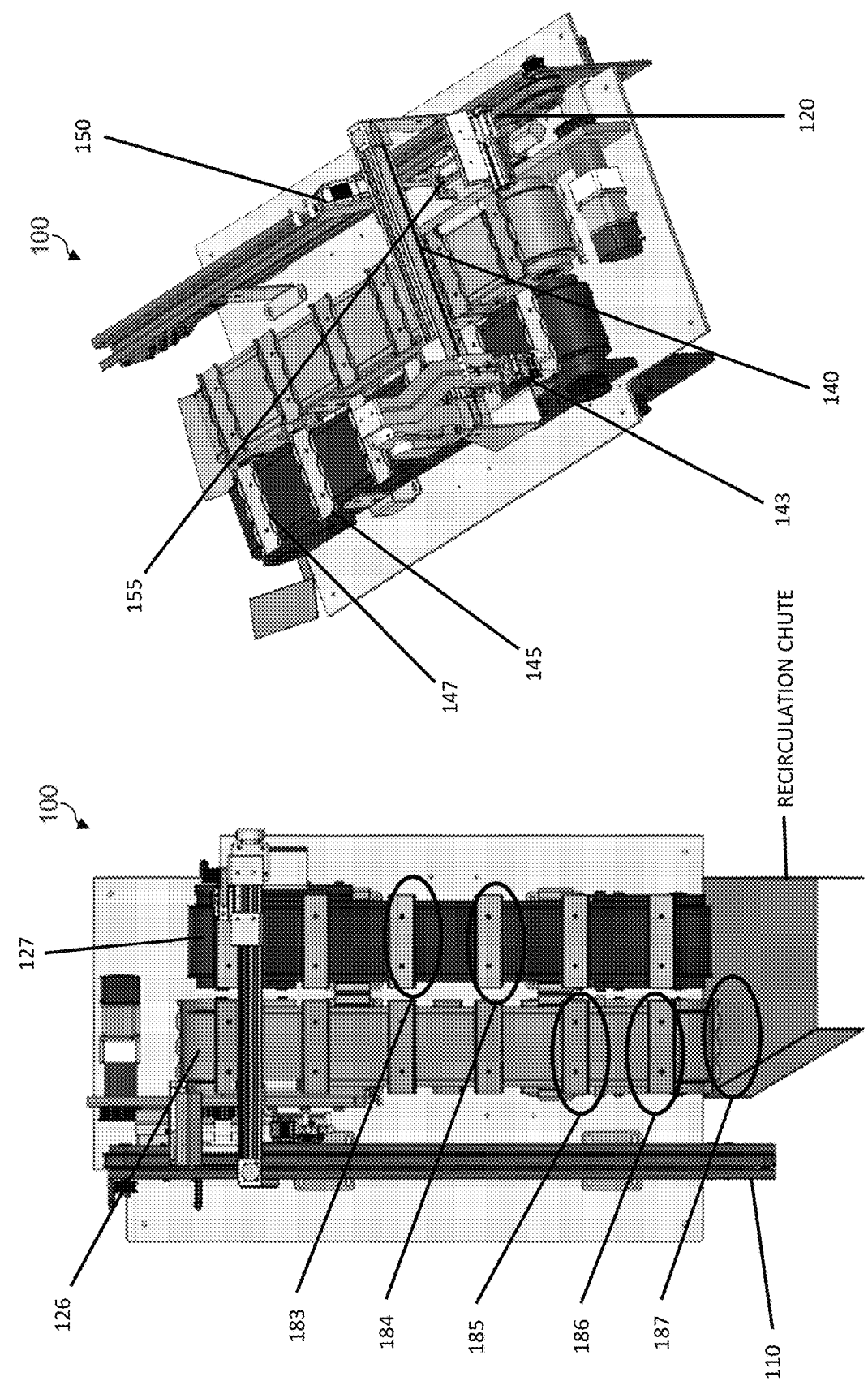

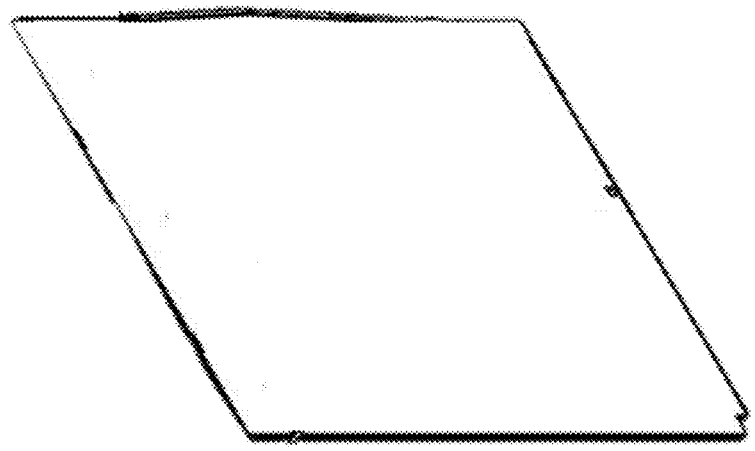
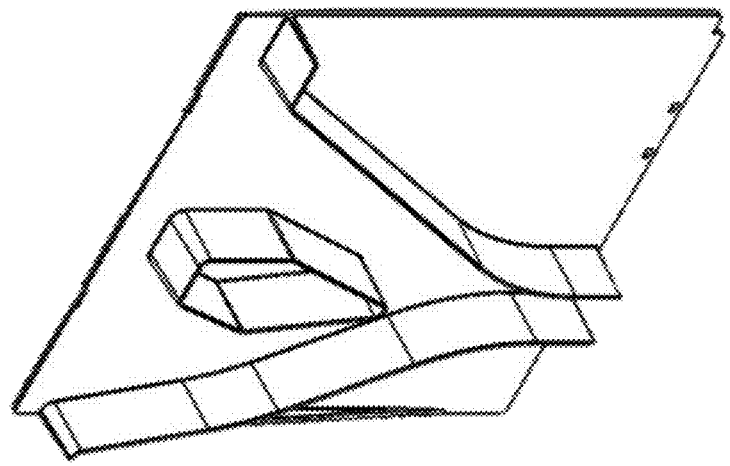

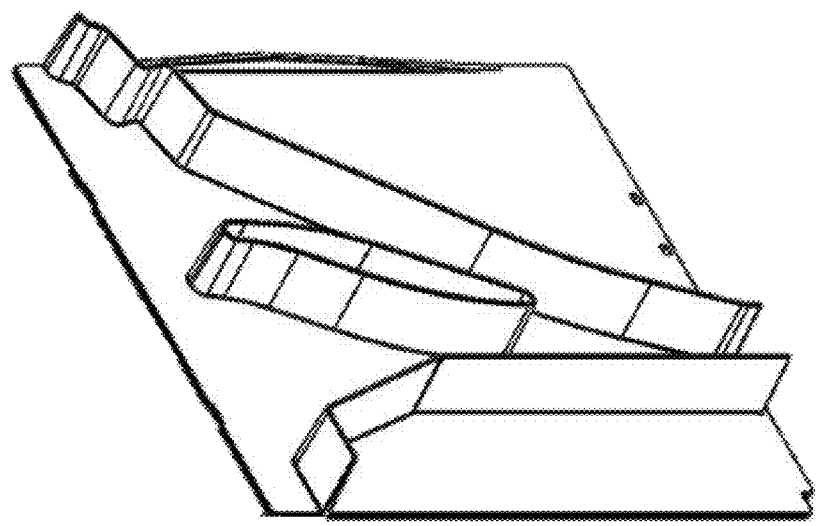
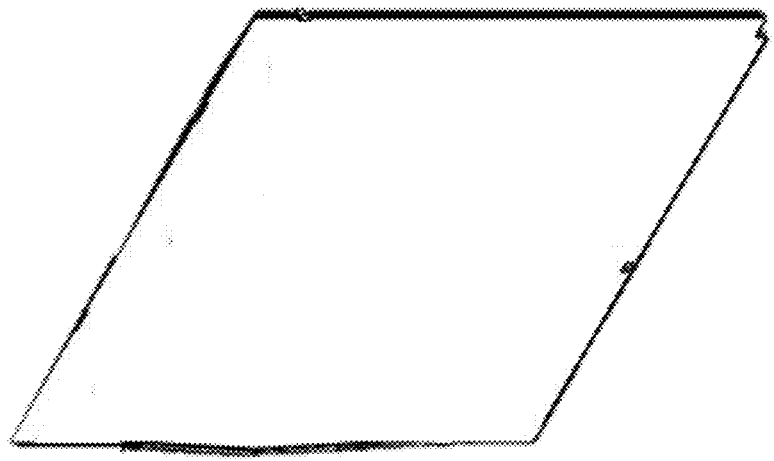

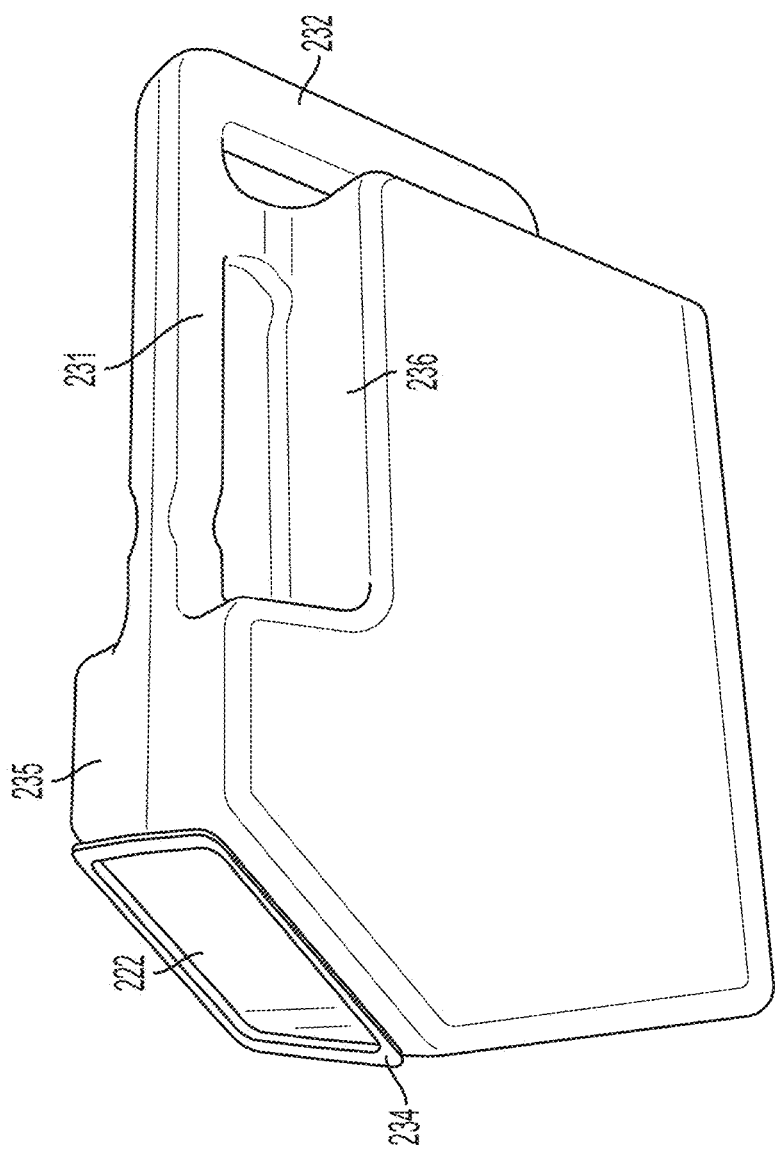

SAMPLE SORTING SYSTEM AND METHODS OF SORTING SAMPLES

PRIORITY

The present application claims priority to U.S. Provisional Patent Application No. 62/624,359, filed Jan. 31, 2018, U.S. Provisional Patent Application No. 62/624,450, filed Jan. 31, 2018, U.S. Provisional Patent Application No. 62/624,486, filed Jan. 31, 2018, U.S. Provisional Patent Application No. 62/624,419, filed Jan. 31, 2018, and U.S. Provisional Patent Application No. 62/624,530, filed Jan. 31, 2018, all of which are hereby incorporated by reference in their entireties herein.

FIELD

Described herein are robotic systems and methods for high-throughput sorting of a plurality of sample vessels. Such methods and systems may be useful for sorting patient samples for clinical testing and/or other laboratory analysis.

BACKGROUND

Samples are commonly placed within vessels that are sent to clinical laboratories or other testing facilities for processing and analysis. Such samples may include blood, serum, plasma or urine that is to be tested for various analytes (e.g., cholesterol, cancer markers, hormones and the like). Or, in some cases there is a need to test environmental samples (e.g., food and/or animal-related testing). Such clinical labs and/or testing facilities regularly receive large quantities of samples which need to be sorted into groups according to the analysis or test to be performed on the sample. Due to the large volume of sample vessels processed by the facilities, a need exists for robust sorting systems. Hand-sorting is slow, labor intensive and subject to human error. The sample vessels often need be sorted into a large number of sort groups and done so at a high throughput without error. However, many conventional systems do not have the capacity to process the large volume of samples typically processed by a commercial testing facility and/or clinical laboratory. Similarly, conventional systems do not have the capability to feed individual vessels selected from a plurality of vessels to a large downstream process and to do so at a constant rate with high throughput. To feed a large volume sorting system, the vessels need to be in an orientation that is compatible with the system. Many conventional systems do not have the capability to reorient a plurality of vessels from a random arrangement into an organized arrangement for further characterization of the vessels or samples therein. For processes downstream, a constant and reliable feed stream may improve operational efficiency. There remains a need for a sorting system that is capable of sorting a large volume of sample vessels into a large number of sort groups at a high throughput without error. Similarly, a need remains for sample vessel supply systems capable of consistently supplying a large number of sample vessels into a downstream process individually and with the vessel orientation aligned with the requirements of the downstream processes. There is also a need for sample vessel receiving systems capable of consistently individually receiving a large volume of sample vessels from an upstream process, with the vessel segregated according to a parameter. A need also exists to minimize the footprint of such systems to enable greater flexibility in use of such systems.

Described herein are new systems and methods to efficiently supply a large volume of sample vessels into various downstream processes such that the vessels are presented and sorted individually and at a high rate of speed. Also disclosed herein are new systems and methods to accurately sort a large volume of sample vessels into numerous sort groups at a high rate of speed and new systems and methods to efficiently receive a large volume of sample vessels from various upstream processes at a high rate of speed.

SUMMARY

Described herein are robotic systems and methods for high-throughput sorting of a plurality of sample vessels, systems and methods to supply a plurality of vessels into a downstream system or process at a high rate of speed, and systems and methods to receive and segregate a large volume of vessels from an upstream system or process at a high rate of speed with minimal human interaction. The invention may be embodied in a variety of ways.

In some embodiments, a system for sorting a plurality of vessels may comprise a sorting unit configured to sort a plurality of vessels, where each vessel is configured to hold a sample and comprises an identification region for providing information related to a sorting group into which the sample is to be sorted. The sorting unit may comprise: a first transfer belt configured to transport individual vessels from an entry position to a second position; a scanning unit configured to read an identification region on each vessel; an end component configured to position the vessels within the sorting unit; at least one nesting belt configured to position the vessels for transport to a designated collection point; a manipulator configured to transfer individual vessels to the at least one nesting belt; and at least one runner configured to transfer individual vessels to a designated collection point. Optionally, the scanning unit may be positioned adjacent to the second position. In certain embodiments, the scanning unit may comprise a reader that reads the identification region and stores the information related to each of the vessels as the vessel is sorted by the system. In some embodiments, the end component may receive the vessel from the first transfer belt and position the vessel at the second position for reading by the scanning unit. In some embodiments, the manipulator may be configured to physically manipulate the individual scanned vessels and pick up the individual vessel from the end component and place the individual vessel on the nesting belt. In certain embodiments, the manipulator may place an individual vessel on a particular area of the nesting belt that may be associated with the designated collection point for the individual vessel. In some embodiments, the particular area or position of the vessel on the nesting belt may be stored and tracked by the system. Optionally, the least one runner may positioned at an exit position of the sorting unit. In some embodiments, the at least one runner may be configured to physically manipulate individual vessels and pick up the vessels from the at least one nesting belt and transport the vessel to a designated collection point. In certain embodiments, the at least runner may release the vessel at the collection point.

In some embodiments, a system for sorting a plurality of vessels, comprises: a sorting unit configured to sort a plurality of vessels, wherein each vessel is configured to hold a sample and comprises an identification region for providing information related to a sorting group into which the sample is to be sorted, and wherein the sorting unit comprises: (i) a first transfer belt configured to individually transport each of the plurality of vessels from an entry position to a second position within the sorting unit; (ii) a scanning unit positioned adjacent to the second position and configured to read the identification region on each of the plurality of vessels, wherein the scanning unit comprises a reader that reads the identification region and stores the information related to each of the vessels as the vessel is sorted by the system; (iii) an end component that receives the vessel from the first transfer belt and positions the vessel at the second position for reading by the scanning unit; (iv) at least one nesting belt configured to position each of the plurality of scanned vessels for transport to a designated collection point; and (v) a manipulator configured to physically manipulate each of the plurality of scanned vessels and individually transfer individual vessels from the end component to the at least one nesting belt, wherein the position of the vessel on the nesting belt is stored by the system; and at least one runner positioned at an exit position of the sorting unit and configured to physically manipulate each of the plurality of scanned vessels and transfer each of the vessels from the at least one nesting belt to a designated collection point. In certain embodiments, the plurality of vessels may be a biological sample tube that is cylindrical in shape and comprises a cap. In some embodiments, the sorting unit may assign the sorting group to each of the plurality of vessels based on the bar code information for each vessel.

In some embodiments, the system may comprise two nesting belts comprising a first nesting belt and a second nesting belt, where the first and second nesting belts may be positioned adjacent to one another and each nesting belt may be configured to advance independently of the other nesting belt. In certain embodiments, each nesting belt may comprise at least two active stages and each stage may comprise a nest having two or more slots, where each slot is configured to accommodate a single vessel. In some embodiments, the system may comprise two runners comprising a first runner and a second runner, where the first runner may be configured to physically manipulate each of the plurality of scanned vessels and transfer each of the plurality of vessels from a first active stage to a designated collection point and the second runner may be configured to physically manipulate each of the plurality of the scanned vessels and transfer each of the plurality of vessels from a second active stage to a designated collection point. In some embodiments, the first active stage of the nesting belts may be configured to align with an operating path of the first runner such that the operating path of the first runner may be substantially perpendicular to the first active stage and the second active stage of the nesting belt may be configured to align with an operating path of the second runner such that the operating path of the second runner may be substantially perpendicular to the second active stage. In some embodiments, each of the nesting belts may be configured to advance at timed intervals that provide for a runner to remove each of the plurality of positioned vessels from the slots of the nest prior to advancement of the nesting belt to the next stage position. In certain embodiments, the system may be configured to relay the sort group for each of the plurality of vessels and the position of each of the plurality of vessels on each nesting belt to the runners. In some embodiments, the runners may be configured to transport each of the plurality of vessels from the slots on the nests to collection containers. In some embodiments, each container may have an assigned sorting group. In some embodiments, the runners may be configured to disengage with each of the plurality of vessels when the runner is aligned with the assigned collection container as determined by the sorting group information of each of the plurality of vessels. Optionally, the system may comprise two sorting units, wherein the sorting units are adjacent to one another such that the stages of the nesting belts are substantially aligned.

In some embodiments, the system may comprise: four sorting units, where each sorting unit may comprise two nesting belts comprising a first nesting belt and a second nesting belt, where the first and second nesting belts may be adjacent to one another and each nesting belt may be configured to advance independently of the other nesting belts. In some embodiments, each nesting belt may comprise at least two active stages and each stage may comprise a nest having two or more slots. In certain embodiments, the nesting belts of the four sorting units may be configured to operate independently from one another and the stages of the nesting belts may be aligned. In some embodiments, the system may further comprise four runners, where each runner may be configured to physically manipulate and transfers vessels from a single active stage. Optionally, the designated active stage of the nesting belts may be configured to align with an operating path of the associated runner such that the operating path of the associated runner is substantially perpendicular to the designated active stage and where each of the nesting belts is configured to advance at timed intervals that provide for the associated runner to remove each of the plurality of positioned vessels from the slots of the nest prior to advancement of the nesting belt to the next stage position. In some embodiments, the system may be configured to relay the sort group for each of the plurality of vessels and the position of each of the plurality of vessels on each nesting belt to the runners. In some embodiments, the runners may be configured to transport each of the plurality of vessels from the slots on the nests to collection containers, each container having an assigned sorting group. In certain embodiments, the runners may be configured to disengage with each of the plurality of vessels when the runner is aligned with the assigned collection container as determined by the sorting group information of each of the plurality of vessels.

In certain embodiments, the system may be configured to sort up to 8000 vessels per hour. In other embodiments, the system may be configured to sort more than 8000 vessels per hour. In some embodiments, the system may be configured to sort the plurality of vessels into up to 216 sort groups. In other embodiments, the system may be configured to sort the plurality of vessels into more than 216 sort groups (e.g., 250, 252, 275, 288, 300, 324 or more sort groups). In some embodiments, the system may be modular. In some embodiments, the designated collection point may further comprise a plurality of chutes, wherein each chute may be paired with a collection container.

In certain embodiments, the system may further comprise at least one feeding system configured to supply vessels to the entry position of the at least one sorting unit. In some embodiments, a system for supplying a plurality of vessels may comprise: a feeding unit configured to supply a plurality of vessels to at least one exit position, where each of the plurality of vessels is configured to hold a sample. The feeding unit may comprise: a feed bin; a transporter configured to remove individual vessels from the feed bin; and a transfer belt configured to transfer the vessels to an exit position of the feeding unit. In certain embodiments, the feed bin may be substantially trapezoidal in shape and comprise a bottom surface, a substantially open top, a front, a back, an A-side and a B-side, where the A-sides and B-sides are opposite to each other. The feed bin may be configured to feed each of the plurality of vessels from an entry position, e.g., at the top of the feed bin to at least one edge position, e.g., at or near a bottom surface of the bin. The feed bin may also include at least one transporter positioned in communication with vessels at the at least one edge position. For example, in one embodiment there may be at least one transporter on at least one of the A-side or the B-side of the feed bin. The transporter may be configured to receive each of the plurality of vessels from the at least one edge position and transport each of the vessels to at least one transfer point. The system may further comprise at least one transfer belt positioned at the exit of the at least one transporter and configured to receive each of the plurality of vessels from the at least one transfer point and individually transfer individual vessels from the at least one transfer point to an exit position within the feeding system. In some embodiments, the transfer belt is positioned at or near the top of the bin. In some embodiments, a system for supplying a plurality of vessels may comprise: a feeding unit configured to supply a plurality of vessels to at least one exit position, where each of the plurality of vessels is configured to hold a sample, and where the feeding unit comprises: (i) a feed bin, the bin being substantially trapezoidal in shape and comprising a bottom surface, a substantially open top, a front, a back, an A-side and a B-side, and configured to feed each of the plurality of vessels from an entry position at the top of the feed bin to at least one edge position of the bottom surface; (ii) at least one transporter positioned on at least one of the A-side or the B-side of the feed bin and configured to receive each of the plurality of vessels from the at least one edge position and transport each of the vessels to the at least one transfer point; and (iii) at least one transfer belt positioned at the exit of the at least one transporter and at or near the top of the bin, and configured to receive each of the plurality of vessels from at least one transfer point and individually transfer individual vessels from the at least one transfer point to an exit position within the feeding system.

The transporter unit may be configured to move individual vessels in a sequential manner. In some embodiments, the at least one transporter may comprise discrete sorting regions that are configured to hold vessels that are individually juxtaposed. For example, the sorting regions may align a number vessels in a linear fashion for further sorting and downline processing. For example, in some embodiments, the at least one transporter may comprise a series of steps configured to individually transfer vessels from one step to the next step in the series.

In some embodiments, the system may comprise two transporters and two transfer belts. For example, one transporter and transfer belt pair may be associated with the A-side of the feed bin and the other transporter and transfer belt pair may be associated with the B-side of the feed bin. In some embodiments, the system is modular in that multiple feeding units may be juxtaposed as part of a larger system for downstream analysis of the samples within the vessels.

In certain embodiments, the system may further comprise at least one vessel receiving system configured to receive vessels from the sorting unit. In some embodiments, a system for receiving a plurality of vessels may comprise a collection bank configured to receive at least one vessel, where the at least one vessel is configured to hold a sample and wherein the collection bank comprises: at least one alignment component, where the at least one alignment component is configured to direct the at least one vessel from an entry position to a collection point within the collection bank; and at least one collection containers comprising an opening, where the at least one containers is configured to receive and hold at the least one vessel at the collection point. In some embodiments, a system for receiving a plurality of vessels may comprise a collection bank configured to receive a plurality of vessels, where each vessel is configured to hold a sample and wherein the collection bank comprises: a plurality of alignment components, where each of the plurality of alignment components is configured to individually direct each of the plurality of vessels from an entry position to a collection point within the collection bank; and a plurality of collection containers comprising an opening, where each of the plurality of containers is configured to receive and hold at least some of the plurality of vessels at the collection point. In an embodiment, samples are directed to a particular collection point based on the sample type or some other identifying indicia. In some embodiments, the system may further comprise a plurality of encasing panels adjacent to each of the plurality of alignment components, where each of the plurality of encasing panels is configured to enclose each of the plurality of alignment components. In some embodiments, the system may further comprise a support structure configured to house each of the plurality of alignment components, encasing panels, and collection containers. In some embodiments, the plurality of alignment components and encasing panels may be configured in a row and positioned in a vertical orientation with an encasing panel separating each of the plurality of alignment components in the row and an encasing panel at each end of the row.

In certain embodiments, the support structure may comprise at least one container shelf configured to hold the plurality of collection containers. In some embodiments, each of the plurality of collection containers may be configured to be associated with a chute formed by one of the plurality of encasing panels and one of the plurality of alignment components, where the association is based on a sorting parameter of each of the plurality of vessels.

In some cases, each of the plurality of encasing panels and alignment components may be configured to contact each other to form a chute and reorient a vessel from a substantially horizontal orientation to a substantially vertical orientation to facilitate entry into a collection container. In some examples, each of the plurality of alignment components comprises a first side and a second side. In some embodiments, the first side and second side of each of the plurality of alignment components each may comprise a raised portion, where the raised portion is configured to provide a contact surface to reorient and funnel each of the plurality of vessels.

In some embodiments, the collection system may include an apparatus to guide vessels within the system. In certain examples, an apparatus for guiding an article may comprise a raised portion in a substantially Y-shape and a first side and a second side, where the raised portion provides a contact surface for the article and is configured to direct an article from a top of the apparatus to an outlet at the bottom of the apparatus. In some cases, the apparatus further comprises a two-step feature to further direct and reorient each article entering the apparatus from a rear entry point.

In some embodiments, the collection system may include an apparatus to collect and transport vessels. In certain examples, a collection-transport apparatus may collect and transport an article from a collection point to a downstream process (e.g., analysis station). In some cases, the article may be a vessel or sample tube. The collection-transport apparatus may comprise a substantially rectangular base and walls connected to the base, where the base and walls define an interior volume of the apparatus and the walls comprise a front wall, a rear wall, a first side wall, and a second side wall, a top connected to the first side wall and second side wall, where the top comprises a first top surface and a second top surface that are substantially perpendicular to the first side wall and second side wall, a first handle connected to the first top surface and second top surface, and a second handle connected to the rear wall of the apparatus. In some cases, the apparatus may comprise a panel that defines a substantially rectangular opening, where the apparatus configured to receive a plurality of implements through the opening.

Also disclosed herein are methods for sorting a plurality of vessels. In certain embodiments, a method for sorting a plurality of vessels may comprise: providing a plurality of vessels; transferring the plurality of vessels to a sorting unit; determining a sorting group for the vessel; storing the information related to the at least one vessel; transferring each of the plurality of vessels to at least one runner positioned at an exit position of the sorting unit, and transferring the vessel via the at least one runner to a designated collection container. In some embodiments, a system for sorting a plurality of vessels may comprise a sorting unit configured to sort a plurality of vessels, where each vessel is configured to hold a sample and comprises an identification region for providing information related to a sorting group into which the sample is to be sorted. In an embodiment, the sorting unit may comprise: a first transfer belt configured to transport individual vessels from an entry position to a second position; a scanning unit configured to read an identification region on each vessel; an end component configured to position the vessels within the sorting unit; at least one nesting belt configured to position the vessels for transport to a designated collection point; a manipulator configured to transfer individual vessels to the at least one nesting belt; and at least one runner configured to transfer individual vessels to a designated collection point. Optionally, the scanning unit may be positioned adjacent to the second position. In certain embodiments, the scanning unit may comprise a reader that reads the identification region and stores the information related to each of the vessels as the vessel is sorted by the system. In some embodiments, the end component may receive the vessel from the first transfer belt and position the vessel at the second position for reading by the scanning unit. In some embodiments, the manipulator may be configured to physically manipulate the individual scanned vessels and pick up the individual vessel from the end component and place the individual vessel on the nesting belt. In certain embodiments, the manipulator may place an individual vessel on a particular area of the nesting belt that may be associated with the designated collection point for the individual vessel. In some embodiments, the particular area or position of the vessel on the nesting belt may be stored and tracked by the system. Optionally, the least one runner may positioned at an exit position of the sorting unit. In some embodiments, the at least one runner may be configured to physically individual vessels and pick up the vessels from the at least one nesting belt and transport the vessel to a designated collection point. In certain embodiments, the at least runner may release the vessel at the collection point. For example, a method for sorting a plurality of vessels may comprise: (a) providing a plurality of vessels, each vessel configured to hold sample, wherein each of the plurality of vessels comprises an identification region for providing information related to a sorting group of the sample; transferring the plurality of vessels to a sorting unit, the sorting unit configured to: sort a plurality of vessels, wherein each vessel is configured to hold a sample and comprises an identification region for providing information related to a sorting group into which the sample is to be sorted, and wherein the sorting unit comprises: (i) a first transfer belt configured to individually transport each of the plurality of vessels from an entry position to a second position within the sorting unit; (ii) a scanning unit positioned adjacent to the second position and configured to read the identification region on each of the plurality of vessels, wherein the scanning unit comprises a reader that reads the identification region and stores the information related to each of the vessels as the vessel is sorted by the system; (iii) an end component that receives the vessel from the first transfer belt and positions the vessel at the second position for reading by the scanning unit; (iv) at least one nesting belt configured to position each of the plurality of scanned vessels for transport to a designated collection point; and (v) a manipulator configured to physically manipulate each of the plurality of scanned vessels and individually transfer individual vessels from the end component to the at least one nesting belt, wherein the position of the vessel on the nesting belt is stored by the system; (b) reading the identification region of the vessel; (c) determining a sorting group for the vessel; (d) storing the information related to the at least one vessel; (e) transferring each of the plurality of vessels to at least one runner positioned at an exit position of the sorting unit, wherein the runner is configured to physically manipulate each of the plurality of scanned vessels and transfer each of the vessels from the at least one nesting belt to a designated collection point; and (f) transferring the vessel via the at least one runner to a designated collection container, wherein the collection container is determined by the sorting group information of the vessel.

Also disclosed herein are methods for supplying a plurality of vessels for sorting by a sorting unit. The method may comprise: providing a plurality of vessels; transferring the plurality of vessels to a feeding unit where the feeding unit comprises a feed bin, a transporter configured to remove individual vessels from the feed bin; and a transfer belt configured to transfer the vessels to an exit position of the feeding unit for transfer to a sorting unit. In some embodiments, the feed bin may be substantially trapezoidal in shape and comprise a bottom surface, a substantially open top, a front, a back, an A-side and a B-side, and may be configured to feed each of the plurality of vessels from an entry position at the top of the feed bin to at least one edge position at or near the bottom surface of the bin. Also in some embodiments, the at least one transporter may be positioned on at least one of the A-side or the B-side of the feed bin and configured to receive each of the plurality of vessels from the at least one edge position. In an embodiment, the transporter is used to transport each of the vessels to at least one transfer point. The method may also employ using at least one transfer belt positioned at the exit of the at least one transporter to receive each of the plurality of vessels from the at least one transfer point and individually transfer each individual vessel from the at least one transfer point to a bin exit position within the system. In an embodiment, the exit of the at least one transporter is at or near the top of the bin. The method may also transfer the vessel via the at least one transfer belt to a downstream process or unit. For example, a method for supplying a plurality of vessels, may comprise: providing a plurality of vessels; transferring the plurality of vessels to a feeding unit, the feeding unit configured to: supply a plurality of vessels to at least one exit position, where each of the plurality of vessels is configured to hold a sample, and where the feeding unit comprises: (i) a feed bin, the bin being substantially trapezoidal in shape and comprising a bottom surface, a substantially open top, a front, a back, an A-side and a B-side, and configured to feed each of the plurality of vessels from an entry position at the top of the feed bin to at least one edge position of the bottom surface wherein the feed; (ii) at least one transporter positioned on at least one of the A-side or the B-side of the feed bin and configured to receive each of the plurality of vessels from the at least one edge position and transport each of the vessels to the at least one transfer point; and (iii) at least one transfer belt positioned at the exit of the at least one transporter and at or near the top of the bin, and configured to receive each of the plurality of vessels from at least one transfer point and individually transfer each individual vessel from the at least one transfer point to a bin exit position within the system; and transferring the vessel via the at least one transfer belt to a downstream process or unit.

Also disclosed herein are methods for receiving (e.g., collecting) a plurality of vessels using the sorting systems described herein. In some examples, a method of using a system for receiving a plurality of vessels may comprise comprising delivering a plurality of vessels to an entry point of the collection system and dispersing the plurality of vessels into a plurality of collection containers. The collection system may comprise (i) a plurality of alignment components, where each of the plurality of alignment components is configured to individually direct at least some of the plurality of vessels from an entry position to a collection point within the collection bank; (ii) a plurality of encasing panels adjacent to each of the plurality of alignment components, where each of the plurality of encasing panels is configured to enclose each of the plurality of alignment components; (iii) a plurality of collection containers comprising an opening, where each of the plurality of containers is configured to receive and hold the at least some of the plurality of vessels at the collection point; and (iv) a support structure configured to house each of the plurality of alignment components, encasing panels, and collection containers, where each vessel is configured to hold a sample. In an embodiment, samples are directed to a particular collection point based on the sample type or some other identifying indicia.

This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings and each claim. Further aspects, objects, and advantages of the invention will become apparent upon consideration of the detailed description and figures that follow.

BRIEF DESCRIPTION OF THE FIGURES

The present disclosure may be better understood with reference to the accompanying figures, in which embodiments of the invention are shown. This invention may, however, be embodied in many different forms and should not be construed as limited to the embodiments set forth herein; rather, these embodiments are provided so that this disclosure will be thorough and complete, and convey the scope of the invention to those skilled in the art.

FIG. 5A shows a top view of a sorting unit according to one embodiment described herein.

FIG. 5B shows a perspective view of a sorting unit according to one embodiment described herein.

FIG. 15A shows a front perspective view of an alignment component according to one embodiment described herein.

FIG. 15B shows a rear perspective view of an alignment component according to one embodiment described herein.

FIG. 16A shows a front perspective view of an alignment component according to one embodiment described herein.

FIG. 16B shows a rear perspective view of an alignment component according to one embodiment described herein.

FIG. 19 is a perspective view of a collection container according to one embodiment described herein.

DETAILED DESCRIPTION OF THE INVENTION

Figure 1:
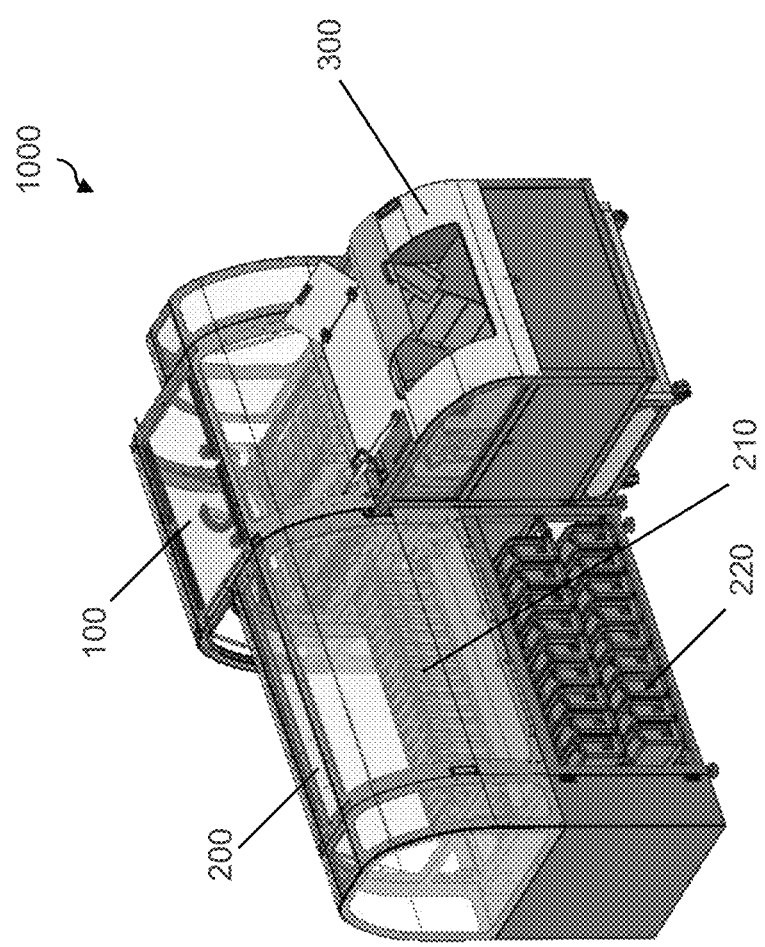
FIG. 1 shows a perspective view of a system for sorting a plurality of vessels according to one embodiment described herein.

The use of "including," "comprising," "having," "containing," "involving," and/or variations thereof herein, is meant to encompass the items listed thereafter and equivalents thereof as well as additional items.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

Described herein are systems and methods for sorting a plurality of vessels. The invention may be embodied in a variety of ways.

Sorting Units

Samples that are to be tested for certain analytes (e.g., patient sample to be tested for analytes such as lipoprotein levels and types, cholesterol, hormones, biological markers of disease, may be placed within vessels and sent to a testing facility for processing and analysis. Some of these facilities may receive tens of thousands of individual samples vessels daily, with some receiving 50,000 or more individual samples daily. The sample vessel shipments may be received at a central processing area of a testing facility and placed into groups based on a particular testing criteria, such as the analysis or test to be performed on the sample or the analysis unit of facility. Existing systems for sorting such samples into test groups are often labor intensive for both the sending and receiving entities. Use of a robust system capable of sorting thousands of sample vessels daily would be highly advantageous to testing facilities. Furthermore, robust sorting system that is compact in design may be especially advantageous for minimizing labor required to maintain the system and for testing facilities with limited operating space.

Similarly, existing methods are often labor intensive for both the sending and receiving entities. In some instances, a sending facility may pre-sort vessel shipments to aid in processing at the testing facility. Use of a robust method capable of sorting thousands of sample vessels daily would therefore be advantageous to testing facilities as well as sending facilities. Additionally, the ability to sort and test samples quickly should minimize any potential for sample degradation and allow for the results to be sent back to the doctor and/or other medical professionals more quickly.

Thus, by using the disclosed automated sorting systems and methods, the sorting of the large number of vessels at a testing facility may be completed with greater speed and accuracy, thereby improving the overall costs and reliability of a testing facility. By eliminating presorting, shipping efficiency may be improved with the use of fewer shipping containers.

In certain embodiments, the invention may comprise a system for sorting a plurality of vessels. The system may comprise a sorting unit configured to sort a plurality of vessels and at least one runner positioned at an exit position of the sorting unit, wherein the at least one runner may be configured to physically manipulate each of the plurality of vessels transfer each of the vessels to a designated collection point. In some embodiments, each vessel may be configured to hold a sample. In some embodiments, each vessel may comprise an identification region for providing information related to a sorting group into which the sample is to be sorted.

In certain embodiments, the sorting unit may comprise: (i) a first transfer belt configured to individually transport each of the plurality of vessels from an entry position to a second position within the sorting unit; (ii) a scanning unit positioned adjacent to the second position and configured to read the identification region on each of the plurality of vessels; (iii) an end component that receives the vessel from the first transfer belt and positions the vessel at the second position for reading by the scanning unit; (iv) at least one nesting belt configured to position each of the plurality of scanned vessels for transport to a designated collection point; and (v) a manipulator configured to physically manipulate each of the plurality of scanned vessels and individually transfer individual vessels from the end component to the at least one nesting belt. In some embodiments, the scanning unit may comprise a reader that reads the identification region and stores the information related to each of the vessels as the vessel is sorted by the system. In certain embodiments, each of the plurality of vessels has a leading end and a trailing end, wherein the leading end contacts the end component, aligns with the end component, and maintains said alignment when transferred to the at least one nesting belt. In some embodiments, the position of the vessel on the nesting belt may be stored by the system. In some embodiments, the sorting group for each of the vessels and the position of each of the vessels on the nesting belt are relayed to the at least one runner. In some embodiments, the at least one runner may transfer each of the vessels from the at least one nesting belt to a designated collection point.

In some embodiments, each of the plurality of vessels may comprise a biological sample. For example, the vessel may be a tube that is cylindrical in shape. Optionally, the sample tube may comprise a cap. As used herein, the term "biological sample" encompasses any sample obtained from a biological source. A biological sample can, by way of non-limiting example, include blood, amniotic fluid, sera, urine, feces, epidermal sample, skin sample, cheek swab, sperm, amniotic fluid, cultured cells, bone marrow sample and/or chorionic villi. Convenient biological samples may be obtained by, for example, scraping cells from the surface of the buccal cavity. The term biological sample encompasses samples that have been processed to release or otherwise make available a nucleic acid (e.g., cell free DNA or RNA) or protein for detection as described herein. The biological sample may be obtained from a stage of life such as a fetus, young adult, adult, and the like. The biological sample may be obtained from a non-human animal (e.g., cow, dog, cat), including veterinary samples. The biological sample may be obtained from an animal product (e.g., meat) or a plant product (e.g., crops such as corn and the like). Fixed or frozen tissues also may be used. Thus, a biological sample may be a sample or specimen taken from a living being, such as a human patient. In many cases the sample could be a tissue or fluid specimen, such as blood, plasma, or urine. The vessels, in addition to a biological sample, may further comprise various preservatives and anti-coagulants to preserve the sample during processing and testing time.

In some embodiments, each of the plurality of vessels may comprise an environmental sample. As used herein, the term "environmental sample" encompasses any sample obtained from an environmental source. An environmental sample can, by way of non-limiting example, include water (fresh, oceanic, or drinking), soil, plants, biological materials, and wastes (liquids, solids or sludge). In some embodiments, each of the plurality of vessels may be a geological sample container that is cylindrical in shape and comprises a cap. As used herein, the term "geological sample" encompasses any sample obtained from a geological source. A geological sample can, by way of non-limiting example, include rock, ore, minerals, and sediment. In some embodiments, each of the plurality of vessels may be a chemical or pharmaceutical sample container that is cylindrical in shape and comprises a cap. As used herein, the term "chemical sample" encompasses any sample obtained from a chemical or pharmaceutical source. A chemical sample can, by way of non-limiting example, include liquids, slurries, solids (powder, pellet, or cake), gels, tablets, and wastes. For example, vessels may be used to carry any suitable material, such as drugs used in screening applications, processing samples used to assess the conversion level, rocks or similar substances, and so on, and are not limited to carrying blood or other body or tissue samples.

The vessels to be sorted are often marked so that an optical scanner may identify each vessel by its marking, e.g., before the vessel is sorted into its sorting group. In some embodiments, the identification region of the vessel may comprise a bar code that represents an alphanumeric string. In certain embodiments, the bar code may comprise information relating to a specific sample analysis or sample sort group. In some embodiments, the sorting unit may assign the sorting group to each of the plurality of vessels based on the bar code information for each vessel. For example, each test vessel may be marked with an indicia containing information, such as a bar code, which indicates identifying data, e.g., vessel identity, patient or source identity, the type of sample, and the test to be run. Clinical testing laboratories may receive hundreds to thousands of biological samples per hour, and need to sort the vessels into sort groups such as by testing laboratory department, e.g., histopathology, cytopathology, electron microscopy, clinical microbiology, clinical chemistry, hematology, genetics, and reproductive biology. Further sorts may be needed to separate the samples for particular tests to be run.

As discussed herein, the vessel may be a tube that is cylindrical in shape along a longitudinal axis. Optionally, the tube may comprise a cap. The systems described herein may be configured to supply vessels having various shapes or dimensions. In some embodiments, each of the plurality of vessels may range in size from 75 millimeters (mm) to about 125 mm in length and about 8 to about 16 mm in diameter. For example, the vessel may be 8 mm, 10 mm, 12 mm, 14 mm, or 16 mm in diameter. For example, the vessel may be 75 mm, 80 mm, 90 mm, 100 mm, 110 mm, or 125 mm in length.

In some embodiments, the scanning unit may comprise a rotational element configured to rotate each of the plurality of vessels about the longitudinal axis of the vessel to position the identification region so that it can be scanned by the reader. In some embodiments, the system may be configured to detect an identifying indicia in an identification region that is associated with a vessel and to transport the vessel to a collection point based on the information contained in the indicia.

The reader and indicia in the identification region may take any suitable form so that the indicia may exchange information to the reader in a one-way or two-way fashion. For example, the indicia may include a barcode or other marking that is read by the reader, e.g., using a scanning laser, video camera or other imaging device and associated image analysis circuitry, or other arrangement. Markings used for indicia may be made by any suitable method, such as written by hand or formed by a machine that etches, prints, applies a label or otherwise forms the marking. In other embodiments, the indicia may include an active or passive RFID tag or other device that is capable of communicating with the reader using electromagnetic radiation or other suitable medium. In another embodiment, the indicia may include physical structures that may be contacted by the reader, e.g., an arrangement of bumps, grooves, tabs or other features that may be interpreted by the reader in a way similar to how a lock can detect the physical features of a key. Alternately, the reader may electrically contact the indicia, e.g., to detect a resistance or other electrical characteristic that represents information. Other indicia arrangements are possible, including those using infrared light communication, wireless electronic communication, and so on. Information related to the sample that is represented by the indicia may relate to any desired characteristic of the vessel and/or the sample.

In some embodiments, the information of the identification region may relate to particular chemical, biological and/or other properties of the sample, an identity of the entity from which the sample was taken, an identity of the laboratory or location where the sample was taken, a blood type, a volume of the sample, chemical identity, cell characteristics, molecular properties, and/or the like. Such information may or may not be unique to each sample. In some embodiments, the information may relate to identification of the particular vessel, e.g., representing a vessel identity, vessel size, shape, or other characteristics. In some cases, the indicia may include information based on the type of test or analysis performed or to be performed on the sample.

In some embodiments, an indicia may be suitably provided on the vessel after the sample is placed in the vessel. The indicia may include the actual information itself, e.g., a name of a person, identity of testing facility, the actual sample volume, etc., or the indicia may include a reference used to locate or otherwise determine such information, e.g., the indicia may include a number or other alphanumeric string that can be used as an address to locate corresponding information in an appropriate database or other store. Information read from an indicia may be stored or otherwise used, as desired. As an example, the information conveyed by an identification region of a vessel selection device, e.g., an alphanumeric string read from the indicia may be stored together with other information.

In some embodiments, the reader may be configured to distinguish a first identifying indicia present on a first vessel from a second identifying indicia present on a second vessel, or to distinguish a third identifying indicia present on a third vessel from a fourth identifying indicia present on a fourth vessel, etc., to distinguish indicia and sort the vessels to an infinite number of sort groups.

In some embodiments, the at least one nesting belt of the sorting unit advances in timed intervals. In some cases, the timing of the interval for advancement may be associated with the availability of a runner to manipulate and transfer each of the vessels. In other cases, the timing of the interval for advancement may be associated with the loading of the nesting belt, i.e., the nesting belt may not advance until a particular stage is fully loaded. In some cases, the nesting belt may advance based on a maximum static period to ensure that samples of particular sorting groups that are time sensitive are promptly processed even if the volume of those sorting groups is small.

In some embodiments, the at least one nesting belt may comprise a plurality of stages. In some embodiments, each stage may comprise a nest having at least one slot configured to accommodate a single vessel. In some embodiments, each stage may comprise a nest having at least four slots configured to each accommodate a single vessel. In some embodiments, the at least one slot may be configured to hold the single vessel such that the longitudinal axis of the vessel is substantially horizontal and aligned with the operating direction of the nesting belt. In some embodiments, each slot may be configured to hold an individual vessel such that the longitudinal axis of each vessel is substantially horizontal and aligned with the operating direction of the nesting belt. In some embodiments, the slot may comprise a V-shape configuration, which may aid the runner to grasp each vessel from the slot of the nest. In some embodiments, the slot may range from 75 mm to about 125 mm in length and about 8 to about 16 mm in diameter. For example, the slot may be 8 mm, 10 mm, 12 mm, 14 mm, or 16 mm in diameter. For example, the vessel may be 75 mm, 80 mm, 90 mm, 100 mm, 110 mm, or 125 mm in length.

In some embodiments, each of the plurality of vessels may remain aligned to the leading end of the vessel when positioned in the at least one slot. In some cases, the alignment may be determined by the position of the end component in relation to the nesting belt.

In some embodiments, some stages on the nesting belt are active and other stages are inactive. An inactive stage may comprise vessels within the slots of the nest, but have no manipulation of the vessels until advancement to a subsequent stage. An active stage may comprise samples within the slots of the nest that are manipulated for transfer through the sorting system. In certain embodiments, stage 1 is an active loading stage, wherein the manipulator physically manipulates each of the plurality of scanned vessels and individually transfers individual vessels from the end component of the first transfer belt to the nesting belt. In certain embodiments, stage 2 is an inactive transition stage. In certain embodiments, one or more of stages 3, 4, 5, or 6 may be an active stage and may be an exit position for the plurality of vessels to exit the sorting unit and be transferred to the at least one runner. In an embodiment, a manipulator positioned at an exit position of the sorting unit may physically manipulate each of the plurality of scanned vessels and transfer each of the vessels from the active stage of the at least one nesting belt to the runner for delivery to a designated collection point.

In some embodiments, the at least one stage of the nesting belt is configured to align with an operating path of the at least one runner such that the timed intervals of the nesting belt advancement allow the runner to remove each of the plurality of vessels from the slot prior to advancement of the nesting belt to the next advancement interval or stage. In some embodiments, the operating path of the at least one runner is substantially perpendicular to a direction of advancement of the nesting belt. Thus, in some embodiments, the direction of advancement of the nesting belt is approximately 180 degrees from a direction of the first transfer belt, and the at least one runner is substantially perpendicular to both the first transfer belt and the nesting belt In some embodiments, the system may comprise four or more nesting belts and two or more runners. In some embodiments, the system may comprise eight or more nesting belts and four or more runners. In systems with multiple runners, the operating paths of each runner may be substantially parallel to the path of the other runners. Additionally, the operating path of each runner may align with at least one of the active stages of the nesting belt. This parallel arrangement and alignment with the nesting belt may permit a runner to manipulate and transfer vessels from other nesting belts that were originally assigned to a different runner. This flexibility and redundancy may permit the system to continue to operate in the event one or more runners may be down for maintenance or repair.

In some embodiments, the at least one runner may comprise a plurality of manipulators, such as but not limited to, grippers, such that each of the plurality of vessels on the nest is individually manipulated by a pair of grippers. In certain embodiments, the at least one runner may further comprise two gripper heads, wherein the plurality of grippers are arranged within each of the gripper heads. In some embodiments, only one gripper head may be engaged to manipulate the vessels from the nesting belt under normal conditions. In such cases, the second gripper head may be used for redundancy. For systems comprising more than one runner, the second gripper head may be engaged on a first runner if a second runner was removed from service, e.g. for maintenance and repairs. In some embodiments, both gripper heads may be engaged to manipulate the vessels from more than one nesting belt as part of the standard operation of the unit. In some embodiments, the plurality of grippers may operate independently to allow for the at least one runner to individually engage each of the plurality of vessels.

In some embodiments, the operating path of the at least one runner traverses to the designated collection point for the sorting group of the vessel. In some embodiments, the system may be comprised of a plurality of designated collection points, wherein each collection point comprises a collection container, and wherein a sorting group is assigned to one or more collection containers. In certain embodiments, the runner may transport each of the plurality of vessels from the slot on the nest to the assigned collection container and disengage with the vessel when the runner is aligned with the assigned collection container as determined by the sorting group information of the vessel.

In some embodiments, the system may comprise: two nesting belts comprising a first nesting belt and a second nesting belt, wherein the first and second nesting belts are positioned adjacent to one another and each nesting belt is configured to advance independently of the other nesting belt. In some embodiments, each nesting belt may comprise at least two active stages and each stage comprises a nest having two or more slots. In an embodiment each slot is configured to accommodate a single vessel. In some embodiments, the two runners comprise a first runner and a second runner, wherein the first runner is configured to physically manipulate some of the plurality of scanned vessels and transfer the manipulated plurality of vessels from a first active stage, and the second runner is configured to physically manipulate some of the plurality of the scanned vessels and transfer the manipulated plurality of vessels from a second active stage. In certain embodiments, the first active stage of the nesting belts may be configured to align with an operating path of the first runner such that the operating path of the first runner is substantially perpendicular to the first active stage and the second active stage of the nesting belt is configured to align with an operating path of the second runner such that the such that the operating path of the second runner is substantially perpendicular to the second active stage. In some embodiments, each of the nesting belts is configured to advance at timed intervals that provide for the first and second runners to remove designated vessels from the slots of the nest prior to advancement of the nesting belt to the next stage position. Also, in some embodiments the system may be configured to relay the sort group for each of the plurality of vessels and the position of each of the plurality of vessels on each nesting belt to the first and/or second runners Also in some embodiments, the first and second runners are configured to transport the plurality of vessels from the slots on the nests to collection containers, each container having an assigned sorting group, and to disengage with each of the plurality of vessels when the runner is aligned with the assigned collection container as determined by the sorting group information of each of the plurality of vessels.

The systems described herein may be modular in design. The number of nesting belts within a sorting unit may vary; some systems may comprise a single nesting belt unit while others may comprise two, four, eight, or more nesting belts. The number of sorting units within the system may vary; some systems may comprise a single sorting unit while others may comprise two, four, or more sorting units. The number of runners within the system may vary; some system may comprise a single runner while others may comprise two, four, or more runners. The number of collection points and collection containers may also vary within the system. In certain embodiments, the system may comprise a plurality of sorting units, wherein the sorting units are adjacent to one another such that the stages of the nesting belts are aligned. In some embodiments, the sorting unit may comprise two, four, or more readers, each reader capable of handling and reading single vessels in rapid succession.

In some embodiments, the system may comprise four sorting units, wherein each sorting unit comprises two nesting belts comprising a first nesting belt and a second nesting belt, wherein the first and second nesting belts are adjacent to one another and each nesting belt is configured to advance independently of the other nesting belts, wherein each nesting belt comprises at least two active stages and each stage comprises a nest having two or more slots, wherein the nesting belts of the four sorting units are configured to operate independently from one another and the stages of the nesting belts are aligned.

In some embodiments, the system may further comprise four runners, wherein each runner is configured to physically manipulate and transfer vessels from a single active stage, wherein the designated active stage of the nesting belts is configured to align with an operating path of the associated runner such that the operating path of the associated runner is substantially perpendicular to the designated active stage and wherein each of the nesting belts is configured to advance at timed intervals that provide for the associated runner to remove each of the plurality of positioned vessels from the slots of the nest prior to advancement of the nesting belt to the next stage position. For example, where four runners are used, there may be a first and second runner positioned parallel to each other and advancing (i.e., moving away from the sorter) in opposite direction (e.g., direction "A" at 0 degrees) from a third and fourth runner (i.e., direction "B" at 180 degrees from direction A).

In certain embodiments, the system may comprise for more than four sorting units and more than four runners. In some cases, the nesting belt may comprise a plurality of active stages, with the number of active stages proportional to the number of runners. In some embodiments, the collection units may be configured to be double stacked vertically, four or more high, in a staggered formation. In some cases the system may comprise a mezzanine configured to provide access to an upper set of collection units. In some cases, the sorting unit, runners, and feed unit may be configured to have an increased elevation to align with the elevated collection units.

In some embodiments, the system may be configured to relay the sort group for each of the plurality of vessels and the position of each of the plurality of vessels on each nesting belt to the runners. In such embodiments, the runners are configured to transport each of the plurality of vessels from the slots on the nests to collection containers, each container having an assigned sorting group, and the runners are configured to disengage with each of the plurality of vessels when the runner is aligned with the assigned collection container as determined by the sorting group information of each of the plurality of vessels. In some embodiments, the system may comprise four sorting units and four runners as described above.

In some embodiments, the nesting belts of the multiple sorting units are parallel and adjacent to one another. In some embodiments, each runner may be associated with a single active stage for two nesting belts of separate sorting units.

In some embodiments, the system may further comprise an A-side and a B-side, wherein the A-side and the B-side are positioned about 180 degrees to either side of the nesting belt or belts. In some embodiments, the collection containers of the system are divided such that approximately one half of the containers are located on the A-side and one half on the B-side of the system. In some embodiments, the sorting unit may assign a collection container location (A or B), a runner location, and a distance to travel in order to deliver each vessel to the appropriate collection container.

In some embodiments, the manipulators may be configured to select the first or second nesting belt for placement of each of the plurality of vessels according to the sorting group identified by the reader and the location of the collection container for the sorting group of each of the plurality of vessels. As noted above, in certain embodiments, two of the runners may be configured to transport to the A-side of the system and two of the runners transport to the B-side of the system. In some embodiments, the sort groups may be distributed to the A-side and B-side to balance the demand of the runners. In some embodiments, the collection containers may be distributed according to sample group frequency to minimize the operating path of the runners.

In some embodiments, the first nesting belt may be associated with the A-side and a second nesting belt is associated with the B-side. In some embodiments, the first nesting belt may be associated with the B-side and a second nesting belt is associated with the A-side. In some embodiments, each runner may be configured to manipulate and transfers each of the plurality of vessels from each of the sorting units.

As noted above, in some embodiments, the operating paths of the runners may be parallel to one another. The parallel design enables each of the runners to operate independently of the other runners, that is, the operating paths of the runners do not cross and the position and status of the other runners may not need to be considered by a given runner.

The system described herein may be modular in design. In some embodiments, the system has a throughput of more than 8,000 vessels per hour. In other embodiments, the system has a throughput of more than 1,000, more than 2,000, more than 3,000, more than 4,000, more than 5,000, more than 8,000, more than 10,000, more than 16,000, more than 20,000, or more than 30,000 vessels per hour. In some embodiments, the system has a throughput of 1,000 to 30,000 vessels per hour, 2,000 to 16,000 vessels per hour, or 3,000 to 8,000 vessels per hour. The system is designed to minimize human interaction during the supplying of the vessels.

In some embodiments, the system may be configured to sort the plurality of vessels into up to 216 sort groups. Or, in some embodiments, more than 216 sort groups may be used. In some embodiments, the number of sort groups may be related on the number of collection containers in a particular sorting system. The number of sort groups may be equivalent to the number of collection containers. In other embodiments, the number of sort groups may be less than the number of collection containers, that is, some sort groups may be associated with more than one collection container. It will be understood that where the collection point is configured to contain more or fewer collection containers, the number of sort groups may vary accordingly. In some embodiments, the system comprises any number of sort groups from two to 1000 sort groups. In some embodiments, the system comprises one receiving container for each sort group. In other embodiments, the system comprises more than one collection container for each sort group. For example, a number of containers may be assigned to a sort group based on the frequency with which a particular test is run. The design of collection point within the system is modular with both the number of sort groups and collection containers. In some examples, the system may comprise up to 36 sort groups and up to 36 collection containers. For other systems, the number of sort groups may range from 2 sort groups up to 216 sort groups, e.g., 36 sort groups, 72 sort groups, 108 sort groups, 144 sort groups, 180 sort groups, or 216 sort groups. Likewise, the number of collection containers may range from up to 216 containers, e.g., 36, 72, 108, 144, 180, or 216 containers. There is no requirement that the number of containers equal the number of sort groups. Generally, the system may be configured such that there are fewer sort groups than containers (i.e., several containers are used for one sort group). In some embodiments, there may be more sort groups than containers; in such an embodiment, some of the sort groups may need to be deferred to another container (e.g., as discussed in detail here) for subsequent sorting. In one example, the collection point may comprise 180 collection containers and 120 sort groups.

In some embodiments, the collection point may comprise a collection bank configured to hold the collection containers. In some embodiments, the system may comprise a plurality of collection banks.

In certain embodiments, the designated collection point may further comprise a bin, container, or other type of receptacle. The receptacle may comprise a plurality of chutes, wherein each chute is paired with a unique collection container. In some embodiments, the system may be configured to permit each of the plurality of sorted vessels to travel through one of the chutes to the assigned collection container upon being disengaged from the runner. In some embodiments, the chute may be configured to reorient the vessel from a substantially horizontal position to a substantially vertical position. For example, in general the vessel may retain a substantially horizontal position when manipulated by the runner and as the runner traverses to the designated collection container at collection point. Moreover, the alignment of the vessels to the leading end of the vessel may be retained when the vessel is manipulated by the runner and as the runner traverses to the designated collection container at collection point (e.g., vessels positioned substantially perpendicular to the direction of the runner may maintain that orientation as they are being transferred from the sorter to the collection container. This alignment may affect the transfer of the vessel to the collection container through the plurality of chutes.

In certain embodiments, the top opening of each chute may be configured to be accessible to more than one runner, e.g., each chute may be configured to be accessible to two runners, but the bottom opening may only be able to access one container. In this way, the chute configuration permits a designated collection to be traversed by more than one runner. This configuration not only improves efficiency of the system, but also permits redundancy in the event that one runner is out of service for repairs or maintenance.

It may be desirable for the system to have a small footprint, which minimizes the space required, but also allows a large number of collection containers to be served by runners with shortened operational paths. A small footprint also allows an operator to access different parts of the system without having to traverse large distances.

Receiving Systems

Described herein are systems and methods for receiving a plurality of vessels. The invention may be embodied in a variety of ways.

Vessel receiving systems capable of consistently individually receiving a large volume of sample vessels from an upstream process can greatly improve operating costs and efficiency. For example, samples that are used for research and/or analysis applications may be placed within vessels and sent to a testing facility for processing and analysis. Some of these facilities may receive tens of thousands of individual samples vessels daily. By using an automated sorting system in conjunction with an automated receiving system, the sorting of the large number of vessels at a testing facility may be completed with greater speed and accuracy, thereby improving the overall costs and reliability of a testing facility. Other upstream processes may also benefit from a high speed system to receive and segregate vessels in an individual manner and for further processing.

In certain embodiments, the invention may comprise a system for receiving a plurality of vessels. A system for receiving a plurality of vessels may comprise: a collection bank configured to receive a plurality of vessels. The collection bank may comprise a plurality of chutes. The chutes may be formed by arranging an alignment component adjacent to an encasing panel. In some cases, a plurality of alignment components may be arranged adjacent to a plurality of encasing panels to form a plurality of chutes. The alignment component may comprise raised portions configured to direct or funnel a vessel from a first location to a second location. When an encasing panel is arranged adjacent to an alignment component, the encasing panel may contact the raised portions and a chute is formed. When the alignment component is in contact with an encasing panel, one or more gaps, openings, or entrances may be accessible at the top and a gap, opening, or exit may be accessible at the bottom of the chute. A vessel may enter the chute from either of the top openings, travel through the chute where the vessel contacts the raised portion of the alignment component, and exit the chute at the bottom opening. As the vessel travels through the chute, the orientation of the vessel may be altered through contact with the raised portions. For example, in certain embodiments, a vessel may enter a top opening in a substantially horizontal orientation according to a longitudinal axis of the vessel, contact a diverter located between the one or more openings and/or contact a two-step feature of the raised portion which changes the orientation from horizontal toward vertical to direct the vessel through the chute. The raised portion of the alignment component may become closer together toward the bottom of the alignment component such that the width of the chute decreases from top to bottom. As the vessel proceeds through the chute, the vessel may continue to contact the raised portions and continue to change orientation until the vessel is in a substantially vertical orientation according to a longitudinal axis at the bottom opening or exit of the exit of the chute.

The collection bank may further comprise a plurality of collection containers comprising an opening and a support structure configured to house each of the plurality of alignment components, encasing panels, and collection containers. In some embodiments, each of the plurality of alignment components may be configured to individually direct each of the plurality of vessels from an entry position to a collection point within the collection bank. In some embodiments, each of the plurality of encasing panels may be configured to enclose each of the plurality of alignment components.

In certain embodiments, each of the plurality of containers may be configured to receive and hold each of the plurality of vessels at a particular collection point. In some cases, each of the plurality of containers may be configured to transport the collected vessels for additional processing or analysis. In some cases, each vessel may be configured to hold a sample.

In some embodiments, each of the plurality of alignment components may be configured to reorient each of the plurality of vessels from a substantially horizontal position to a substantially vertical position. In certain embodiments, an alignment component may be bidirectional. In such cases, the alignment component may comprise a first side and a second side with a divider separating the first side from the second side. The first side and the second side may each comprise raised portions that form a chute when adjacent to an encasing panel. In other embodiments, an alignment component may comprise only one side with raised portions while the other side has no raised portion similar to an encasing panel.

In certain embodiments, the plurality of alignment components and encasing panels may be configured in a row and positioned in a vertical orientation with an encasing panel separating each of the plurality of alignment components in the row and an encasing panel at each end of the row. In some examples, the plurality of encasing panels and alignment components are configured to contact each other to form a plurality of chutes that are each configured to reorient a vessel from a substantially horizontal orientation to a substantially vertical orientation for delivery into a collection container. In some cases, the reorientation can provide for improved movement of the vessels within the system, such as faster processing times and fewer vessel obstructions, to increase efficiency of the collection system. For example, in an embodiment, the reorientation prevents vessels from blocking the opening of the collection container as can happen if the vessels are not oriented in a substantially vertical orientation (e.g., having the length of the vessel perpendicular to the container opening).

In some embodiments of the alignment component, the raised portion of a first side may different than the raised portion of a second side. In some embodiments, the raised portion of a first side may the same as the raised portion of a second side. In some cases, the chute formed by the first side may direct vessels to a proximate area of the collection system while a chute formed by the second side may direct vessels to a distal area of the collection system. In some embodiments, the depth of the raised portion is greater than the vessel diameter to facilitate orientation of the vessel In certain embodiments, the first side and second side of each of the plurality of alignment components each comprise a raised portion, where the raised portion may be configured to form a chute and provide a contact surface to reorient and funnel each of the plurality of vessels within the chute towards the opening of a collection container.

In some embodiments, the support structure may comprise at least one container shelf configured to hold the plurality of collection containers. In certain embodiments, the shelf may comprise a series of slots configured to align with the opening of each of the plurality of collection containers when the containers are placed in the system. Such slots may facilitate aligning the collection container openings with the exit point of the alignment component. Additionally, such slots may provide stability for the collection containers on the shelf. In some embodiments, the collection bank comprises an upper container shelf and a lower container shelf. In certain embodiments, the slots of the upper and lower container shelf may be offset such that the upper slots are approximately one half a container width offset from the lower slots. This offset can allow for a more compact arrangement of chutes and collection containers to help reduce the footprint of the collection system.

In some embodiments, the collection bank further comprises at least one positioning bar configured to align each of the plurality of alignment components in the support structure. In some cases, the collection bank may comprise a set of upper positioning bars and a set of lower positioning bars. In some embodiments, the collection bank may further comprise a connector tube, where the connector tube is configured to protrude from the slots in the container shelf and connect the opening of each of the plurality of collection containers to a designated chute.

In some embodiments, the collection unit comprises a cover configured to provide access to the collection containers and alignment components. In one example, the cover panel may be easy to open, yet provide protection from dust and other substances and prevent foreign objects from entering the collection unit. In certain examples, the cover panel may include gull wing door or other types of covers. Optionally, the cover may provide visibility to the system when the cover is closed.

In certain embodiments, the plurality of alignment components and encasing panels may be configured to align in a row on the support structure such that a pair of alignment components and encasing panels produce a confined space or chute configured to funnel vessels from the top of each of the plurality of alignment components to the bottom of each of the plurality of alignment components. In an embodiment, identifying indicia on the vessel is used to determine which vessels enter which chute. In some examples, the bottom outlet of the chute may be approximately the same size as the opening of one of the collection containers and a connector tube. Optionally, the containers are arranged on a support structure that comprises a top and a bottom container shelf. In some cases, each of the plurality of alignment components has a first side and a second side, where the first side of each of the plurality of alignment components and encasing panels funnel each of the plurality of vessels through a chute to a designated collection container staged on the front side of the system and the second side of each of the plurality of alignment components and encasing panels funnel each of the plurality of vessels through a chute to designated collection container staged on the rear side of the system. In some cases, the connector tube may be configured to protrude from the slots in each container shelf and connect the opening of each of the plurality of collection containers to the confined space of each pair of the plurality of alignment components and encasing panels.

In some examples, an inlet of the chute may be wider than an outlet of the chute. In certain examples, the distance between the raised portion at the top of the chute may approximate the length of a tube and the distance between the raised portion at the bottom may approximate the width of the tube. For example, for typical clinical tubes the inlet of the chute may range from 13 to about 20 cm. The width of the outlet may approximate the diameter of the vessel that is being delivered via the chute (e.g., about 1 cm to about 2.5 cm). In this way, the chute may deliver vessels that are held in a first position (e.g., substantially horizontal) to a position which is about 90 degrees from the original orientation (e.g., substantially vertical).

In some embodiments, each chute may be configured to direct each of the plurality of vessels from a plurality of entry points to a single collection point. In some embodiments, the chute further comprises a diverter configured to direct each of the plurality of vessels to a front or rear section of each alignment component. In certain embodiments, the chute further comprises a two-step feature at the rear side to further direct and reorient each of the plurality of vessels entering the chute from a rear entry point. In some embodiments, the chute may further comprise a substantially vertical section and the diverter may be angled away from the two-step feature. In some embodiments, a diverter on the second side of the alignment component may be substantially diamond-shaped, but other shapes may be used. In some examples, each of the plurality of alignment components further comprises a notch at the bottom of the front edge configured to align the plurality of alignment components within the system.

In some embodiments, an apparatus for guiding an article, may comprise a raised portion in a substantially Y-shape and a first side and a second side, wherein the raised portion provides a contact surface for the article and is configured to direct an article from a top of the apparatus to an outlet at the bottom of the apparatus. In some embodiments, the raised portion forming the chute ranges from 1 to about 10 cm in depth (i.e., width from the first side to the second side). In certain embodiments, the chute may be about 3 cm to about 4 cm in depth.

In some embodiments, the systems described herein may further comprise a shield configured to cover the systems. In certain embodiments, the shield may be substantially transparent. In one example, the system has a cover, such as gull wing doors or other doors, that are easy to open, yet provide protection from dust or other substances.

In some embodiments, the system may comprise a plurality of sensors that provide feedback to a central processing unit. In some embodiments, a feeding system may comprise sensors related to the level in a presorting container such as a bin or feed bin and vessel motion on a transporter and/or transfer belt that may be used to deliver vessels to an entry point of the collection system. The system may slow or stop portions of system or may reallocate assignments within the system based on the feedback received from a plurality of sensors.

Collection Apparatus

Also described herein is an apparatus for collecting and transporting a plurality of vessels. The collection-transport apparatus may be embodied in a variety of ways. In some embodiments, the apparatus may comprise a substantially rectangular base and walls connected to the base, where the base and walls define an interior volume of the apparatus. The walls may comprise a front wall, a rear wall, a first side wall, and a second side wall. The apparatus may further comprise a top connected to the first side wall and second side wall, where the top comprises a first top surface and a second top surface that are substantially perpendicular to the first side wall and second side wall. In some embodiments, the substantially rectangular base may provide stability so that the container will not overturn, even when filled with sample vessels. In some embodiments, the sidewalls may be straight for efficient packing for accepting vessels for space-efficient systems, such as a high-throughput vessel sorting systems.

The apparatus may be portable and comprise a first handle connected to the first top surface and second top surface and a second handle connected to the rear wall of the apparatus. In certain embodiments, the first handle may be substantially coplanar with the first top surface of the apparatus. In some embodiments, the second handle may be substantially perpendicular to the first handle. Optionally, the first handle may be connected to the second handle. In some examples, the first handle aligns with the top of the apparatus for ease of carrying the apparatus, even when the container is filled with vessels. In some embodiments, the first handle may be hollow, and may be separated from the interior volume of the apparatus by the second top surface to prevent an implement vessel from entering the handle. The second handle may provide a secondary gripping point for transporting an apparatus that is filled or partially filled with vessels. The second handle may allow an operator of a vessel sorting system to remove the apparatus from a collection shelf along a horizontal path to decrease the space requirements of the sorting and collection system.

In some embodiments, the apparatus may further comprise a panel that defines an opening. The apparatus may be configured to receive a plurality of implements through the opening. In some examples, the implements comprise sample vessels, including biological sample vessels. In certain embodiments, the opening may be substantially rectangular in shape and the panel may be connected to the first top surface to the front wall. In other embodiments, the opening may be circular or oval in shape. In some cases, the panel with the opening may be positioned at an approximately 45 degree angle from the first top surface, and may be mated to a chute which may direct vessels into the apparatus. For example, the panel with the opening may be positioned at an approximately 30 degree, 35 degree, 40 degree, 45 degree, 50 degree, 55 degree, or 60 degree angle. In some embodiments, the angle of opening allows for horizontal movement of the apparatus away from a chute and connector tube without requiring movement or adjustment of the chute. Optionally, the panel may further comprise a lip at the edge of the opening, where the lip may be configured to mate with a cap.

The systems described herein may be configured to supply vessels having various shapes or dimensions. In some embodiments, each of the plurality of vessels may range in size from 75 millimeters (mm) to about 125 mm in length and about 8 to about 16 mm in diameter. For example, the vessel may be 8 mm, 10 mm, 12 mm, 14 mm, or 16 mm in diameter. For example, the vessel may be 75 mm, 80 mm, 90 mm, 100 mm, 110 mm, or 125 mm in length.

In some examples, a size of the opening ranges from 5 to 25 centimeters (cm) in width and 5 cm to 25 cm in height. In some examples, the width of the opening is 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, 21 cm, 22 cm, 23 cm, 24 cm, or 25 cm. In some examples, the height of the opening is 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, 21 cm, 22 cm, 23 cm, 24 cm, or 25 cm.

In some embodiments, the apparatus may comprise an injection moldable plastic, such as polyethylene terephthalate (PET), acrylonitrile butadiene styrene (ABS), nylon polyamide (PA), polycarbonate, polypropylene, low-density polyethylene (LDPE), acetal, or high impact polystyrene. In certain embodiments, the apparatus may be a collection container in a sorting system or collection system. In some examples, the apparatus may be a collection bin.

In certain embodiments, each of the plurality of collection containers may comprise a radio frequency identification (RFID) tag. In some cases, the RFID tag may be configured to receive location and vessel information when each of the plurality of containers is loaded in the support structure.

In certain embodiments, each of the plurality of collection containers may be configured to be associated with a chute formed by one of the plurality of encasing panels and one of the plurality of alignment components, where the association may be based on a sorting parameter (i.e., such as an indicia that identifies the type of sample or the type of analysis to be performed on the sample) of each of the plurality of vessels.

Feeding System

Described herein are systems and methods for supplying a plurality of vessels. The invention may be embodied in a variety of ways.

Vessel supply systems capable of consistently supplying a large volume of sample vessels into a downstream process individually, with the vessel orientation aligned with the requirements of the downstream processes (e.g., sorting units) can greatly improve operating costs and efficiency. For example, samples that are used for research and/or analysis applications may be placed within vessels and sent to a testing facility for processing and analysis. By using an automated sorting system in conjunction with an automated supply system, the sorting of the large number of vessels at a testing facility may be completed with greater speed and accuracy, thereby improving the efficiency and reliability of a testing facility while reducing operating cost. Other downstream processes may also benefit from a high speed system to supply vessels that have been sorted from a random mass, and have been individuated and realigned from a random orientation to the orientation required by the process.

In certain embodiments, the system may further comprise at least one feeding system configured to supply a plurality of vessels to the entry position of the at least one sorting unit.

In some embodiments, the feeding system may comprise a feed bin, at least one transporter, and at least one second transfer belt. In some cases, the feed bin may be substantially trapezoidal in shape and comprise a bottom surface, a substantially open top, a front, a back, an A-side and a B-side. The A-side and B-side of the feeding system may be the same as, or different than, the A-side and B-side of the sorting unit. In some embodiments, the feed bin may be configured to feed each of the plurality of vessels from an entry position at the top of the feed bin to at least one edge position of the bottom surface. In certain embodiments, the at least one transporter may be positioned at least one of the A-side or the B-side of the feed bin. In an embodiment, the A-side and the B-side of the bin are on opposite sides of the bin. In some embodiments, the at least one transporter may be configured to receive each of the plurality of vessels from the at least one edge position and transport each of the vessels to the second transfer belt. In some embodiments, at least one second transfer belt may be positioned at the exit of the at least one transporter and at or near the top of the bin. In some embodiments, the second transfer belt may be configured to receive at least some of the plurality of vessels from at least one transfer point and individually transfer individual vessels from the at least one transfer point to a bin exit position within the system. In some examples, bin exit position within the system may be a second transfer belt.

In some embodiments, the systems comprise a feed bin that is operable to receive a plurality of unsorted vessels. The feed bin may be large enough to hold vessels in the quantity shipped and received. The feed bin may be large enough to hold vessels in large range typical of quantity shipped to and received by a large commercial testing facility. For example, in some embodiments, the feed bin may be configured to hold at least 30, 50, 100, 150, 200, 250, or more vessels. In some embodiments, the plurality of vessels may comprise a random orientation upon entry into the feed bin. In some embodiments, the feed bin may be configured to gravity-feed the vessels to the transporter, such as by having sloped sides and/or a non-flat bottom surface. In some cases, an operator or a robot may load the unsorted and unoriented vessels in the feed bin. In some embodiments, the feed bin may comprise a substantially trapezoidal shape, with a smaller bottom surface than top.

In some embodiments, the feed bin may further comprise an interior slope due to the slope of the A-sides and B-sides configured to direct each of the vessels toward the bottom of the feed bin. In certain embodiments, the bottom of the feed bin may comprise a wedge configured to direct the plurality of vessels to the edge of the bottom of the bin and onto the at least one transporter. In some embodiments, the wedge may be located near the center of the bottom surface of the feed bin and may be configured to direct the plurality of vessels to both the A-side and B-side of the feed bin. In some embodiments, the distribution of the plurality of vessels may be substantially balanced, such that the feed bin directs approximately one-half of the plurality of vessels to the A-side of the feed bin. In certain embodiments, the feed bin may further comprise a front side and a rear side, wherein the feed bin is configured to receive the plurality of vessels for feeding at either the front side or the rear side. In some embodiments, the feed bin may further comprise at least one angled corner element positioned at the convergence of the A-sides and B-sides and the front and back sides of the feeder bin and having a slope 45 degrees or more from the vertical. In some embodiments, the system may comprise more than one feed bin.

The transporter may be configured to orient each of the plurality of vessels during transfer from the feeder bin to the second transfer belt. In some embodiments, an operating path of the at least one transfer belt may be substantially perpendicular to a direction of advancement of the at least one transporter. In some embodiments, the transporter may be a staircase singulator or step feeder, although other transporters can be used. In certain embodiments, the at least one transporter may comprise a series of steps configured to individually transfer each of the plurality of vessels from one step to the next step in the series. In some embodiments, each step comprises a ledge and riser, wherein each riser may be configured to: (i) lift each of the plurality of vessels from the bottom edge surface of the bin to an elevation stage adjacent to the ledge of the next step of the at least one transporter; (ii) transfer each vessel to that ledge, and (iii) return back to the bottom surface of the bin. In certain embodiments, the height of the elevation stage is greater than the height of the ledge of the next step in the series. In some cases, the depth of the ledges of the steps are configured to decrease through the transporter, with the ledge of the lower step being deeper than the ledge of the upper step. Multiple vessels may become arranged on the lowest step in a random fashion and rise to the next ledge in the series of steps. As the depth decreases, only those vessels aligned with the ledge may proceed on the riser to the subsequent ledge in the series. Vessels not aligned, may tumble back into the feed bin among the plurality of vessels. The alignment and tumbling action aid in the random nature of the feed system described herein.

In some cases, the steps may be configured to align each of the plurality of vessels in a single file arrangement and/or in an end-to-end arrangement at the at least one transfer point. In some embodiments, each ledge and each riser are each configured to hold more than one vessel in a horizontal and longitudinally tandem fashion parallel to the A and B-sides of the bin. In some embodiments, the ledge and the riser of each step may be configured to bevel away from the feed bin toward the back of the transporter to bias the vessel to stay on the ledge toward the back of the step. In some cases, the bevel angle is approximately 10 degrees. In other cases, the bevel angle may be 5 degrees, 15 degrees, 20 degrees, 25 degrees, or any degree between 5 and 25 degrees.

In some embodiments, each ledge and each riser may further comprise a wavy surface configured to align each of the plurality of vessels in a substantially horizontal orientation with the longitudinal axis of the vessel along the ledge or riser. In some cases, the wavy surface may have a sinusoidal shape. In some cases, the wavy surface may comprise a series of triangular shapes, sharp peaks, or rounded peaks. In some embodiments, the wavy surface may be configured to return each of the plurality of vessels not oriented in a substantially horizontal orientation back into the feeding bin. In certain embodiments, the series of steps are configured to operate together as a unit, rising and lowering at the same time. In some embodiments, the final step and exit of the at least one transporter is substantially aligned with the at least one transfer belt. In some cases, the surface of the ledge and riser comprises a plastic material. In some cases, the surface of the ledge and riser does not comprise a non-stick material or a fluorinated material.

In some embodiments, the speed of the first transfer belt of the sorting unit may operate at a greater speed than a speed of the second transfer belt of the feeding system. The difference in the speed of the belts can generate a timing gap within the feed system. In some embodiments, a timing gap between the speed of the first and second transfer belts may be substantially the same as the time for reading the identification region of the vessel. In some embodiments, the timing gap may be greater than the time for the reading of the vessel information. In some embodiments, the second transfer belt may be configured to seek a condition state of the first transfer belt to determine an operating state of the second transfer belt. In particular, the second transfer belt may confirm that the first transfer belt is operating and request feedback on the speed of the belt. By checking the condition states within the system, the system may prevent bottlenecks and undesirable jams within the system.

In some embodiments, the first transfer belt comprises a rubberized material. In some embodiments, the second transfer belt comprises a rubberized material. In certain embodiments, the rubberized material of the second transfer belt may comprise a plurality of raised elements configured to assist in the transfer of vessels. These raised elements may be configured perpendicular to the operating direction of the belt to bump each of the vessels and begin to move the vessels forward on the belt.

In some cases, each the plurality of vessels includes more than one identifying indicia. In some cases, the system may be configured to feed the plurality of vessels in a random nature. By feeding the downstream processes randomly, the loading of a subsequent system (e.g., a sorting system) being supplied may be better balanced. For example, if the downstream system sorted the vessels into groups, the system may become bottlenecked if the feed system fed a slug or group of vessels all designated to the same sort group at the same time.

In some embodiments, the system may comprise two feed bins. In some embodiments, the system may comprise more than two feed bins. In some embodiments, the feed system may comprise at least one transporters and at least one second transfer belt. In certain embodiments, the feed system may comprise two transporters and two second transfer belts, where one transporter and one second transfer belt pair are associated with the A-side of the feed bin and the second transporter and second transfer belt pair are associated with the B-side of the feed bin.

In some embodiments, the feed bin comprises a cover panel configured to provide access to the feeder bin. In some embodiments, system may further comprise a shield configured to cover the system. In certain embodiments, the shield may be substantially transparent. In one example, the system has a cover, such as gull wing doors, that are easy to open, yet provide protection from dust or other substances and prevent foreign objects from entering the feed system. Optionally, the cover may provide visibility to the system when the cover is closed.

In certain embodiments, the feeding system may further comprise an inspection table or ledge adjacent to the feed bin. The inspection table may be configured to control at least part of the vessels that enter and exit the bin. For example, the inspection table may provide for the shipment of vessels to be evaluated for quality, contamination, and foreign objects prior to loading the plurality vessels into the feed bin. In some cases, the inspection table may be configured to permit removal of each vessel not meeting system requirements. The inspection table may also provide for the shipment of vessels to be evaluated for compatibility with the sorting system prior to loading the feed bin.

In some embodiments, the system may be configured to return vessels to the feeding bin that are fed to the sorting unit, but that are unable to be sorted. Vessels may be returned for various conditions. For example, vessels with information not readable by the reader may be returned to the feeding bin. In some embodiments, vessels that are not readable by the reader may be sorted in a designated generic group for subsequent sorting. Having a designated generic group for unreadable vessels may improve the efficiency of the system by eliminating re-feeding the same unreadable vessel to the system. In some examples, vessels with no active collection point may be returned to the feeding bin. The collection point may be inactive because no collection container is positioned when the reader reads the vessel. The collection point may be inactive because the collection container is full, no collection container is designated for the sorting group of the vessel, or the collection container is otherwise unavailable to receive the vessel when the vessel is read by the reader. The collection point may be inactive because the vessel has no identified sorting group. In some embodiments, vessels without a designated sorting group may be sorted in a designated generic group for subsequent sorting. Having a designated generic group for vessels without a sorting group may improve the efficiency of the system by eliminating re-feeding the same undesignated vessels to the system. Additionally, in some embodiments, the system may be configured to return vessels that are not engaged by a runner to the feeding bin. The runner may not engage vessels because the runner is out of service or the collection container became unavailable between the time of the reader read the vessel and the runner should engage the vessel.

Sensors

In some embodiments, the system may comprise a plurality of sensors that provide feedback to a central processing unit. In some embodiments, the sorting unit may comprise sensors related to conditions for the manipulator position, manipulator grippers, the end component, the reader, the placement of vessels on the transfer belts, among others. In some embodiments, the feeding system may comprise sensors related to the level in the feed bin, and/or vessel motion on the transporter and/or transfer belt. In certain embodiments, the collection bank may comprise sensors related to the flow path within the chute, transfer path to the collection container, and container position. In some embodiments, the runner may comprise sensors related to runner position and status an operating path. The system may slow or stop portions of system or may reallocate assignments within the system based on the feedback received from the plurality of sensors.

In some embodiments, the collection system may include various sensors to provide feedback on the system status to an operator or monitoring system. In some embodiments, the support structure may comprise an indicator light for each of the plurality of collection containers, where the light may be configured to provide feedback on an operating condition of each of the plurality of collection containers. Conditions monitored can include parameters such as fill level of a container, obstruction in a chute, and obstruction in a connector tube. Conditions of downstream processing may also be indicated in the collection system. For example, a downstream process can signal demand for vessels having a particular parameter.

In some embodiments, the feed system may comprise a plurality of sensors that provide feedback to a central processing unit or monitoring system. In some examples, the sensors may provide feedback on the system status to an operator or downstream process. In some embodiments, the feeding system may comprise sensors related to the level in the feed bin, vessel motion on the transporter, and vessel motion on the transfer belt. The system may slow or stop portions of system or may reallocate assignments within the system based on the feedback received from the plurality of sensors.

In some embodiments, the sensors may comprise a photoelectric sensor. In certain embodiments, the sensor may comprise a through-beam sensor. Through-beam sensors monitor a system for changes in light emittance. An object may interrupts or reflects light, which may be detected by a sensor 10 meters or more away from a monitoring point. Other sensor methods may be employed as known by those skilled in the art.

Turning to the non-limiting figures, FIG. 1 depicts one embodiment of a modular vessel sorting system 1000 comprising one sorting unit 100, one collection bank 200, and one optional feeding system 300. The optional feed system 300 is configured to supply each vessel to the front side of the sorting unit 100. The collection bank 200 is positioned to the side of the sorting unit 100, and comprises a plurality of assigned collection containers 220 and an array of chutes 210. The sorting system 1000 in FIG. 1 is configured to sort up to 4,000 vessels per hour and to sort the vessel in up to 36 sort groups.

Figure 2:
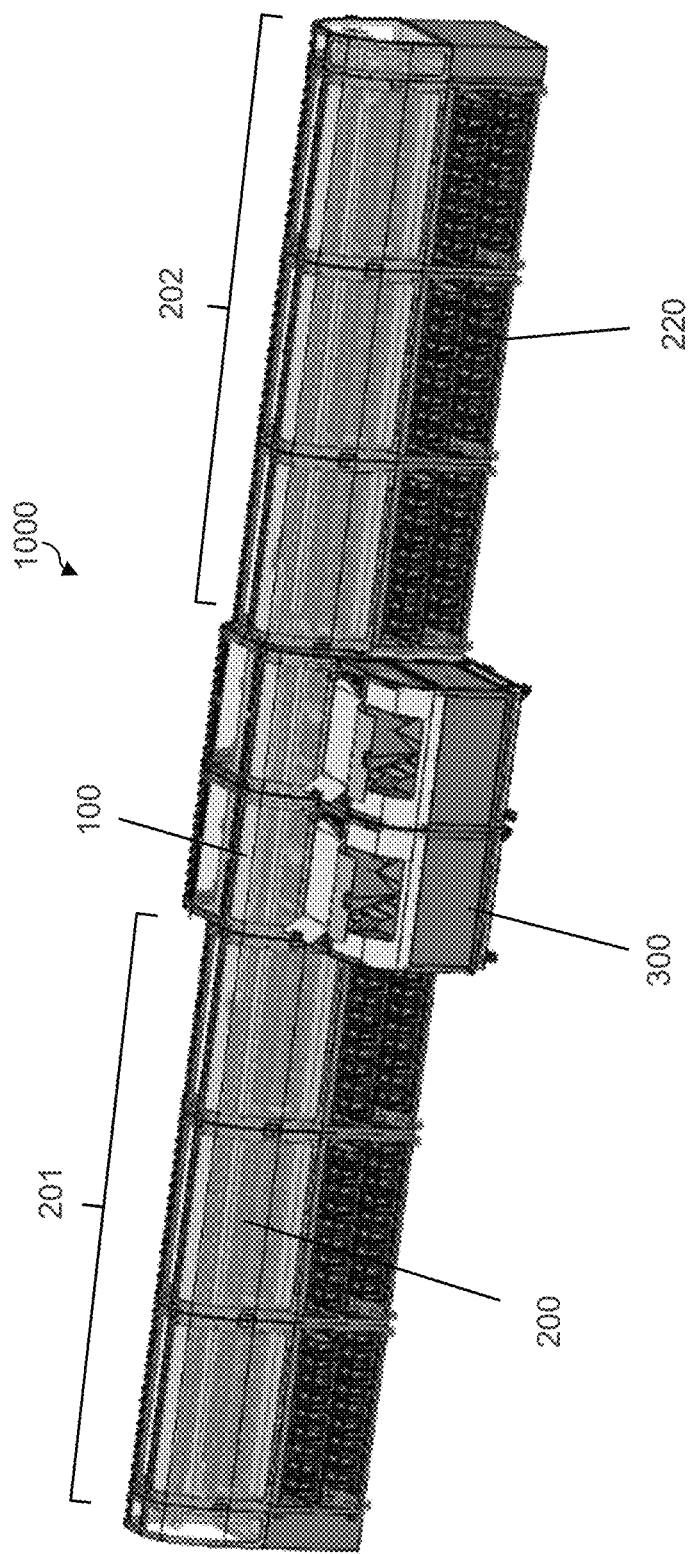
FIG. 2 shows a perspective view of a system for sorting a plurality of vessels according to one embodiment described herein, where the system of FIG. 2 has more sorting units and collection points than the system of FIG. 1.

FIG. 2 depicts one embodiment of a modular vessel sorting system 1000 comprising two sorting units 100 positioned adjacent to each other, six collection banks 200, and two optional feeding systems 300. The optional feed systems 300 are each configured to supply vessels to the front side of one of the sorting units 100. The collection point is split to the sides of the sorting units 100, with three collection banks on the A-side 201 and three banks on the B-side 202 of the system, where each bank comprises a plurality of assigned collection containers 220. The sorting system 1000 in FIG. 2 is configured to sort up to 8,000 vessels per hour and to sort the vessel in up to 216 sort groups.

Figure 3:
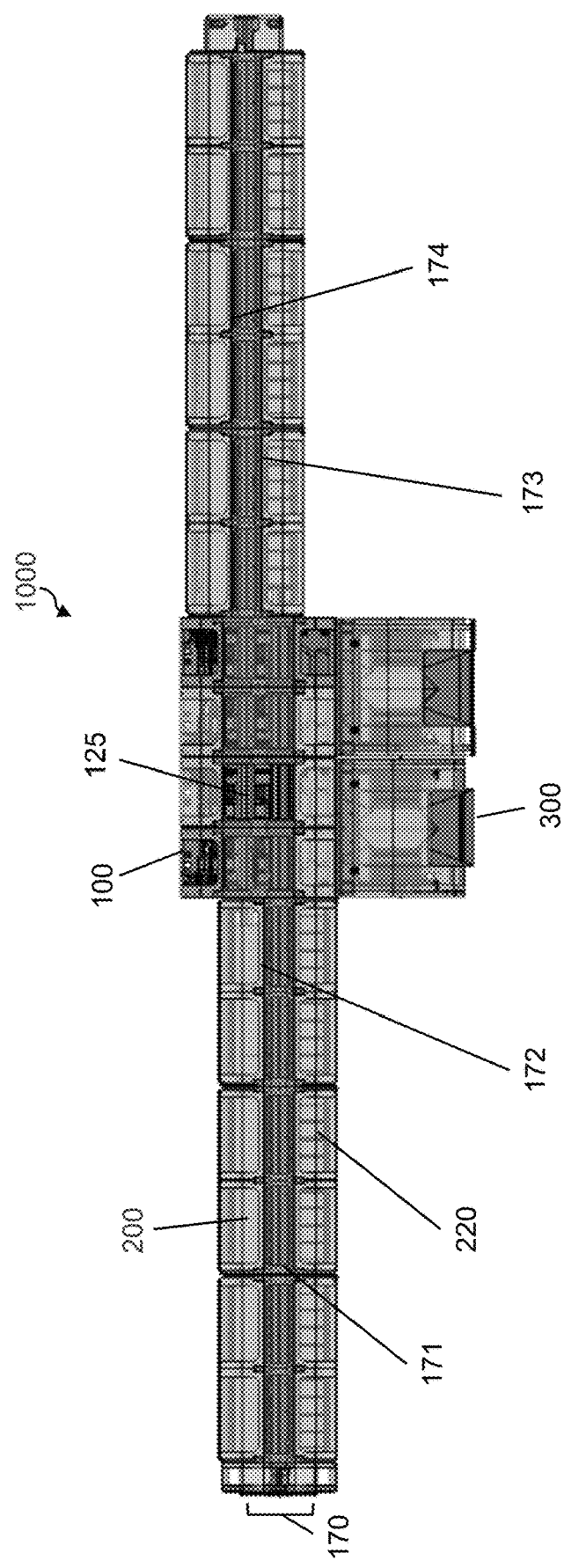
FIG. 3 shows a top view of a system for sorting a plurality of vessels according to one embodiment described herein.

FIG. 3 is a top view of the system shown in FIG. 2. As shown in FIG. 3, each collection bank 200 comprises a front side and a rear side, each side comprising a plurality of assigned collection containers 220. The operating paths 171, 172, 173, 174 of the runners 160 (refer to FIG. 8) are parallel to one another, with each runner 160 aligning with a stage of the nesting belts 125 of the sorting units 100. The operating paths of the runners span each of the sorting units 1000, however, the only the A-side runners (using 171 and 172) can access the A-side collection banks 200. Likewise, only the B-side runners (using 173 and 174) can access the B-side collection banks 200.

Figure 4:
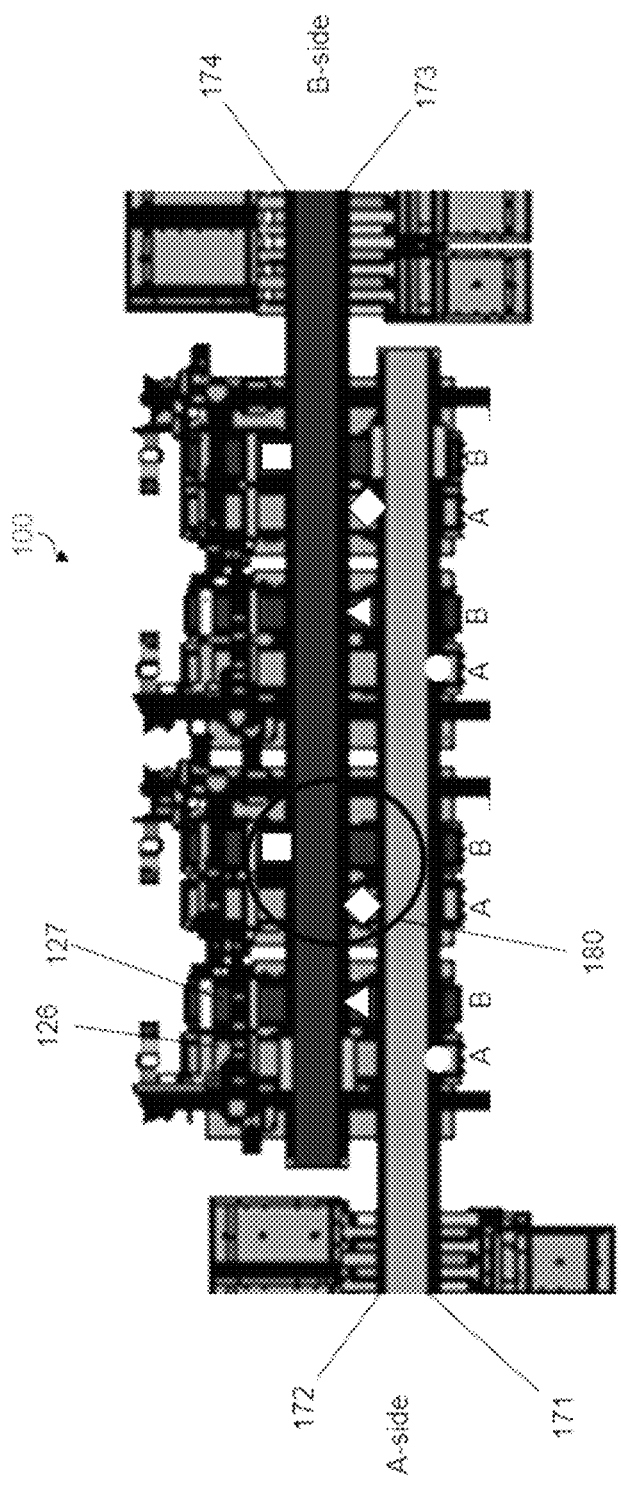
FIG. 4 shows a top view of a sorting unit comprising four nesting belts according to one embodiment described herein.

FIG. 4 depicts a top view of a sorting system 100 according to one embodiment. The system 1000 comprises four sorting units 100, wherein each sorting unit 100 comprises two nesting belts comprising a first nesting belt 126 and a second nesting belt 127, wherein the first nesting belt 126 and second nesting belt 127 are adjacent to one another, wherein each nesting belt comprises at least two active stages 180. The assignment of a runner to an active stage of a nesting belt may be optimized for each system. An example of the distribution of active stages to runners is indicated by the paired circles on each belt. As shown for this embodiment, the runner on the front of the A-side of the system will engage vessels from two nesting belts at stage 6—the first nesting belt 126 of the first sorting unit 100 and the first nesting belt 126 of the third sorting unit 100—and traverse along operating path 171 to the A-side collection bank 201 (partially shown in FIG. 4; refer to FIG. 2) to the designated collection container 220 (refer to FIG. 2). Likewise, the runner on the rear of the B-side of the system will engage vessels from two nesting belts at stage 3—the second nesting belt 127 of the second sorting unit 100 and the second nesting belt 127 of the fourth sorting unit 100 and traverse along operating path 174 to the B-side collection bank 202 (partially shown in FIG. 4; refer to FIG. 2) to the designated collection container 220 (refer to FIG. 2).

Figure 6B:
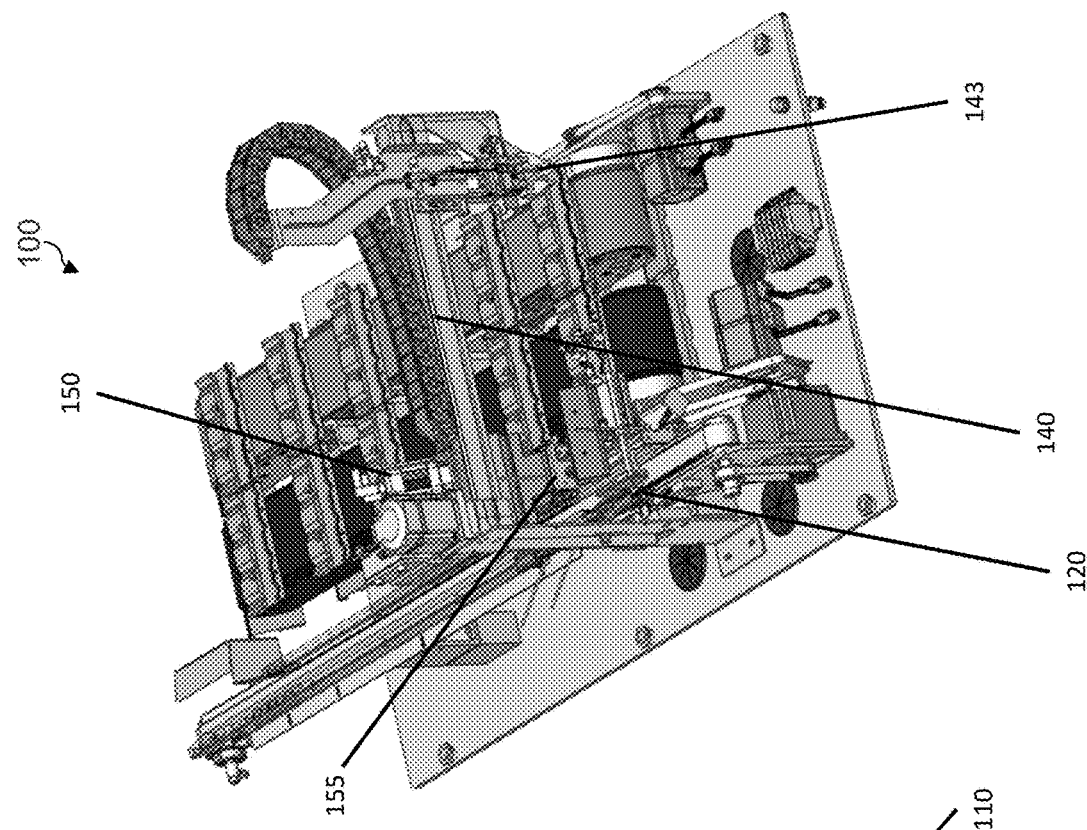
FIG. 6B shows a perspective view of a sorting unit according to one embodiment described herein.
Figure 6A:
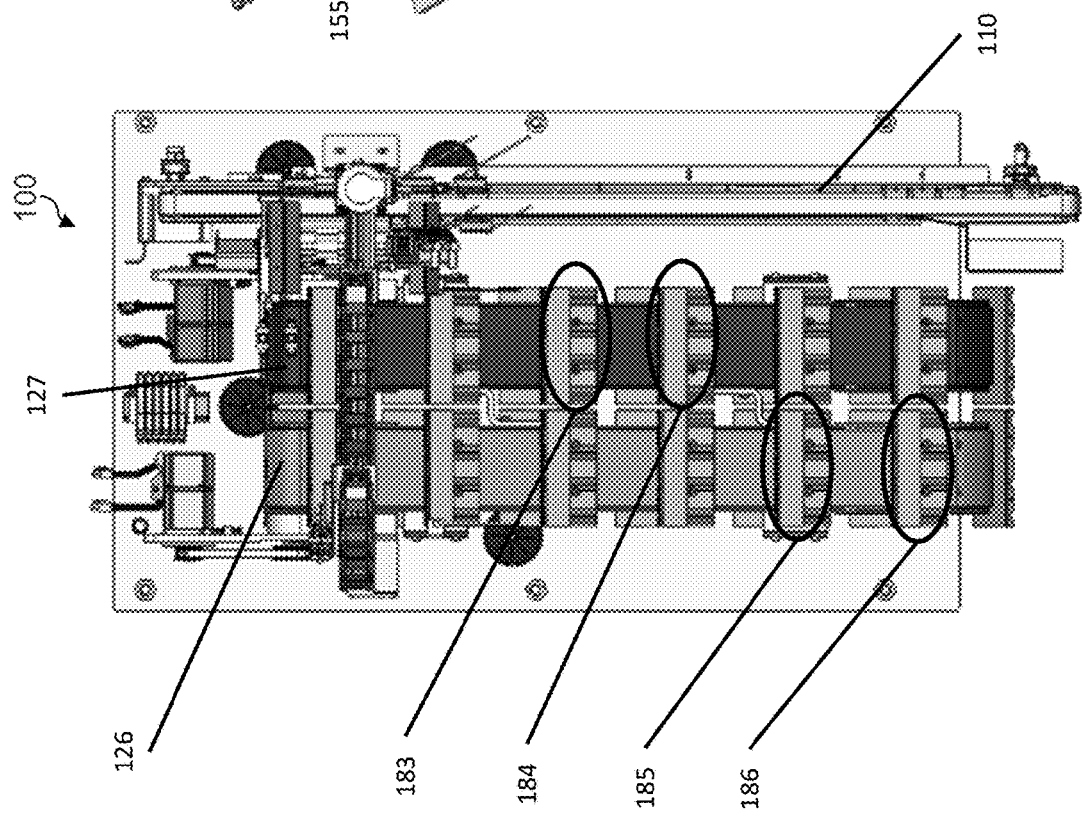
FIG. 6A shows a top view of a sorting unit according to one embodiment described herein.

FIGS. 5A, 5B, 6A and 6B depict a sorting unit 100 according to one embodiment of the sorting system 1000. FIGS. 5A and 6A provide a top views and FIGS. 5B and 6B provides a perspective views. FIGS. 6A and 6B provide additional detail of the components shown in FIGS. 5A and 5B. The sorting unit 100 comprises a first transfer belt 110 that transfers a vessel to the end component 120, which aligns the vessel for the reader 150. The rotational element 155 rotates each vessel to enable the reader 150 to read the information region of a vessel. The reader 150 assigns a nesting belt 126 or 127 to each vessel according to the configuration of collection point and location of the designated collection container 220 within the collection point. The manipulator 140 places the vessel on nesting belt A (first nesting belt) 126 or nesting belt B (second nesting belt) 127 at stage one 181 for transport by one of the runners 160. Each stage of the nesting belt comprises a nest 145, wherein the nest comprises slots 147 to hold each vessel until engaged by the runner. The vessels are placed on a nest 145 in an available slot 147 by the manipulator 140. The manipulator 140 traverses the nesting belt using a deck track and manipulates each vessel with grippers 143. Each nesting belt advances through finite stages three, four, five, and six (183-186), pausing at each stage to align with each runner 160 and provide access for the assigned runner 160 to engage the vessels on the nesting belt 126/127. Optionally, vessels not engaged by a runner 160 are transferred from the nesting belt to a recirculation chute where the vessels may be returned to an optional feed system. In some examples, a sample may return to a feed system at stage 7 of the nesting belt.

Figure 7:
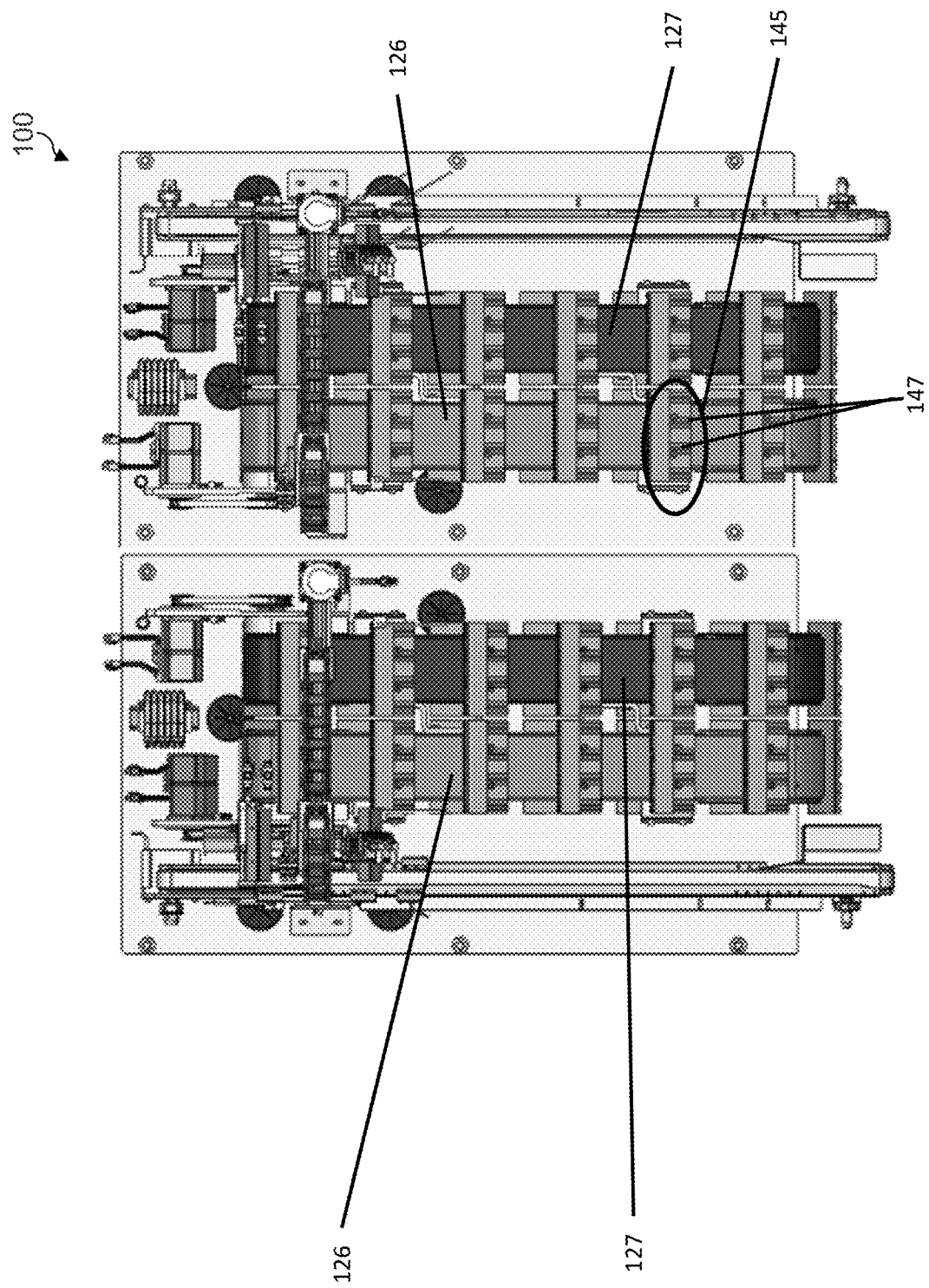
FIG. 7 shows a top view of a sorting unit comprising two nesting belts according to one embodiment described herein.

FIG. 7 depicts the sorting unit of FIG. 5 and shows the nests 145 on each stage of the nesting belt and the associated slots 147 within each nest 145. In one embodiment, each nest 145 comprises 4 stages per belt. The sorting unit 100 of FIG. 7 comprises 16 available slots for each stage. In the configuration shown, the sorting unit 100 of FIG. 7 may carry and stage up to 96 vessels for transfer to the collection point.

Figure 8:
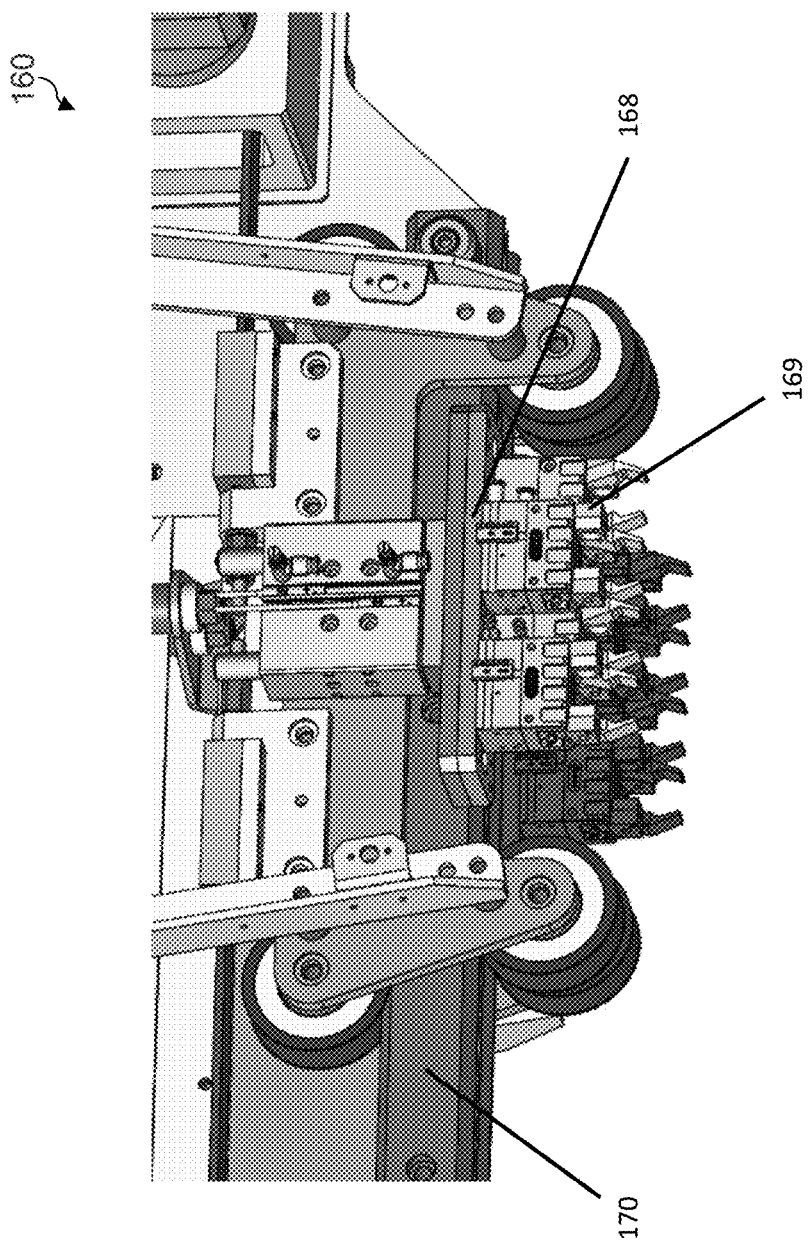
FIG. 8 shows a perspective view of a runner according to one embodiment described herein.

FIG. 8 shows a runner 160 according to one embodiment of the sorting system 1000. The runner 160 is configured to traverse along an operating path 170 between a sorting unit 100 (refer to FIGS. 1 and 2) and a collection point 200 (refer to FIGS. 1 and 2). The runner 160 comprises a gripper head 168 on the front and rear of the runner 160. Each gripper head 168 comprises a plurality of grippers 169. In the configuration shown, each gripper head comprises 4 sets of grippers 169, where each pair of grippers 169 are aligned in a staggered arrangement.

Figure 9:
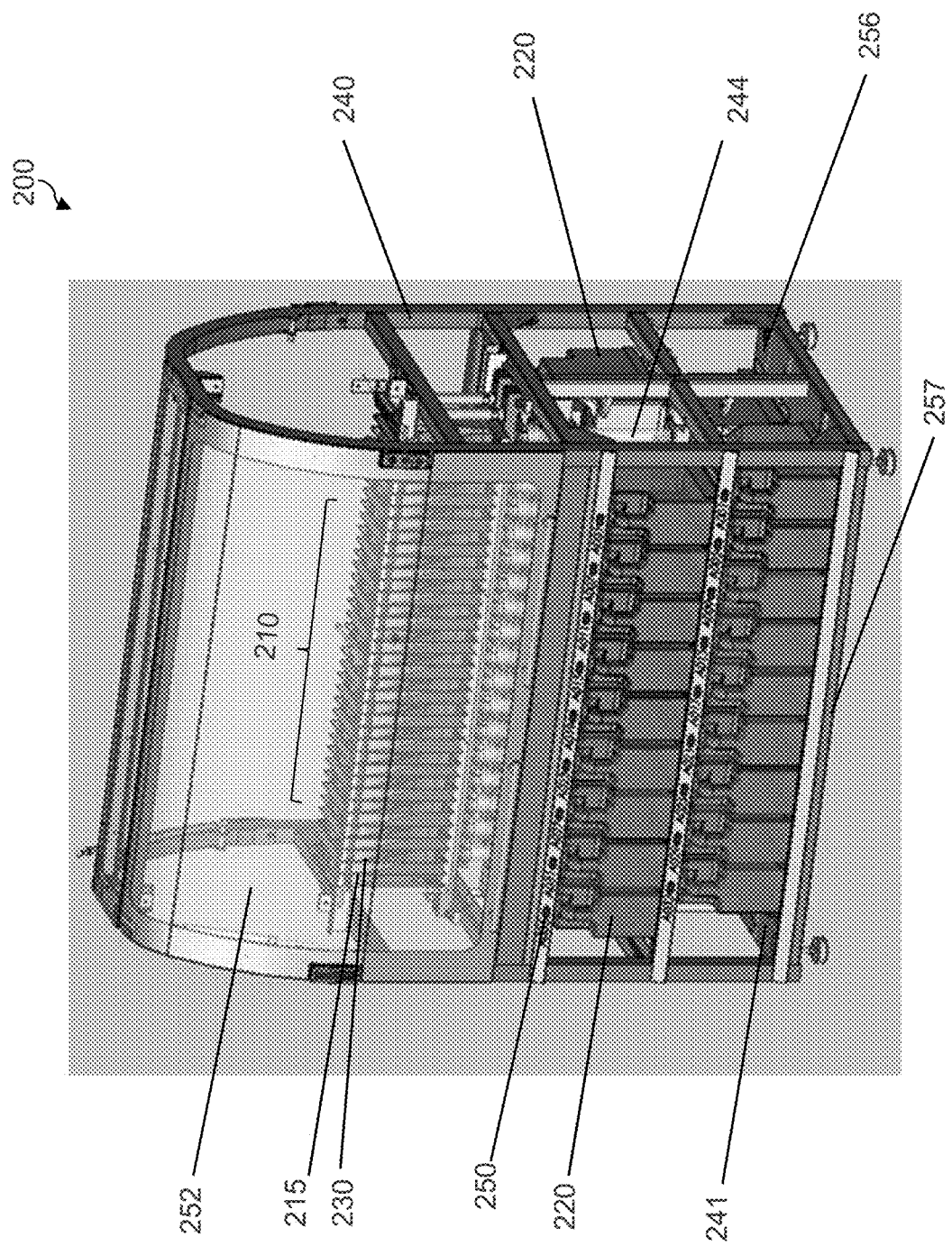
FIG. 9 is a perspective view of a collection bank comprising an array of chutes according to one embodiment described herein.

FIG. 9 shows one example of a collection bank 200 comprising an array of chutes 210. Although not depicted in FIG. 9, the operating path 170 of a runner 160 extends the length of the bank 200 and may traverse a first bank to transfer vessels to a second or third (or more) bank as depicted in FIG. 2. Each chute 210 is configured to receive a vessel from either runner 160 serving the bank 200 and direct the vessel to an assigned collection container 220. Thus, the distance traveled by the runner 160 when the runner 160 disengages the vessel determines which collection container 220 the vessel is placed. Each chute 210, formed by alignment components 215 and encasing panels 230, is configured to receive a vessel and direct the vessel to an assigned collection container 220. In some examples, a vessel may pass through a connector tube 244 from a chute 210 to a collection container 220. Collection containers 220 may be stacked in multiple rows in a staggered orientation on both the front and back sides of the collection bank 200 on container shelves 241. In some examples, the entrance to the connector tubes may be arranged in an alternating arrangement associated with the exit direction of the chute 210, where a chute on a first side may direct to a proximate side 255 and a chute on a second side may direct to a distal side 256 of the collection system. According to one embodiment, the system may have, for example, two rows of collection containers 220 and each row having nine collection containers 220, for a total of 36 collection containers 220 per collection bank 200. Other configurations are possible and the system may have fewer than two rows or more than two rows. Each row may include fewer than nine or more than nine containers. Each collection bank may have fewer than 36 or more than 36 containers. Optionally, each collection container 220 may have an associated indicator light 250 configured to convey information to an operator, such as the fullness of the container. an optional cover 252, Gullwing doors, or other types of cover, may provide dust protection and accessibility to a source of vessels and the chutes 210 and runners 160.

Figure 10:
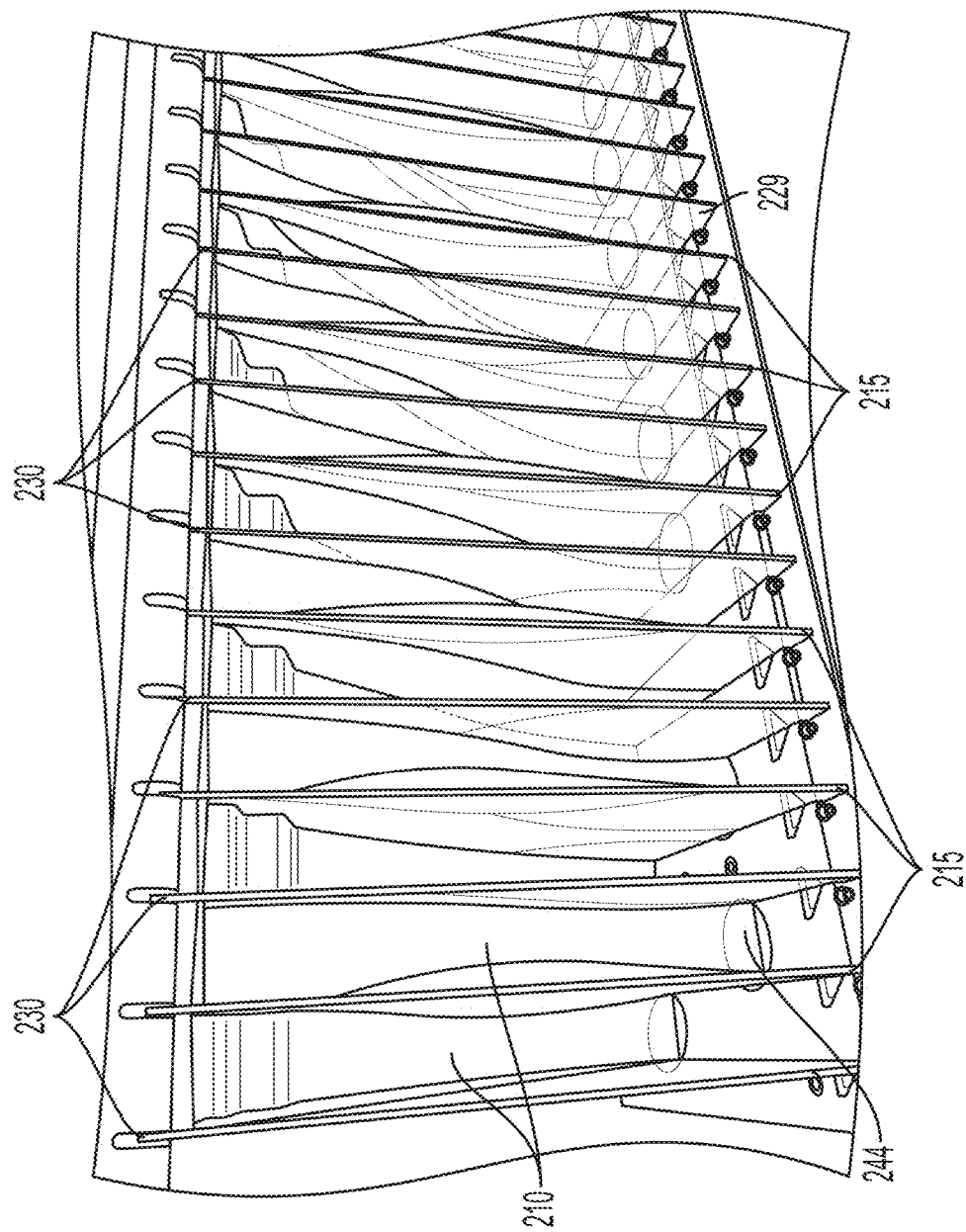
FIG. 10 shows a row of alignment components and encasing panels arranged to form a plurality of chutes according to one embodiment described herein.

FIG. 10 depicts a row of alternating alignment components 215 and encasing panels 230 arranged to form chutes 210. An exit of the chute 210 is directed to an entrance to a connector tube 244. In some examples, the entrance to the connector tube 244 may be arranged in an alternating arrangement associated with the exit direction of the chute 210, where a chute 210 on a first side of an alignment component 215 may direct to a proximate side of the collection bank 200 and a chute 210 on a second side of an alignment component 215 may direct to a distal side of the collection bank 200. The alignment component 215 and encasing panel 230 each may comprise a notch 229 that conforms to the edge of an alignment slot. The notch 229 can aid in equidistance spacing of the plurality of alignment components 215 and plurality of encasing panels 230. In some embodiments, the notch 229 can aid in alignment of the chute 210 and connector tube 244 and container 220 as only one corner of the alignment component 215 and encasing panel 230 may include a notch 229. In other embodiments, the alignment component 215 and encasing panel 230 may include more than one alignment component or an alternate alignment component.

Figure 11:
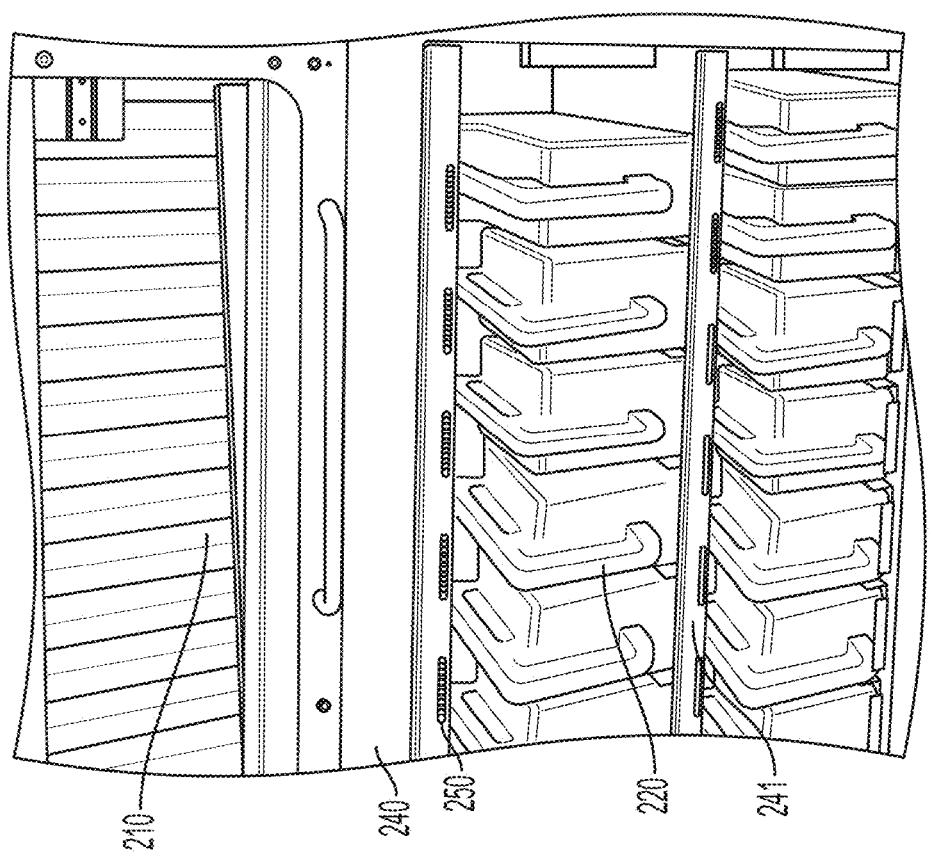
FIG. 11 shows rows of collection containers on a container shelf of a support structure with a row of chutes above according to one embodiment described herein.

FIG. 11 shows one embodiment of a collection system. FIG. 11 shows two rows of collection containers 220 on a container shelf 241 of a support structure 240 with a row of chutes 210 above. In some embodiments, a collection system may comprise a single row of containers or more than two rows of collection containers. The second handle of a collection container 220 is accessible to an operator or auxiliary system such that a collection container 220 may be removed from the collection system without movement, disruption, or disturbance to adjacent collection containers 220. An indicator light 250 can provide information on the status of the associated collection container 220.

Figure 12:
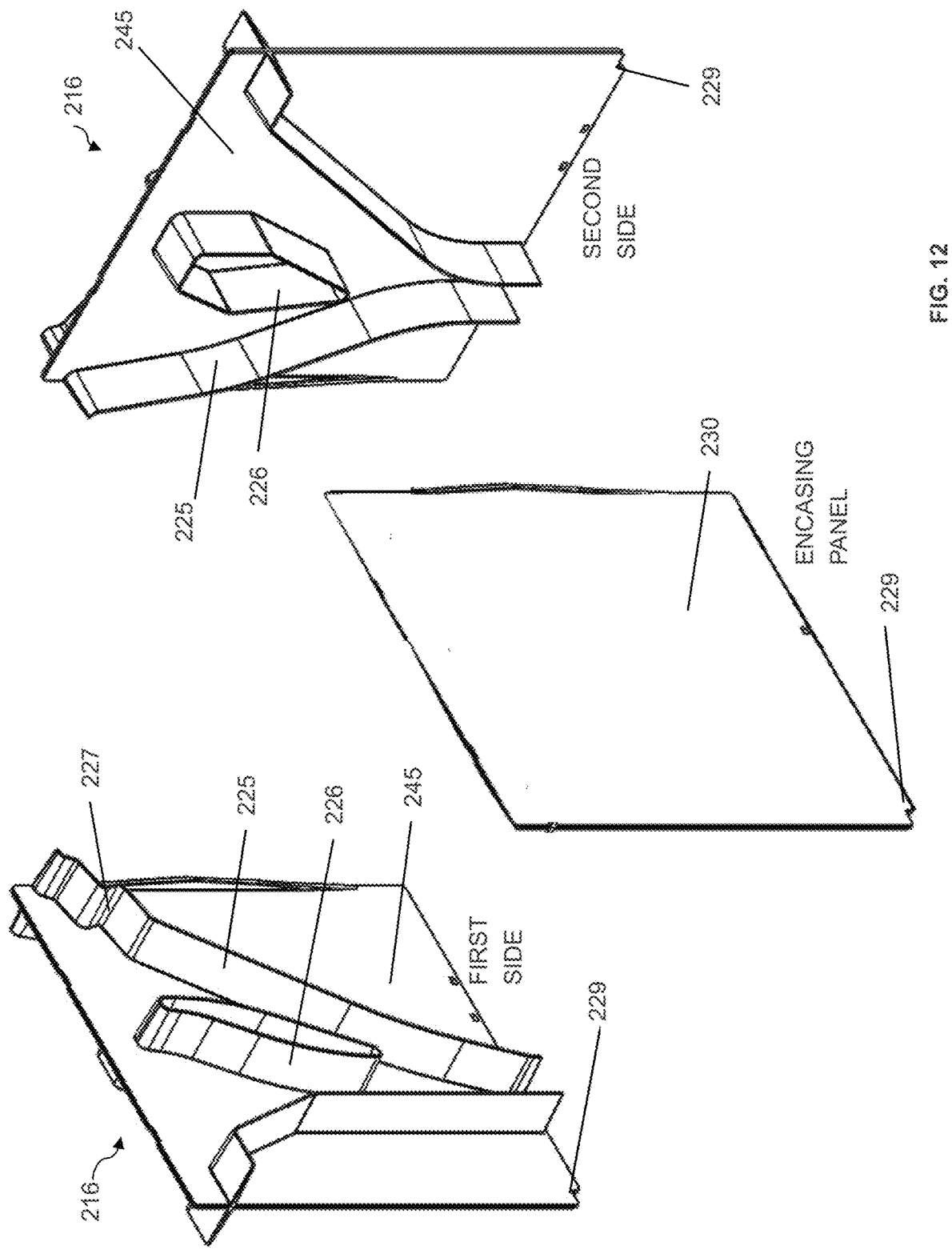
FIG. 12 shows a perspective view of a compact bidirectional alignment component and an encasing panel according to one embodiment described herein.

FIG. 12 shows a front and rear perspective view of a bidirectional alignment component 216, comprising a first side and a second side separated by a divider 245, and encasing panel 230 according to some embodiments of the system. The alignment component 216 comprises raised portions that form a chute 210 when adjacent to an encasing panel 230 to reorient a vessel to a substantially vertical orientation for transport to a collection container 220. The chute 210, formed by alignment component 216 and encasing panel 230, may be configured to accept vessels from more than one source. In some cases, a vessel may enter a chute 210 at either a proximate opening or a distal opening and funnel the vessel to a designated container 220 as assigned in the collection bank 200. In some embodiments, the chute may be configured to accept a vessel from a front or rear operating path of the runners 160 assigned to the collection bank 200 and funnel the vessel to a designated container 220. In some cases, the raised portion of the alignment component 216 may have a substantially Y-shape. In some examples, the alignment component 216 may be bidirectional and comprise a diverter 226 on each side of the apparatus. In some examples, a first side of a bidirectional alignment component 216 may direct vessels to a separate area of the collection system than the second side of the bidirectional alignment component 216. In some cases, the encasing panel 230 comprises a notch 229 and is substantially planar to mate with a bidirectional alignment component 216 to form a chute 210.

Figure 13:
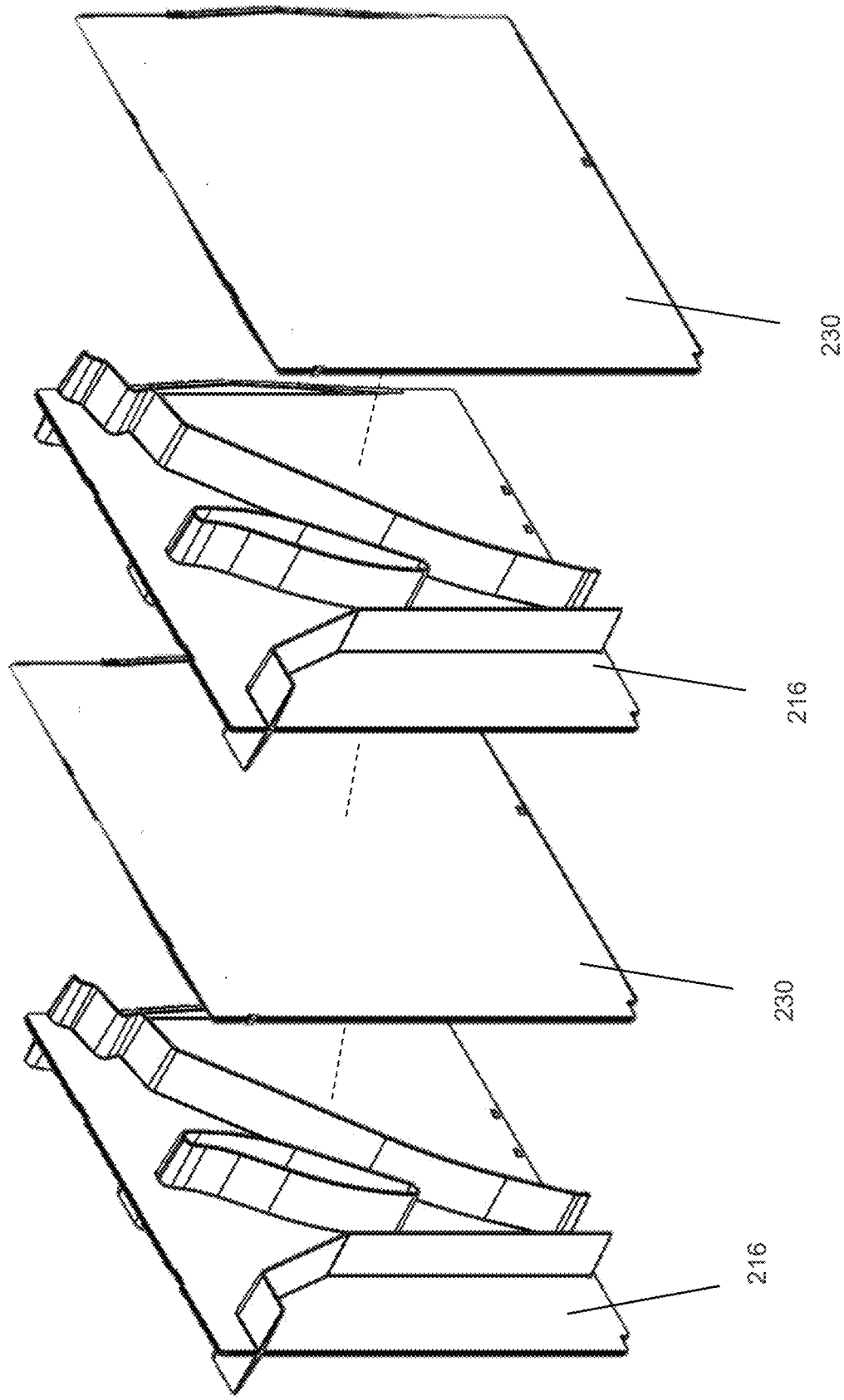
FIG. 13 shows an exploded view of an array of compact bidirectional alignment components and encasing panels according to one embodiment described herein.
Figure 14:
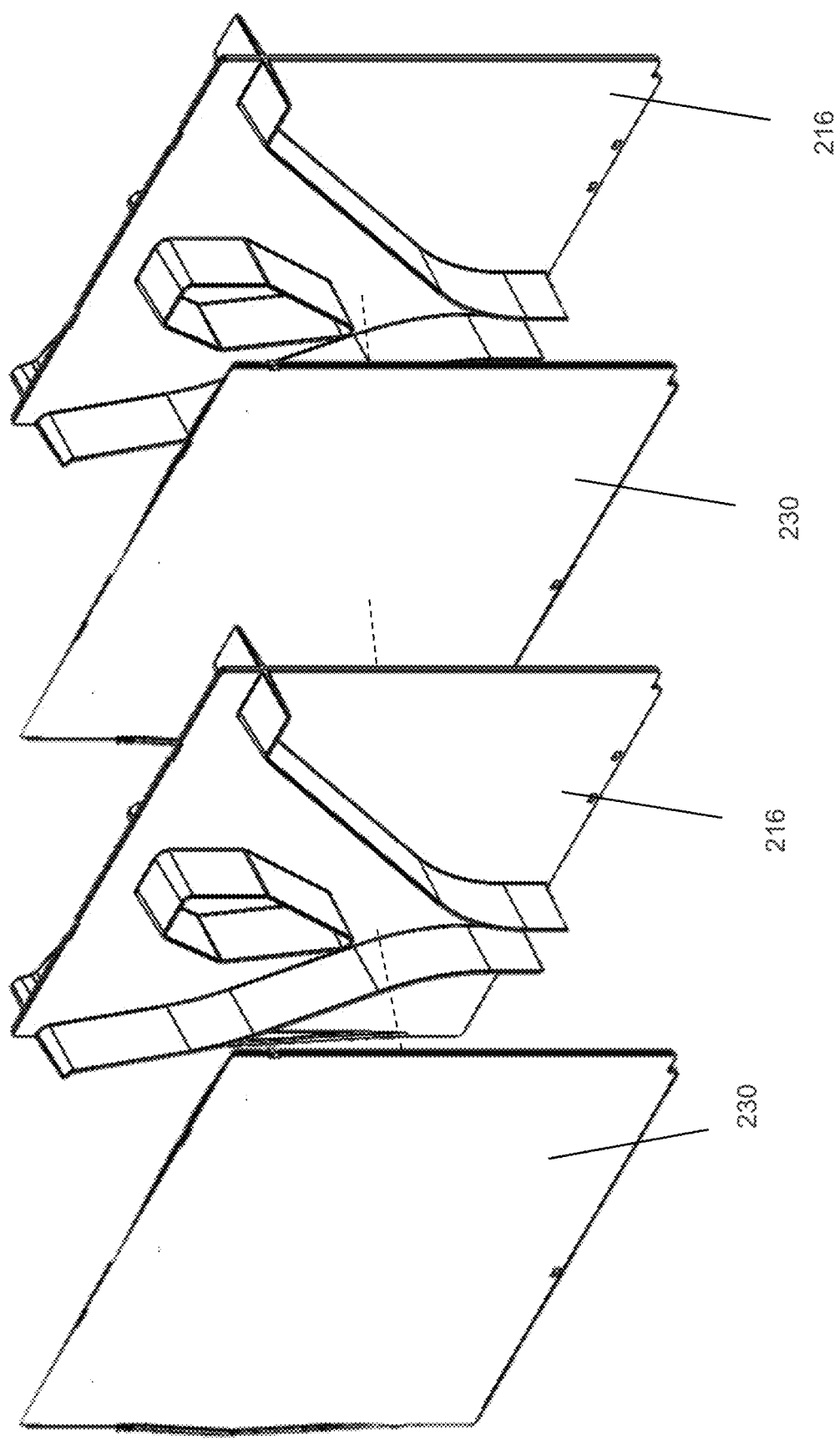
FIG. 14 shows an exploded view of an array of compact bidirectional alignment components and encasing panels according to one embodiment described herein.

FIGS. 13 and 14 show an exploded view of an array of compact bidirectional alignment components 216 and encasing panels 230 according to one embodiment described herein. In FIG. 13, the first side of the alignment component 216 is shown with an encasing panel 230 between each alignment component 216 and at the end of a plurality of alignment components 216. In FIG. 14, the second side of the alignment component 216 is shown with an encasing panel 230 between each alignment component 216 and at the end of a plurality of alignment components 216. A chute 210 is formed once the raised portion of alignment component 216 is contacted by the adjacent encasing panel 230. In some embodiments, this arrangement can be a space-saving design and can simplify manufacture of components for the collection system as described herein.

FIGS. 15A and 15B show a perspective view of an alignment component 217 according to one embodiment described herein. FIG. 15A is a front view while FIG. 15B is a rear view. In some embodiments, an alignment component 217 may be unidirectional and only comprise raised components on one side of the alignment component 217. The rear side of an unidirectional alignment component 217 may serve as an encasing panel and form a chute when a plurality of unidirectional alignment components 217 are arranged adjacent to one another.

FIGS. 16A and 16B show a perspective view of an alignment component 217 according to one embodiment described herein. FIG. 16A is a front view while FIG. 16B is a rear view. In some embodiments, an alignment component 217 may be unidirectional and only comprise raised components on one side of the alignment component 217. One side of an unidirectional alignment component 217 may serve as an encasing panel and form a chute when a plurality of unidirectional alignment components 217 are arranged adjacent to one another.

Figure 17:
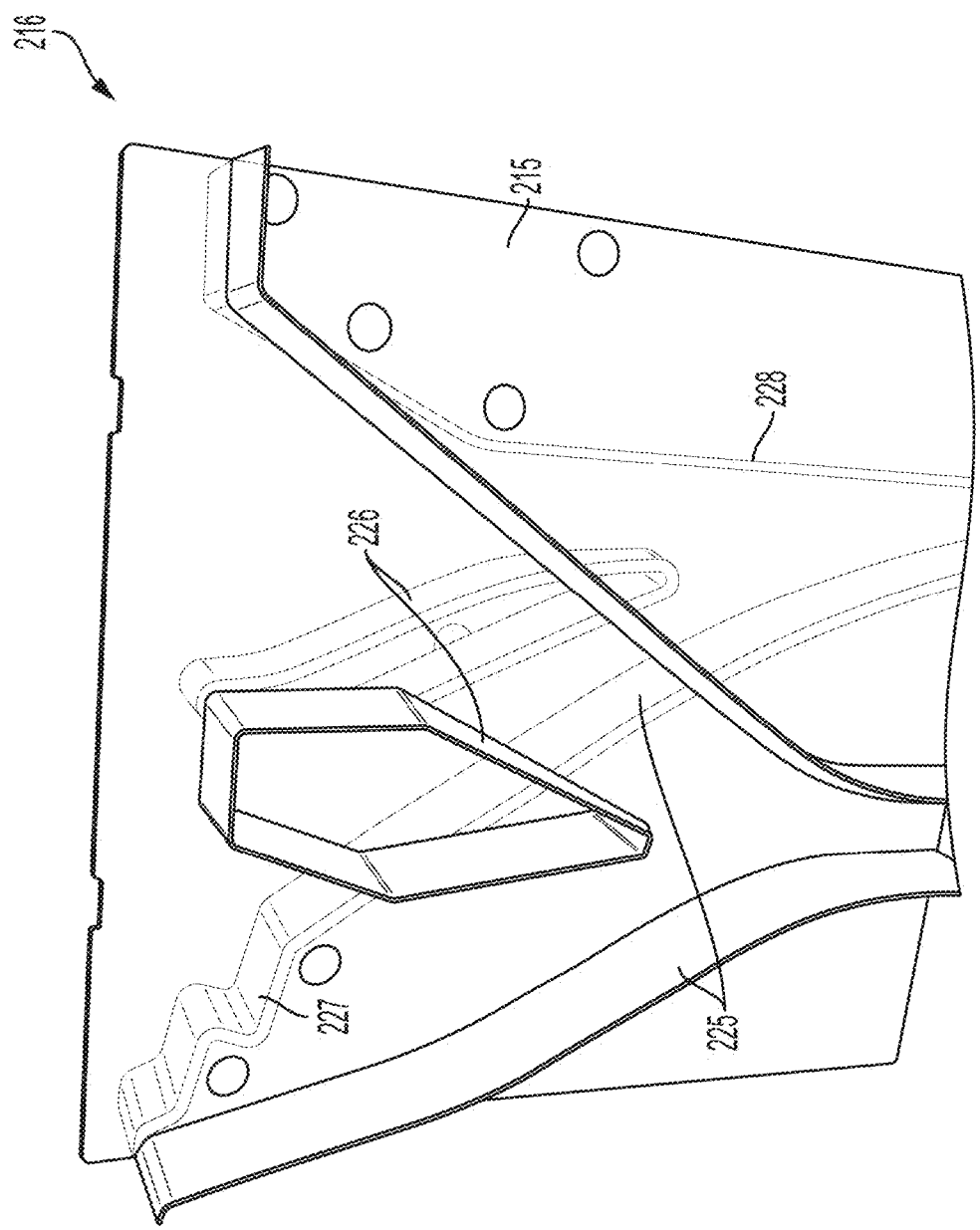
FIG. 17 is side view of a bidirectional alignment component according to according to one embodiment described herein.
Figure 18B:
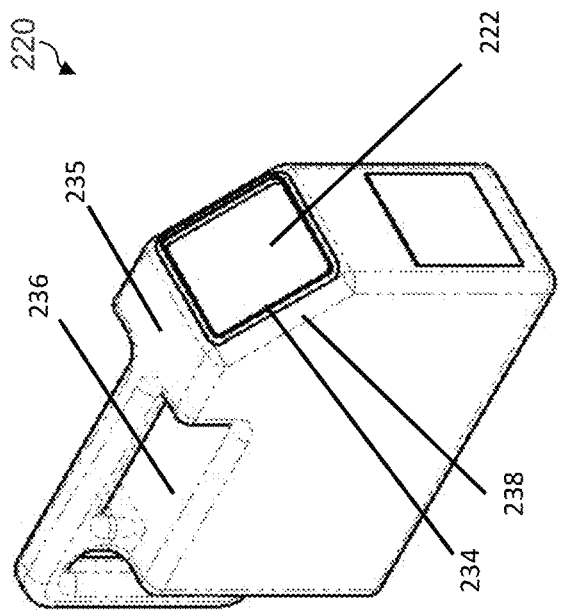
FIG. 18B is a perspective view of a collection container according to one embodiment described herein.
Figure 18D:
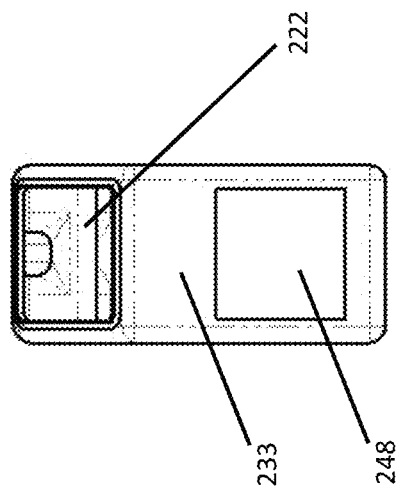
FIG. 18D is a front view of a collection container according to one embodiment described herein.
Figure 18A:
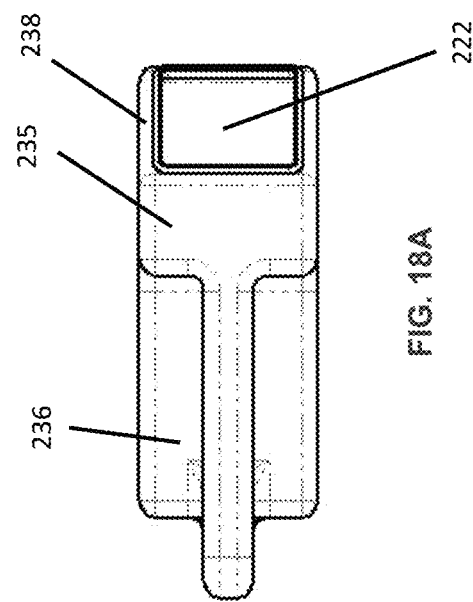
FIG. 18A is a top view of a collection container according to one embodiment described herein.
Figure 18C:
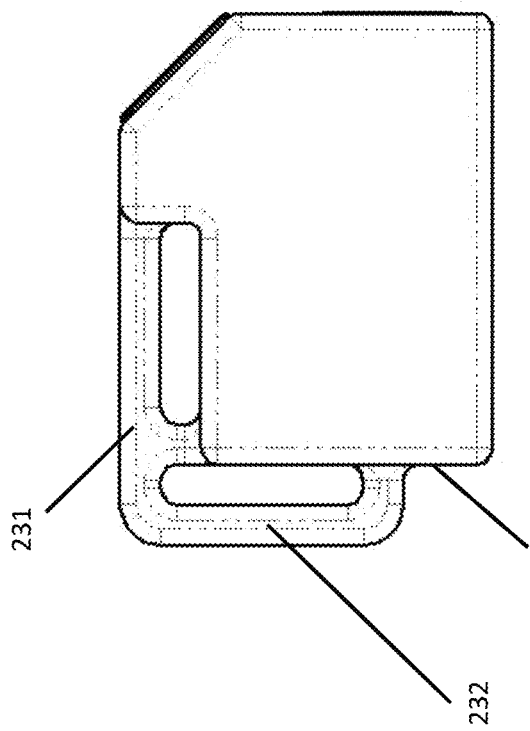
FIG. 18C is a side view of a collection container according to one embodiment described herein.

FIG. 17 shows a side view of a bidirectional alignment component 216 according to some embodiments of the system. As shown in FIGS. 12 and 17, the configuration of a first side of an alignment component 216 may differ from the configuration of a second side of an alignment component 216. In some cases, the configuration of a first side of an alignment component 215 may be the same as the configuration of a second side of an alignment component 215. In some cases, the alignment component 215 may be at least partially transparent. A partially transparent alignment component 215 can permit light to travel through the plurality of chutes to aid in visual identification of system status and troubleshooting. In some embodiments, the alignment component 216 may have a raised portion 225, a diverter 226, a two-step feature 227, a vertical section 228, and a notch 229.

Figure 20:
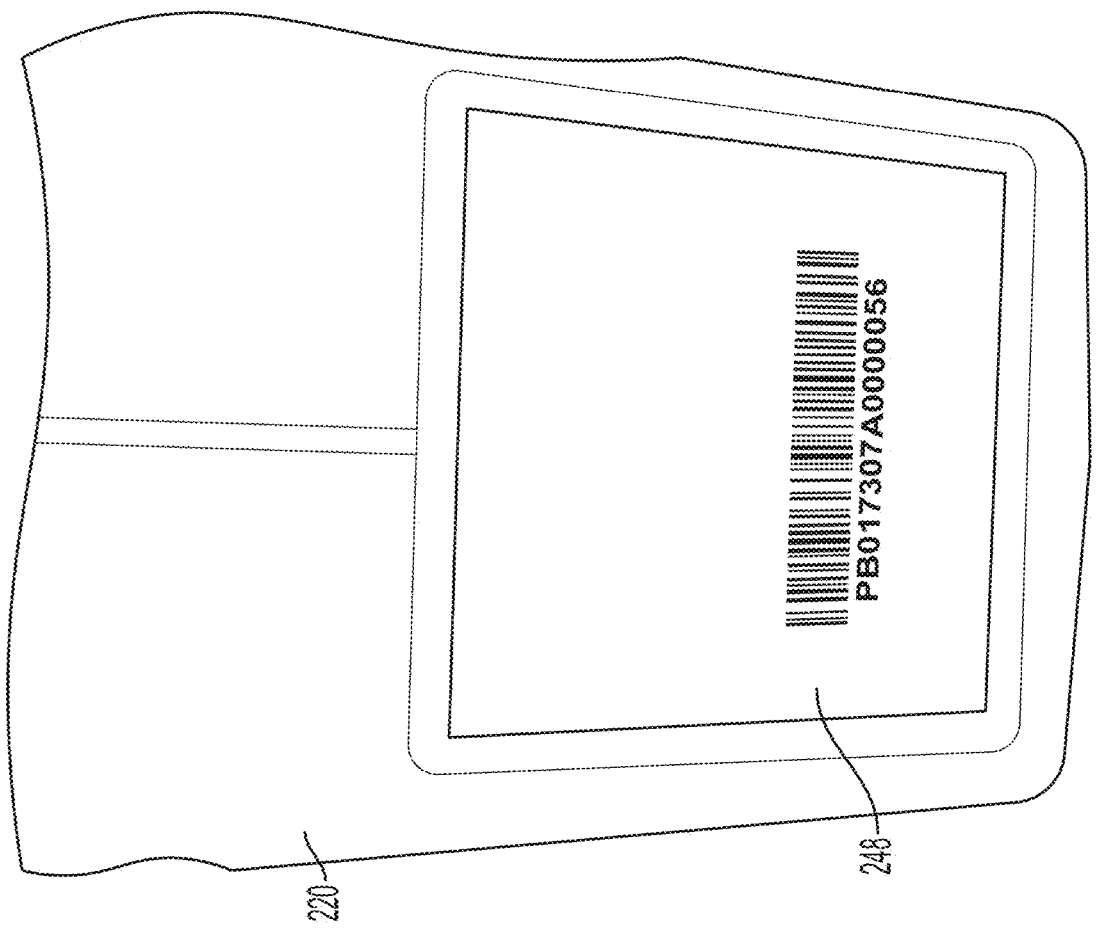
FIG. 20 shows a radio-frequency identification (RFID) tag on a collection container according to one embodiment described herein.

FIGS. 18A, 18B, 18C, 18D, and 19 show a collection container 220 according to one embodiment. The container 220 has an opening 222 defined by panel 238, where the opening 222 may be configured to receive vessels via a chute 210 and connector tube 244 (refer to FIG. 9). In some embodiments, the opening may be configured to receive vessel from more than one chute or more than one connector tube. For example, a first handle 231 may be connected to the first top surface 235 and the second top surface 236. A second handle 232 may be connected to the rear wall 237 and the first handle 231. The front wall 233 may comprise a RFID tag 248. In the alternative, a RFID tag may be located on any other wall or surface of the container. A lip 234 about the opening 222 may be configured to mate with a cap. FIG. 19 shows a photograph of the container with lip 234. FIG. 20 shows a RFID tag 248 on the collection container 220. The RFID label may enable the container to be scanned and tracked throughout a system.

Figure 21:
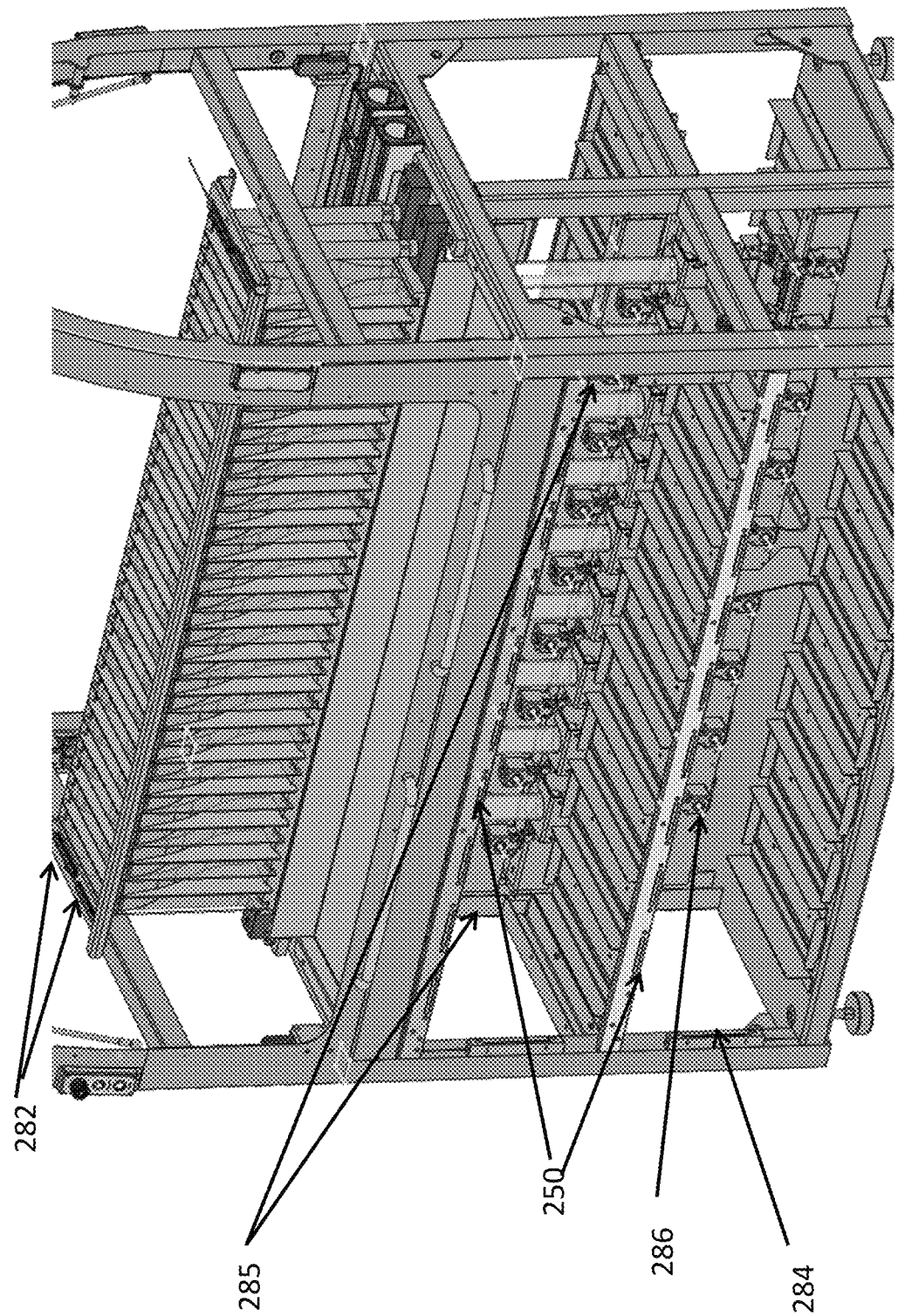
FIG. 21 shows feedback sensors on a collection bank according to one embodiment described herein.

FIG. 21 shows feedback sensors on the collection bank in some embodiments. Chute sensors 282 can identify an obstruction or error in the chute. The chute sensor 282 may monitor the front and rear chute. In some cases, the sensor may be an optical sensor that monitors chute conditions via a through beam design. Connector tube sensors 285 can identify an obstruction or error in the connector tube. The connector tube sensor 285 may monitor the front and rear tube and the top and bottom of the tube. In some cases, the sensor may be an optical sensor that monitors connector tube conditions via a through beam design. Container sensors 284 can identify presence of a container in the system and proper placement of the container. The container sensor 284 may monitor the front, rear, top, and bottom of the container. In some cases, the sensor may be an optical sensor that monitors container conditions via a through beam design. The container RFID sensor 286 can permit the system to track the container identity, location, sorting parameter, sample indicia, or other variable. The indicator light 250 can provide system conditions or instructions to an operator or monitoring system.

Figure 22:
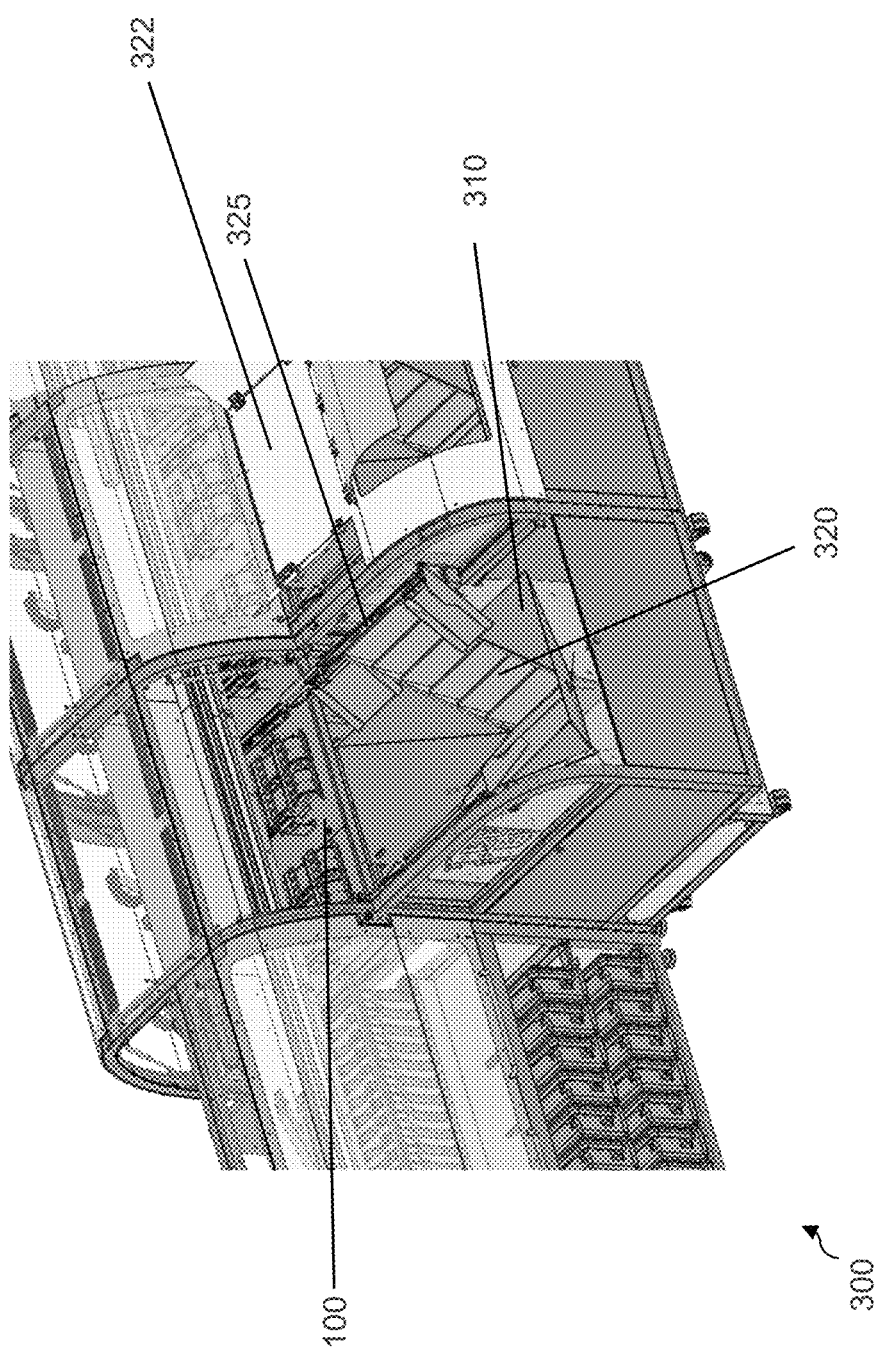
FIG. 22 is a perspective view of a vessel supply system in connection with a vessel sorting system according to one embodiment described herein.

FIG. 22 shows the optional feeding system 300. In some embodiments, a feeding system 300 comprises a feed bin 310, a transporter 320, and transfer belt 325. A plurality of unsorted, unoriented vessels may be loaded into feed bin 310. Individual vessels may be transported from the feed bin 310 to a downstream process by the transporter 320. In some embodiments, individual vessels may be transported from the feed bin 310 to the second transfer belt 325 by the transporter 320. The transfer belt 325 may transfer each vessel to a downstream unit 100. Also depicted in FIG. 22, the feeding system 300 may optionally be covered by cover panel 322.

Figure 23:
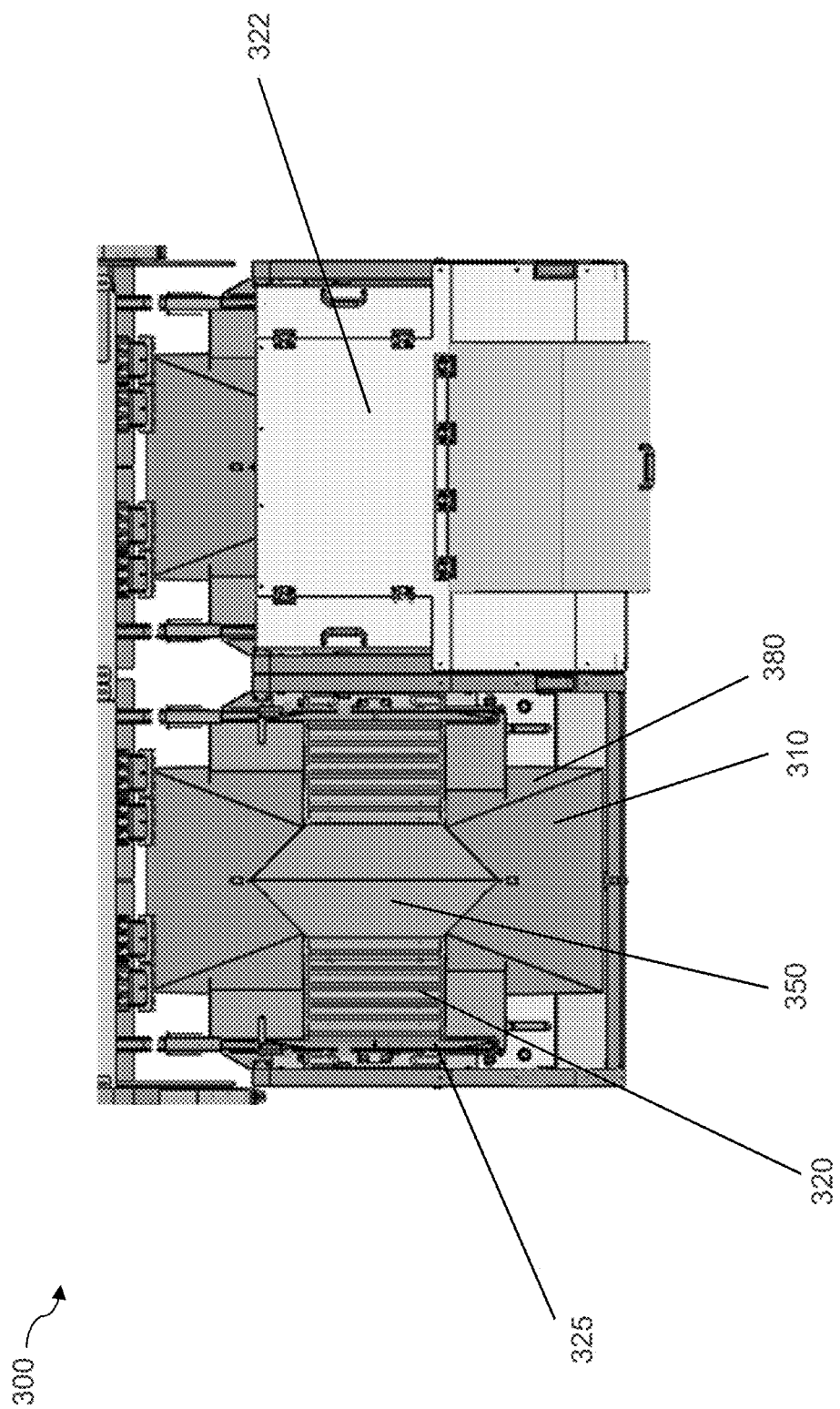
FIG. 23 is a top view of a vessel supply system according to one embodiment described herein.

FIG. 23 shows a top view of optional feeding system 300. The feed bin 310 may include a wedge 350 to direct a plurality of vessels toward the at least one transporter 320. The angled corner element 380 directs vessels toward the base of the at least one transporter 320 and prevent vessels from accumulating in the corner of the feed bin 310. The transfer belt 325 is at the top edge of the feed bin and receives vessels from the transporter 320 and transfer the vessel to a downstream unit. The feeding system 300 may optionally be covered by cover panel 322. The cover panel 322 may comprise more than one hinged door to access areas of the feeding system 300.

Figure 24:
FIG. 24 shows a photograph of a vessel supply system according to one embodiment described herein.

FIG. 24 depicts one embodiment of the feed system described herein. As shown in FIG. 24, the feed bin 310 contains a plurality of vessels arranged in random orientations. The staircase transporter 355 picks up the vessels and transfer the vessels from step to step of the transporter 355 using risers 357 and ledge 356 to transport the aligned vessels to the top of the feeding system 300 where the vessels transition to the transfer belt 325. The vessels are oriented in a linear arrangement along the steps of the transporter; that orientation is maintained on the transfer belt 325. Also shown is wedge 350 that shunts the vessels placed in the bin in random orientations towards the transporter 320, or in embodiments with two transporters, shunts approximately half of the vessels towards the A-side and approximately half towards the B-side. Each ledge 356 may have a wavy surface 359 that orients each vessel into a horizontal orientation of the vessel's longitudinal axis as the vessel is transported from towards the transfer belt 325. Angled corner element 380 directs vessels that tumble from the transporter 320 back to the bottom of the feed bin 310 and prevents accumulation in the corners of the feed bin 310.

Figure 25:
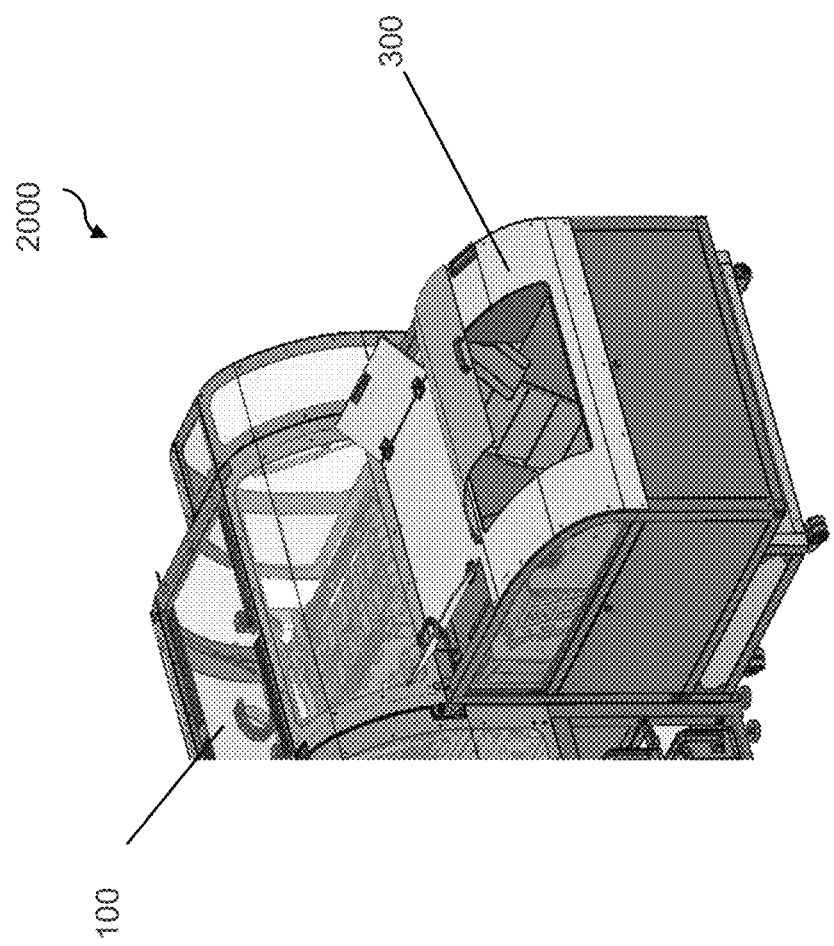
FIG. 25 shows a perspective view of a vessel supply system adjacent to downstream process according to one embodiment described herein.

FIG. 25 depicts one embodiment of a modular supplying system 2000 comprising one feeding system 300. The feeding system 300 is configured to supply each vessel to the front side of a downstream unit 100. The supply system in FIG. 25 is configured to sort up to 4,000 vessels per hour.

Figure 26:
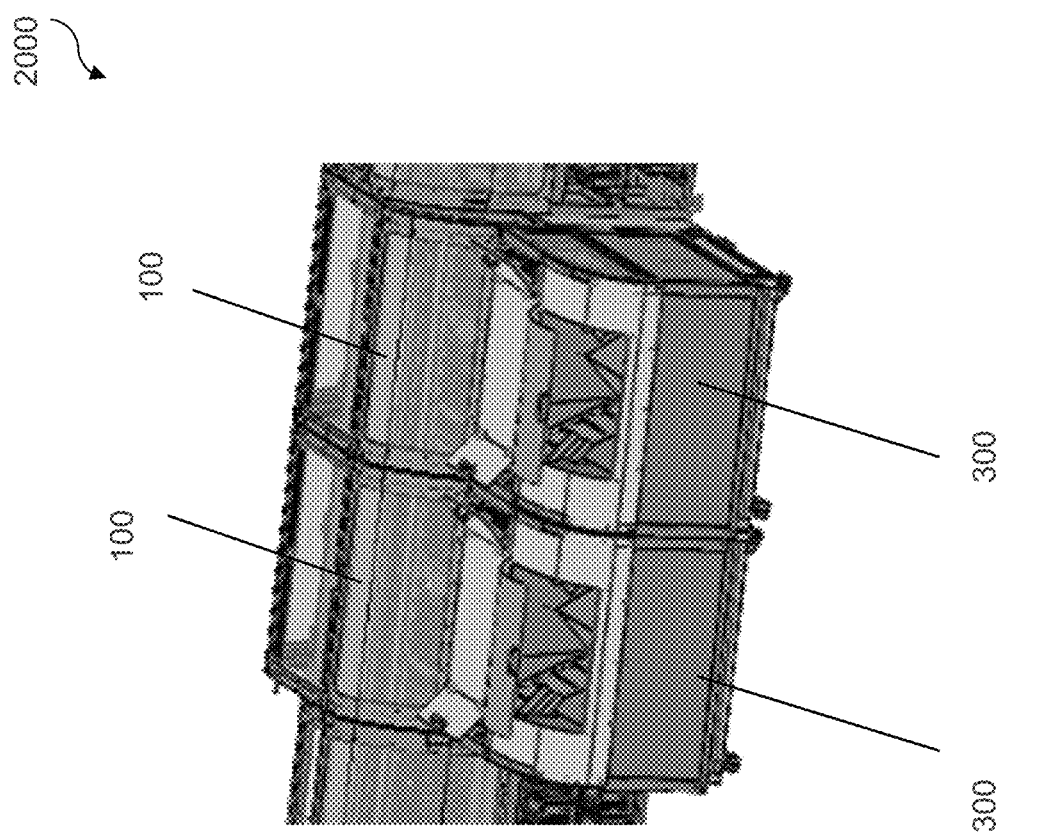
FIG. 26 shows a perspective view of a vessel supply system comprising two bins, four transporters, and four transfer belts, where the supply system is adjacent to downstream process according to one embodiment described herein.

FIG. 26 depicts one embodiment of a modular supplying system 2000 comprising two feeding systems 300. The feeding systems 300 are configured to supply vessels to the front side of the downstream units 100. The modular supplying system 2000 in FIG. 26 is configured to sort up to 8,000 vessels per hour.

Figure 27:
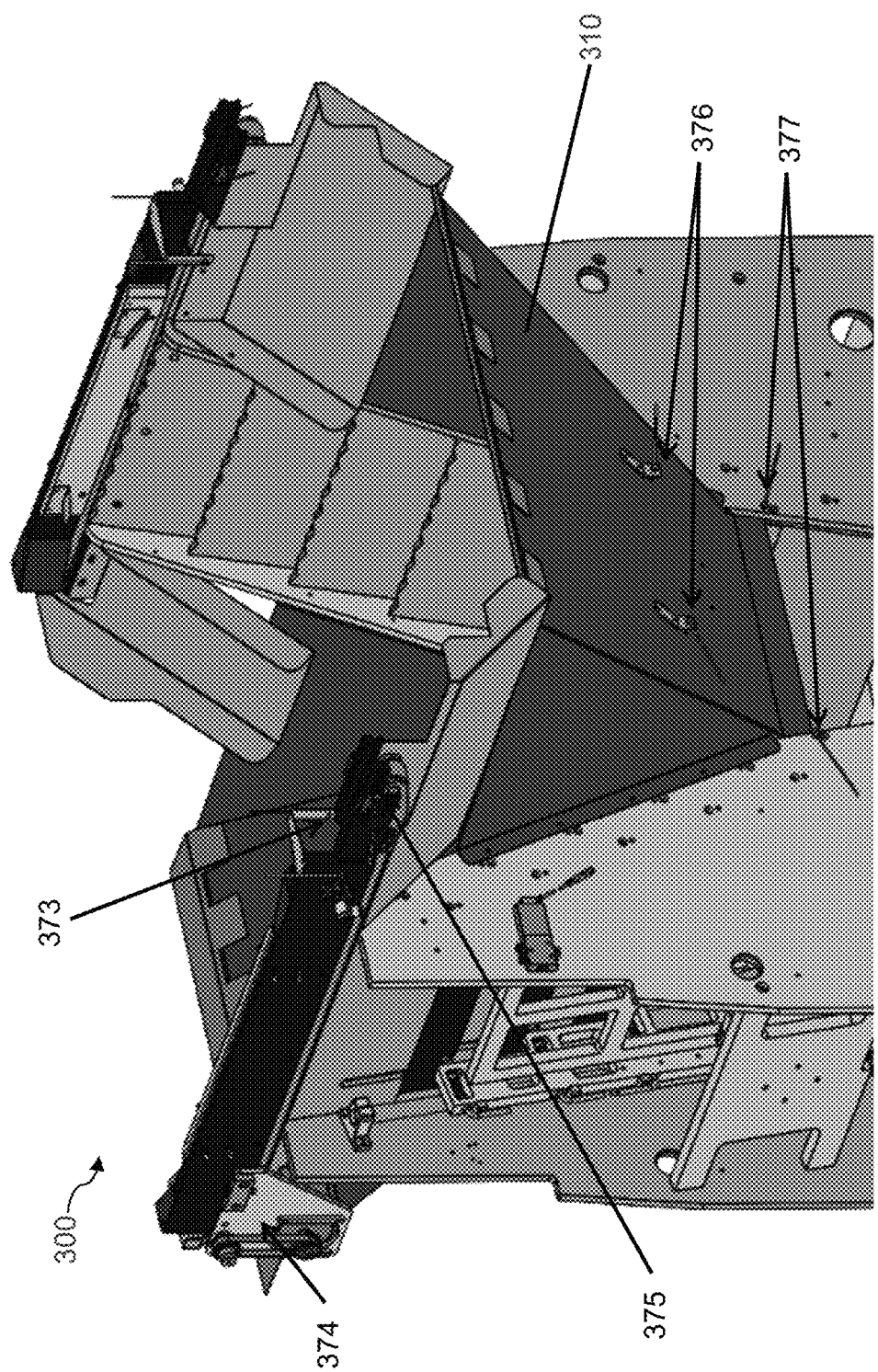
FIG. 27 shows feedback sensors on a feeder according to one embodiment described herein.

FIG. 27 shows feedback sensors on the feed bin 310 according to some embodiments. Feed level sensors 376 and 377 monitor the level of vessels in the feed bin 310 to identify low level or empty status of the feed bin 310 to an operator or monitoring system. Sensor 373 may monitor for jammed or error with the transfer belt. Sensor 374 may monitor motion of the transfer belt to ensure the transfer belt is engaged and running. Sensor 375 may monitor the transfer of each of the vessels from the feed system to a downstream process.

In some embodiments, two runners serve each bank and thus, each vessel may be directed to the next available runner in order to increase throughput of the system. In some embodiments, the system has a throughput of more than 8,000 vessels per hour. In other embodiments, the system has a throughput of more than 1,000, more than 2,000, more than 3,000, more than 4,000, more than 5,000, more than 8,000, more than 10,000, more than 16,000, more than 20,000, or more than 30,000 vessels per hour. In some embodiments, the system has a throughput of 1,000 to 30,000 vessels per hour, 2,000 to 16,000 vessels per hour, or 3,000 to 8,000 vessels per hour.

In some embodiments, the system may have a footprint of less than 43 feet by 9 feet. In some embodiments, the collection point has a footprint of less than 18 feet by 4 feet. In some embodiments, the sorting unit has a footprint of less than 4 feet by 9 feet. In some embodiments, the system can be operated in a space measuring no more than 51 feet by 21 feet.

Methods of Sorting, Receiving and Feeding a Plurality of Vessels

Also described herein are methods for sorting a plurality of vessels. In some embodiments, a method for sorting a plurality of vessels comprises: providing a plurality of vessels, transferring the plurality of vessels to a sorting unit, reading the identification region of the vessel, determining a sorting group for the vessel, and transferring the vessel to a designated collection container. In some embodiments, each vessel may be configured to hold a sample. In some embodiments, each of the plurality of vessels may comprise an identification region for providing information related to a sorting group of the sample. In certain embodiments, the sorting unit may be configured to: sort a plurality of vessels, wherein each vessel is configured to hold a sample and comprises an identification region for providing information related to a sorting group into which the sample is to be sorted. In some embodiments, the sorting unit may comprise: (i) a first transfer belt configured to individually transport each of the plurality of vessels from an entry position to a second position within the sorting unit; (ii) a scanning unit positioned adjacent to the second position and configured to read the identification region on each of the plurality of (iii) an end component that receives the vessel from the first transfer belt and positions the vessel at the second position for reading by the scanning unit; (iv) at least one nesting belt configured to position each of the plurality of scanned vessels for transport to a designated collection point; and (v) a manipulator configured to physically manipulate each of the plurality of scanned vessels and individually transfer individual vessels from the end component to the at least one nesting belt vessels. In some embodiments, the scanning unit may comprise a reader that reads the identification region and stores the information related to each of the vessels as the vessel is sorted by the system. In some embodiments, the method comprises further comprises storing the information related to the at least one vessel. In certain embodiments, the position of the vessel on the nesting belt may be stored by the system. In some embodiments, the method may further comprise transferring each of the plurality of vessels to at least one runner positioned at an exit position of the sorting unit. In some embodiments, the runner may be configured to physically manipulate each of the plurality of scanned vessels and transfer each of the vessels from the at least one nesting belt to a designated collection point. In some embodiments, the collection container may be determined by the sorting group information of the vessel.

In some embodiments, the method may further comprise rotating each of the plurality of vessels about the longitudinal axis of the vessel and positioning the identification region to be scanned by the reader. In some embodiments, the method may further comprise assigning the sorting group to each of the plurality of vessels based on the bar code information of each vessel. In some embodiments, the method may further comprise manipulating each of the plurality of vessels on the nest by a pair of grippers of a runner. In some embodiments, the method may further comprise relaying the sorting group and the position of each of the vessels on the nesting belt to the at least one runner. In some embodiments, the method may further comprise traversing to the designated collection point and disengaging each of the vessel at the collection point for the sorting group of the vessel. In some embodiments, the method may further comprise feeding a plurality of vessels to the sorting unit.

Also disclosed are methods of using the collection system wherein vessels delivered to an entry point of a collection system are dispersed into collection containers (e.g., bins) as disclosed herein. In some examples, a method of using a system for receiving a plurality of vessels may comprise comprising delivering a plurality of vessels to an entry point of the system and dispersing the plurality of vessels into a plurality of collection containers. The system may comprise (i) a plurality of alignment components, where each of the plurality of alignment components may be configured to individually direct each of the plurality of vessels from an entry position to a collection point within the collection system; (ii) a plurality of encasing panels adjacent to each of the plurality of alignment components, wherein each of the plurality of encasing panels may be configured to enclose each of the plurality of alignment components; (iii) a plurality of collection containers comprising an opening, wherein each of the plurality of containers may be configured to receive and hold each of the plurality of vessels at a particular collection point; and (iv) a support structure configured to house each of the plurality of alignment components, encasing panels, and collection containers, wherein each vessel may be configured to hold a sample.

Also described herein are methods for supplying a plurality of vessels. In some embodiments, a method for supplying a plurality of vessels may comprise providing a plurality of vessels, transferring the plurality of vessels to a feeding unit, and transferring the vessels via the at least one transfer belt to a downstream process or unit. In some embodiments, the feeding unit may be configured to supply a plurality of vessels to at least one exit position. In some embodiments, each of the plurality of vessels may be configured to hold a sample. In some embodiments, the feeding unit comprises: (i) a feed bin comprising a bottom surface, a substantially open top, a front, a back, an A-side and a B-side, and configured to feed each of the plurality of vessels from an entry position at the top of the feed bin to at least one edge position of the bottom surface wherein the feed; (ii) at least one transporter positioned on at least one of the A-side or the B-side of the feed bin and configured to receive each of the plurality of vessels from the at least one edge position and transport each of the vessels to the at least one transfer point; and (iii) at least one transfer belt positioned at the exit of the at least one transporter and at or near the top of the bin, and configured to receive each of the plurality of vessels from at least one transfer point and individually transfer individual vessels from the at least one transfer point to a bin exit position within the system. In some examples, the feed bin may be substantially trapezoidal in shape.

Program Component

In some embodiments, a computer program product for sorting a plurality of vessels may comprise a processing device and a non-transitory computer-readable storage medium communicatively coupled to the processing device. In certain embodiments, the processing device may be configured to perform operations comprising: (a) providing a plurality of vessels; (b) transferring the plurality of vessels to a sorting unit; (c) reading the identification region of the vessel; (d) determining a sorting group for the vessel; (e) storing the information related to the at least one vessel; (f) transferring each of the plurality of vessels to at least one runner positioned at an exit position of the sorting unit; and (g) transferring the vessel via the at least one runner to a designated collection container. In some embodiments, each vessel may be configured to hold sample, wherein each of the plurality of vessels comprises an identification region for providing information related to a sorting group of the sample. In some embodiments, the sorting unit configured to: sort a plurality of vessels, wherein each vessel is configured to hold a sample and comprises an identification region for providing information related to a sorting group into which the sample is to be sorted. In certain embodiments, the sorting unit may comprise: (i) a first transfer belt configured to individually transport each of the plurality of vessels from an entry position to a second position within the sorting unit; (ii) a scanning unit positioned adjacent to the second position and configured to read the identification region on each of the plurality of vessels, wherein the scanning unit comprises a reader that reads the identification region and stores the information related to each of the vessels as the vessel is sorted by the system; (iii) an end component that receives the vessel from the first transfer belt and positions the vessel at the second position for reading by the scanning unit; (iv) at least one nesting belt configured to position each of the plurality of scanned vessels for transport to a designated collection point; and (v) a manipulator configured to physically manipulate each of the plurality of scanned vessels and individually transfer individual vessels from the end component to the at least one nesting belt, wherein the position of the vessel on the nesting belt is stored by the system. In some embodiments, the runner may be configured to physically manipulate each of the plurality of scanned vessels and transfer each of the vessels from the at least one nesting belt to a designated collection point. In some embodiments, the collection container is determined by the sorting group information of the vessel.

In some embodiments, a sorting group determination module represents a program component that analyzes data from the reader to determine a sorting group to assign to each vessel. The sorting group determination module may comprise code that selects one or more sorting groups to output using one or more algorithms or lookup tables. In some embodiments, the sorting group determination module comprises one or more algorithms or lookup tables that include data corresponding to various sorting groups and usable by the processor to determine a sorting group. Particularly, in some embodiments, the sorting group determination module may determine a sorting group based at least in part on bar code information. For example, the processor may receive bar code information from the reader and determine a nesting belt assignment (e.g., 126 or 127 in FIG. 7) for the scanned vessel, determine a runner to engage with the vessel, and assign a designated collection container for the runner to disengage with the vessel. The sorting group determination module may determine a sorting group based at least in part on the availability of a collection container for a particular sorting group. For instance, the sorting group determination module can cause the processor to access a lookup table that includes data corresponding to one or more sorting groups associated with various collection containers for the sorting group and select a sorting group that corresponds to an available collection container and assign a runner and nesting belt location accordingly.

Having described several aspects of this invention, it should be appreciated that various alterations, modifications and improvements will occur to those of skill in the art. Such alterations, modifications and improvements are intended to be part of this disclosure and are intended to be within the spirit and scope of the invention. Thus, the description and drawings herein are intended to be illustrative, not limiting. The phraseology and terminology used herein is for the purpose of description and should not be regarded as limiting.

Illustrative Embodiments of Suitable Systems and Methods

As used below, any reference to methods, products, or systems is understood as a reference to each of those methods, products, or systems disjunctively (e.g., "Illustrative embodiment 1-4 is understood as illustrative embodiment 1, 2, 3, or 4.").

Illustrative embodiment 1 is a system for sorting a plurality of vessels comprises: four sorting units, each configured to sort a plurality of vessels, wherein each vessel is configured to hold a sample and comprises an identification region for providing information related to a sorting group into which the sample is to be sorted, wherein the identification region comprises a bar code that represents an alphanumeric string comprising information relating to a specific sample analysis or sample sort group, and wherein each sorting unit comprises: (i) two first transfer belts, each first transfer belt configured to individually transport each of the plurality of vessels from an entry position to a second position within the sorting unit; (ii) two scanning units, each scanning unit positioned adjacent to the second position and configured to read the identification region on each of the plurality of vessels, wherein the scanning unit comprises a reader that reads the identification region and stores the information related to each of the vessels as the vessel is sorted by the system; (iii) two rotational elements, each element configured to rotate each of the plurality of vessels about the longitudinal axis of the vessel to position the identification region so that it can be scanned by the reader; (iv) two end components, each component configured to receive each of the plurality of vessels from the first transfer belt and positions the vessel at the second position for reading by the scanning unit; (v) two nesting belts comprising a first nesting belt and a second nesting belt, each nesting belt configured to position each of the plurality of scanned vessels for transport to a designated collection point, wherein the first and second nesting belts are adjacent to one another and each nesting belt is configured to advance independently of the other nesting belts, wherein each nesting belt comprises at least two active stages and each stage comprises a nest having two or more slots, wherein the nesting belts of the four sorting units are configured to operate independently from one another and the stages of the nesting belts are aligned; (vi) two manipulators, each manipulator configured to physically manipulate each of the plurality of scanned vessels and individually transfer individual vessels from the end component to the first and second nesting belts, wherein the position of the vessel on the nesting belt is stored by the system; and four runners, each runner positioned at an exit position of the sorting unit, wherein each runner is configured to physically manipulate and transfer each of the plurality of scanned vessels from a single active stage from at least one of the nesting belts to a designated collection point, wherein the designated active stage of the nesting belts is configured to align with an operating path of the associated runner such that the operating path of the associated runner is substantially perpendicular to the designated active stage and wherein each of the nesting belts is configured to advance at timed intervals that provide for the associated runner to remove each of the plurality of positioned vessels from the slots of the nest prior to advancement of the nesting belt to the next stage position, wherein the system is configured to relay the sort group for each of the plurality of vessels and the position of each of the plurality of vessels on each nesting belt to the runners, the runners are configured to transport each of the plurality of vessels from the slots on the nests to collection containers, each container having an assigned sorting group, and the runners are configured to disengage with each of the plurality of vessels when the runner is aligned with the assigned collection container as determined by the sorting group information of each of the plurality of vessels.

Illustrative embodiment 2 is a system for sorting a plurality of vessels, comprising: a sorting unit configured to sort a plurality of vessels, wherein each vessel is configured to hold a sample and comprises an identification region for providing information related to a sorting group into which the sample is to be sorted, and wherein the sorting unit comprises: (i) a first transfer belt configured to individually transport each of the plurality of vessels from an entry position to a second position within the sorting unit; (ii) a scanning unit positioned adjacent to the second position and configured to read the identification region on each of the plurality of vessels, wherein the scanning unit comprises a reader that reads the identification region and stores the information related to each of the vessels as the vessel is sorted by the system; (iii) an end component that receives the vessel from the first transfer belt and positions the vessel at the second position for reading by the scanning unit; (iv) at least one nesting belt configured to position each of the plurality of scanned vessels for transport to a designated collection point; and (v) a manipulator configured to physically manipulate each of the plurality of scanned vessels and individually transfer individual vessels from the end component to the at least one nesting belt, wherein the position of the vessel on the nesting belt is stored by the system; and at least one runner positioned at an exit position of the sorting unit and configured to physically manipulate each of the plurality of scanned vessels and transfer each of the vessels from the at least one nesting belt to a designated collection point.

Illustrative embodiment 3 is the system of any preceding or subsequent illustrative embodiment, wherein each of the plurality of vessels is a biological sample tube that is cylindrical in shape and comprises a cap.

Illustrative embodiment 4 is the system of any preceding or subsequent illustrative embodiment, wherein the identification region comprises a bar code that represents an alphanumeric string.

Illustrative embodiment 5 is the system of any preceding or subsequent illustrative embodiment, wherein the bar code comprises information relating to a specific sample analysis or sample sort group.

Illustrative embodiment 6 is the system of any preceding or subsequent illustrative embodiment, wherein each of the plurality of vessels has a leading end and a trailing end, wherein the leading end contacts the end component, aligns with the end component, and maintains said alignment when transferred to the at least one nesting belt.

Illustrative embodiment 7 is the system of any preceding or subsequent illustrative embodiment, wherein each of the plurality of vessels ranges from about 75 mm to about 125 mm in length and about 8 to about 16 mm in diameter.

Illustrative embodiment 8 is the system of any preceding or subsequent illustrative embodiment, wherein the scanning unit further comprises a rotational element configured to rotate each of the plurality of vessels about the longitudinal axis of the vessel to position the identification region so that it can be scanned by the reader.

Illustrative embodiment 9 is the system of any preceding or subsequent illustrative embodiment, wherein the sorting unit assigns the sorting group to each of the plurality of vessels based on the bar code information for each vessel.

Illustrative embodiment 10 is the system of any preceding or subsequent illustrative embodiment, wherein the sorting group for each of the vessels and the position of each of the vessels on the nesting belt are relayed to the at least one runner.

Illustrative embodiment 11 is the system of any preceding or subsequent illustrative embodiment, wherein the at least one nesting belt advances in timed intervals.

Illustrative embodiment 12 is the system of any preceding or subsequent illustrative embodiment, wherein the at least one nesting belt comprises a plurality of stages, wherein each stage comprises a nest having at least one slot configured to accommodate a single vessel.

Illustrative embodiment 13 is the system of any preceding or subsequent illustrative embodiment, wherein the at least one slot is configured to hold the single vessel such that the longitudinal axis of the vessel is substantially horizontal and aligned with the operating direction of the nesting belt.

Illustrative embodiment 14 is the system of any preceding or subsequent illustrative embodiment, wherein collection point comprises a collection bank configured to hold the collection containers.

Illustrative embodiment 15 is the system of any preceding or subsequent illustrative embodiment, wherein at least one stage of the nesting belt is configured to align with an operating path of the at least one runner and wherein the timed intervals of the nesting belt advancement allow the runner to remove each of the plurality of vessels from the slot prior to advancement of the nesting belt to the next advancement interval or stage.

Illustrative embodiment 16 is the system of any preceding or subsequent illustrative embodiment, wherein the operating path of the at least one runner is substantially perpendicular to a direction of advancement of the nesting belt.

Illustrative embodiment 17 is the system of any preceding or subsequent illustrative embodiment, wherein the direction of advancement of the nesting belt is approximately 180 degrees from a direction of the first transfer belt.

Illustrative embodiment 18 is the system of any preceding or subsequent illustrative embodiment, wherein the at least one runner comprises a plurality of grippers such that each of the plurality of vessels on the nest is individually manipulated by a pair of grippers.

Illustrative embodiment 19 is the system of any preceding or subsequent illustrative embodiment, wherein the at least one runner further comprises two gripper heads, wherein the plurality of grippers are arranged within each of the gripper heads.

Illustrative embodiment 20 is the system of any preceding or subsequent illustrative embodiment, wherein the plurality of grippers operate independently to allow for the at least one runner to individually engage each of the plurality of vessels.

Illustrative embodiment 21 is the system of any preceding or subsequent illustrative embodiment, wherein the operating path of the at least one runner traverses to the designated collection point for the sorting group of the vessel.

Illustrative embodiment 22 is the system of any preceding or subsequent illustrative embodiment, further comprising a plurality of designated collection points, wherein each collection point comprises a collection container, and wherein a sorting group is assigned to one or more collection containers.

Illustrative embodiment 23 is the system of any preceding or subsequent illustrative embodiment, wherein the runner transports each of the plurality of vessels from the slot on the nest to the assigned collection container and disengages with the vessel when the runner is aligned with the assigned collection container as determined by the sorting group information of the vessel.

Illustrative embodiment 24 is the system of any preceding or subsequent illustrative embodiment, comprising: two nesting belts comprising a first nesting belt and a second nesting belt, wherein the first and second nesting belts are positioned adjacent to one another and each nesting belt is configured to advance independently of the other nesting belt, wherein each nesting belt comprises at least two active stages and each stage comprises a nest having two or more slots, each slot configured to accommodate a single vessel; two runners comprising a first runner and a second runner, wherein the first runner is configured to physically manipulate each of the plurality of scanned vessels and transfer each of the plurality of vessels from a first active stage, the second runner is configured to physically manipulate each of the plurality of the scanned vessels and transfer each of the plurality of vessels from a second active stage, wherein the first active stage of the nesting belts is configured to align with an operating path of the first runner such that the operating path of the first runner is substantially perpendicular to the first active stage and the second active stage of the nesting belt is configured to align with an operating path of the second runner such that the such that the operating path of the second runner is substantially perpendicular to the second active stage and wherein each of the nesting belts is configured to advance at timed intervals that provide for the runner to remove each of the plurality of positioned vessels from the slots of the nest prior to advancement of the nesting belt to the next stage position, wherein the system is configured to relay the sort group for each of the plurality of vessels and the position of each of the plurality of vessels on each nesting belt to the runners, the runners are configured to transport each of the plurality of vessels from the slots on the nests to collection containers, each container having an assigned sorting group, and the runners are configured to disengage with each of the plurality of vessels when the runner is aligned with the assigned collection container as determined by the sorting group information of each of the plurality of vessels.

Illustrative embodiment 25 is the system of any preceding or subsequent illustrative embodiment, wherein the system comprises two sorting units, wherein the sorting units are adjacent to one another such that the stages of the nesting belts are aligned.

Illustrative embodiment 26 is the system of any preceding or subsequent illustrative embodiment, wherein the system comprises: four sorting units, wherein each sorting unit comprises two nesting belts comprising a first nesting belt and a second nesting belt, wherein the first and second nesting belts are adjacent to one another and each nesting belt is configured to advance independently of the other nesting belts, wherein each nesting belt comprises at least two active stages and each stage comprises a nest having two or more slots, wherein the nesting belts of the four sorting units are configured to operate independently from one another and the stages of the nesting belts are aligned; four runners, wherein each runner is configured to physically manipulate and transfers vessels from a single active stage, wherein the designated active stage of the nesting belts is configured to align with an operating path of the associated runner such that the operating path of the associated runner is substantially perpendicular to the designated active stage and wherein each of the nesting belts is configured to advance at timed intervals that provide for the associated runner to remove each of the plurality of positioned vessels from the slots of the nest prior to advancement of the nesting belt to the next stage position, wherein the system is configured to relay the sort group for each of the plurality of vessels and the position of each of the plurality of vessels on each nesting belt to the runners, the runners are configured to transport each of the plurality of vessels from the slots on the nests to collection containers, each container having an assigned sorting group, and the runners are configured to disengage with each of the plurality of vessels when the runner is aligned with the assigned collection container as determined by the sorting group information of each of the plurality of vessels.

Illustrative embodiment 27 is the system of any preceding or subsequent illustrative embodiment, wherein the nesting belts of the sorting units are parallel and adjacent to one another.

Illustrative embodiment 28 is the system of any preceding or subsequent illustrative embodiment, wherein each runner is associated with a single active stage for two of the sorting units.

Illustrative embodiment 29 is the system of any preceding or subsequent illustrative embodiment, further comprising an A-side and a B-side, wherein the A-side and the B-side are positioned 180 degrees from one another to either side of the nesting belt or belts, wherein the collection containers are divided such that approximately one half of the containers are located on the A-side and one half on the B-side of the system.

Illustrative embodiment 30 is the system of any preceding or subsequent illustrative embodiment, wherein the first nesting belt is associated with the A-side and a second nesting belt is associated with the B-side.

Illustrative embodiment 31 is the system of any preceding or subsequent illustrative embodiment, wherein the manipulators are configured to select the first or second nesting belt for placement of each of the plurality of vessels according to the sorting group identified by the reader and the location of the collection container for the sorting group of each of the plurality of vessels.

Illustrative embodiment 32 is the system of any preceding or subsequent illustrative embodiment, wherein two of the runners are configured to transport to the A-side of the system and two of the runners transport to the B-side of the system.

Illustrative embodiment 33 is the system of any preceding or subsequent illustrative embodiment, wherein the sort groups are distributed to the A-side and B-side to balance the demand of the runners.

Illustrative embodiment 34 is the system of any preceding or subsequent illustrative embodiment, wherein the collection containers are distributed according to sample group frequency to minimize the operating path of the runners.

Illustrative embodiment 35 is the system of any preceding or subsequent illustrative embodiment, wherein each runner is configured to manipulate and transfers each of the plurality of vessels from each of the sorting units.

Illustrative embodiment 36 is the system of any preceding or subsequent illustrative embodiment, wherein the operating path of the runners are parallel to one another.

Illustrative embodiment 37 is the system of any preceding or subsequent illustrative embodiment, wherein the system is configured to sort up to 8000 vessels per hour.

Illustrative embodiment 38 is the system of any preceding or subsequent illustrative embodiment, wherein the system is configured to sort the plurality of vessels into up to 216 sort groups.

Illustrative embodiment 39 is the system of any preceding or subsequent illustrative embodiment, wherein the system comprises 1, 2, or 4 sorting units.

Illustrative embodiment 40 is the system of any preceding or subsequent illustrative embodiment, further comprising a shield configured to cover the system.

Illustrative embodiment 41 is the system of any preceding or subsequent illustrative embodiment, wherein the shield is substantially transparent.

Illustrative embodiment 42 is the system of any preceding or subsequent illustrative embodiment, wherein the system is modular.

Illustrative embodiment 43 is the system of any preceding or subsequent illustrative embodiment, further comprising at least one feeding system configured to supply a plurality of vessels to the entry position of the at least one sorting unit, wherein the feeding system comprises a feed bin, at least one transporter, and a second transfer belt.

Illustrative embodiment 44 is the system of any preceding or subsequent illustrative embodiment, wherein the at least one transporter is configured to transfer each of the plurality of vessels from the feed bin to the second transfer belt.

Illustrative embodiment 45 is the system of any preceding or subsequent illustrative embodiment, wherein the speed of the first transfer belt is greater than speed of the second transfer belt.

Illustrative embodiment 46 is the system of any preceding or subsequent illustrative embodiment, wherein a timing gap between the speed of the first and second transfer belts is substantially the same as the time for reading the identification region of the vessel.

Illustrative embodiment 47 is the system of any preceding or subsequent illustrative embodiment, wherein the second transfer belt is configured to seek a condition state of the first transfer belt to determine an operating state of the second transfer belt.

Illustrative embodiment 48 is the system of any preceding or subsequent illustrative embodiment, wherein the first transfer belt and second transfer belt each comprise a rubberized material.

Illustrative embodiment 49 is the system of any preceding or subsequent illustrative embodiment, wherein the rubberized material of the second transfer belt comprises a plurality of raised elements configured to assist in the transfer of vessels.

Illustrative embodiment 50 is the system of any preceding or subsequent illustrative embodiment, wherein the system is configured to return vessels that are not engaged by a runner to the feeding bin.

Illustrative embodiment 51 is the system of any preceding or subsequent illustrative embodiment, wherein the returned vessels include vessels having no active collection point.

Illustrative embodiment 52 is the system of any preceding or subsequent illustrative embodiment, wherein the returned vessels include vessels having no identified sort group.

Illustrative embodiment 53 is the system of any preceding or subsequent illustrative embodiment, wherein the feed bin comprises a cover panel configured to provide access to the feeder bin.

Illustrative embodiment 54 is the system of any preceding or subsequent illustrative embodiment, wherein the feeding system further comprises an inspection table adjacent to the feed bin.

Illustrative embodiment 55 is the system of any preceding or subsequent illustrative embodiment, wherein the designated collection point further comprises a plurality of chutes, wherein each chute is paired with a collection container.

Illustrative embodiment 56 is the system of any preceding or subsequent illustrative embodiment, wherein the system is configured to permit each of the plurality of sorted vessels to travel through one of the chutes to the assigned collection container upon being disengaged from the runner.

Illustrative embodiment 57 is the system of any preceding or subsequent illustrative embodiment, wherein the chute is configured to reorient the vessel from a substantially horizontal position to a substantially vertical position.

Illustrative embodiment 58 is the system of any preceding or subsequent illustrative embodiment, wherein the chute is configured to be accessible to two runners.

Illustrative embodiment 59 is a method for sorting a plurality of vessels, comprising: providing a plurality of vessels, each vessel configured to hold sample, wherein each of the plurality of vessels comprises an identification region for providing information related to a sorting group of the sample; transferring the plurality of vessels to a sorting unit, the sorting unit configured to: sort a plurality of vessels, wherein each vessel is configured to hold a sample and comprises an identification region for providing information related to a sorting group into which the sample is to be sorted, and wherein the sorting unit comprises: (i) a first transfer belt configured to individually transport each of the plurality of vessels from an entry position to a second position within the sorting unit; (ii) a scanning unit positioned adjacent to the second position and configured to read the identification region on each of the plurality of vessels, wherein the scanning unit comprises a reader that reads the identification region and stores the information related to each of the vessels as the vessel is sorted by the system; (iii) an end component that receives the vessel from the first transfer belt and positions the vessel at the second position for reading by the scanning unit; (iv) at least one nesting belt configured to position each of the plurality of scanned vessels for transport to a designated collection point; and (v) a manipulator configured to physically manipulate each of the plurality of scanned vessels and individually transfer individual vessels from the end component to the at least one nesting belt, wherein the position of the vessel on the nesting belt is stored by the system; reading the identification region of the vessel; determining a sorting group for the vessel; storing the information related to the at least one vessel; transferring each of the plurality of vessels to at least one runner positioned at an exit position of the sorting unit, wherein the runner is configured to physically manipulate each of the plurality of scanned vessels and transfer each of the vessels from the at least one nesting belt to a designated collection point; and transferring the vessel via the at least one runner to a designated collection container, wherein the collection container is determined by the sorting group information of the vessel.

Illustrative embodiment 60 is the method of any preceding or subsequent illustrative embodiment, further comprising rotating each of the plurality of vessels about the longitudinal axis of the vessel and positioning the identification region to be scanned by the reader.

Illustrative embodiment 61 is the method of any preceding or subsequent illustrative embodiment, further comprising assigning the sorting group to each of the plurality of vessels based on the bar code information of each vessel.

Illustrative embodiment 63 is the method of any preceding or subsequent illustrative embodiment, further comprising manipulating each of the plurality of vessels on the nest by a pair of grippers of a runner.

Illustrative embodiment 64 is the method of any preceding or subsequent illustrative embodiment, further comprising relaying the sorting group and the position of each of the vessels on the nesting belt to the at least one runner.

Illustrative embodiment 65 is the method of any preceding or subsequent illustrative embodiment, further comprising traversing to the designated collection point and disengaging each of the vessel at the collection point for the sorting group of the vessel.

Illustrative embodiment 66 is the method of any preceding or subsequent illustrative embodiment, further comprising feeding a plurality of vessels to the sorting unit.

Illustrative embodiment 67 is a computer program product comprising: a processing device; and a non-transitory computer-readable medium communicatively coupled to the processing device, wherein the processing device is configured to perform operations comprising: providing a plurality of vessels, each vessel configured to hold sample, wherein each of the plurality of vessels comprises an identification region for providing information related to a sorting group of the sample; transferring the plurality of vessels to a sorting unit, the sorting unit configured to: sort a plurality of vessels, wherein each vessel is configured to hold a sample and comprises an identification region for providing information related to a sorting group into which the sample is to be sorted, and wherein the sorting unit comprises: (i) a first transfer belt configured to individually transport each of the plurality of vessels from an entry position to a second position within the sorting unit; (ii) a scanning unit positioned adjacent to the second position and configured to read the identification region on each of the plurality of vessels, wherein the scanning unit comprises a reader that reads the identification region and stores the information related to each of the vessels as the vessel is sorted by the system; (iii) an end component that receives the vessel from the first transfer belt and positions the vessel at the second position for reading by the scanning unit; (iv) at least one nesting belt configured to position each of the plurality of scanned vessels for transport to a designated collection point; and (v) a manipulator configured to physically manipulate each of the plurality of scanned vessels and individually transfer individual vessels from the end component to the at least one nesting belt, wherein the position of the vessel on the nesting belt is stored by the system; and reading the identification region of the vessel; determining a sorting group for the vessel; storing the information related to the at least one vessel; transferring each of the plurality of vessels to at least one runner positioned at an exit position of the sorting unit, wherein the runner is configured to physically manipulate each of the plurality of scanned vessels and transfer each of the vessels from the at least one nesting belt to a designated collection point; and transferring the vessel via the at least one runner to a designated collection container, wherein the collection container is determined by the sorting group information of the vessel.

Illustrative embodiment 68 is a system for receiving a plurality of vessels, comprising: a collection bank configured to receive a plurality of vessels, wherein each vessel is configured to hold a sample and wherein the collection bank comprises: (i) a plurality of alignment components, wherein each of the plurality of alignment components is configured to individually direct each of the plurality of vessels from an entry position to a collection point within the collection bank; (ii) a plurality of encasing panels adjacent to each of the plurality of alignment components, wherein each of the plurality of encasing panels is configured to enclose each of the plurality of alignment components; (iii) a plurality of collection containers comprising an opening, wherein each of the plurality of containers is configured to receive and hold at least some of the plurality of vessels at a particular collection point; and (iv) a support structure configured to house each of the plurality of alignment components, encasing panels, and collection containers.

Illustrative embodiment 69 is the system of any preceding or subsequent illustrative embodiment, wherein each of the plurality of vessels is a biological sample tube that is cylindrical in shape and comprises a cap.

Illustrative embodiment 70 is the system of any preceding or subsequent illustrative embodiment, wherein each of the plurality of vessels ranges in size from 75 mm to about 125 mm in length and about 8 to about 16 mm in diameter.

Illustrative embodiment 71 is the system of any preceding or subsequent illustrative embodiment, wherein each of the plurality of alignment components is configured to reorient each of the plurality of vessels from a substantially horizontal position to a substantially vertical position.

Illustrative embodiment 72 is the system of any preceding or subsequent illustrative embodiment, wherein the plurality of alignment components and encasing panels are configured in a row and positioned in a vertical orientation with an encasing panel separating each of the plurality of alignment components in the row and an encasing panel at each end of the row.

Illustrative embodiment 73 is the system of any preceding or subsequent illustrative embodiment, wherein the support structure comprises at least one container shelf configured to hold the plurality of collection containers.

Illustrative embodiment 74 is the system of any preceding or subsequent illustrative embodiment, wherein the shelf comprises a series of slots configured to align with the opening of each of the plurality of collection containers when the containers are placed in the system.

Illustrative embodiment 75 is the system of any preceding or subsequent illustrative embodiment, wherein the system comprises an upper container shelf and a lower container shelf.

Illustrative embodiment 76 is the system of any preceding or subsequent illustrative embodiment, wherein the slots of the upper and lower container shelf are offset such that the upper slots are approximately one half a container width offset from the lower slots.

Illustrative embodiment 77 is the system of any preceding or subsequent illustrative embodiment, further comprising at least one positioning bar configured to align each of the plurality of alignment components in the support structure.

Illustrative embodiment 78 is the system of any preceding or subsequent illustrative embodiment, wherein the system comprises a set up upper positioning bars and a set of lower positioning bars.

Illustrative embodiment 79 is the system of any preceding or subsequent illustrative embodiment, further comprising a connector tube, wherein the connector tube is configured to protrude from the slots in the container shelf and connect the opening of each of the plurality of collection containers to a designated chute.

Illustrative embodiment 80 is the system of any preceding or subsequent illustrative embodiment, wherein the plurality of alignment components and encasing panels are configured to align in a row on the support structure such that a pair of alignment components and encasing panels produce a confined space configured to funnel each of the plurality of vessels from the top of each of the plurality of alignment components to the bottom of each of the plurality of alignment components, wherein a top inlet of the confined space is wider than a bottom outlet, wherein the bottom outlet is approximately the same size as the opening of one of the collection containers and a connector tube, wherein the support structure comprises a top and a bottom container shelf, wherein each shelf comprises a series of slots configured to align with the opening of each of the plurality of collection containers, wherein the slots of the upper and lower container shelf are offset such that the upper slots are approximately one half a container width offset from the lower slots, wherein each of the plurality of alignment components has a first side and a second side, and wherein the first side of each of the plurality of alignment components and encasing panels funnel each of the plurality of vessels to a designated collection container staged on the front side of the system and the second side of each of the plurality of alignment components and encasing panels funnel each of the plurality of vessels to designated collection container staged on the rear side of the system, wherein the connector tube is configured to protrude from the slots in each container shelf and connect the opening of each of the plurality of collection containers to the confined space of each pair of the plurality of alignment components and encasing panels.

Illustrative embodiment 81 is the system of any preceding or subsequent illustrative embodiment, wherein each of the plurality of collection containers comprises a radio frequency identification (RFID) tag.

Illustrative embodiment 82 is the system of any preceding or subsequent illustrative embodiment, wherein the RFID tag is configured to receive location and vessel information when each of the plurality of containers is loaded in the support structure.

Illustrative embodiment 83 is the system of any preceding or subsequent illustrative embodiment, wherein the support structure comprises an indicator light for each of the plurality of collection containers, wherein in the light is configured to provide feedback on an operating condition of each of the plurality of collection containers.

Illustrative embodiment 84 is the system of any preceding or subsequent illustrative embodiment, wherein each of the plurality of collection containers is configured to be associated with a chute formed by one of the plurality of encasing panels and one of the plurality of alignment components, wherein the association is based on a sorting parameter of each of the plurality of vessels.

Illustrative embodiment 85 is the system of any preceding or subsequent illustrative embodiment, wherein the collection bank further comprises a cover configured to provide access to each of the plurality of alignment components and each of the plurality of collection containers.

Illustrative embodiment 86 is the system of any preceding or subsequent illustrative embodiment, wherein the cover comprises a gull wing door.

Illustrative embodiment 87 is the system of any preceding or subsequent illustrative embodiment, wherein the system is modular.

Illustrative embodiment 88 is a method of using a system for receiving a plurality of vessels, comprising: delivering a plurality of vessels to an entry point of the system; and dispersing the plurality of vessels into a plurality of collection containers in a collection bank, wherein the system comprises: (i) a plurality of alignment components, wherein each of the plurality of alignment components is configured to individually direct each of the plurality of vessels from an entry position to a collection point within the collection bank; (ii) a plurality of encasing panels adjacent to each of the plurality of alignment components, wherein each of the plurality of encasing panels is configured to enclose each of the plurality of alignment components; (iii) a plurality of collection containers comprising an opening, wherein each of the plurality of containers is configured to receive and hold at least some of the plurality of vessels at a particular collection point; and (iv) a support structure configured to house each of the plurality of alignment components, encasing panels, and collection containers, wherein each vessel is configured to hold a sample.

Illustrative embodiment 89 is a system for guiding a plurality of vessels, comprising a plurality of alignment components and encasing panels configured in a row, wherein the alignment components are encasing panels are positioned in a vertical orientation with an encasing panel separating each of the plurality of alignment components in the row and an encasing panel at each end of the row.

Illustrative embodiment 90 is the system of any preceding or subsequent illustrative embodiment, wherein each of the plurality of encasing panels and alignment components are configured to contact each other to form a chute and reorient a vessel from a substantially horizontal orientation to a substantially vertical orientation.

Illustrative embodiment 91 is the system of any preceding or subsequent illustrative embodiment, wherein each of the plurality of alignment components comprises a first side and a second side.

Illustrative embodiment 92 is the system of any preceding or subsequent illustrative embodiment, wherein the first side and the second side of each of the plurality of alignment components each comprise a raised portion, wherein the raised portion is configured to form a chute and provide a contact surface to reorient and funnel each of the plurality of vessels within the chute.

Illustrative embodiment 93 is the system of any preceding or subsequent illustrative embodiment, wherein the chute ranges from 1 to 10 cm in depth.

Illustrative embodiment 94 is the system of any preceding or subsequent illustrative embodiment, wherein an inlet of the chute is wider than an outlet of the chute.

Illustrative embodiment 95 is the system of any preceding or subsequent illustrative embodiment, wherein the width of the inlet of the chute approximates the length of a vessel being delivered by the chute and the width of the outlet approximates the width of the vessel being delivered.

Illustrative embodiment 96 is the system of any preceding or subsequent illustrative embodiment, wherein each chute is configured to direct each of the plurality of vessels from a plurality of entry points to a single collection point.

Illustrative embodiment 97 is the system of any preceding or subsequent illustrative embodiment, wherein the chute further comprises a diverter configured to direct each of the plurality of vessels to a front or rear section of each alignment component.

Illustrative embodiment 98 is the system of any preceding or subsequent illustrative embodiment, wherein the chute on the first side of the alignment component is configured to direct each of the plurality of vessels to the front section of the alignment component.

Illustrative embodiment 99 is the system of any preceding or subsequent illustrative embodiment, wherein the chute further comprises a two-step feature at the rear side to further direct and reorient each of the plurality of vessels entering the chute from a rear entry point.

Illustrative embodiment 100 is the system of any preceding or subsequent illustrative embodiment, wherein the chute further comprises a substantially vertical section and the diverter is angled away from the two-step feature.

Illustrative embodiment 101 is the system of any preceding or subsequent illustrative embodiment, wherein the chute on the second side of the alignment component is configured to direct each of the plurality of vessels to the rear section of the alignment component.

Illustrative embodiment 102 is the system of any preceding or subsequent illustrative embodiment, wherein a diverter on the second side of the alignment component is substantially diamond-shaped.

Illustrative embodiment 103 is the system of any preceding or subsequent illustrative embodiment, wherein each of the plurality of alignment components further comprises a notch at the bottom of the front edge configured to align the plurality of alignment components within the system.

Illustrative embodiment 104 is an apparatus for guiding an article, comprising: a raised portion in a substantially Y-shape and a first side and a second side, wherein the raised portion provides a contact surface for the article and configured to direct an article from a top of the apparatus to an outlet at the bottom of the apparatus.

Illustrative embodiment 105 is the apparatus of any preceding or subsequent illustrative embodiment, wherein the raised portion ranges from 5 to about 40 cm in depth.

Illustrative embodiment 106 is the apparatus of any preceding or subsequent illustrative embodiment, wherein a distance between the raised portion at the top of the apparatus is larger than as distance between the raised portion at the bottom of the apparatus.

Illustrative embodiment 107 is the apparatus of any preceding or subsequent illustrative embodiment, wherein the distance between the raised portions at the inlet approximates the length of a vessel being delivered by the chute and the distance between the raised portions at the outlet approximates the length of a vessel being delivered by the chute.

Illustrative embodiment 108 is the apparatus of any preceding or subsequent illustrative embodiment, further comprising a diverter configured to direct the article to a front or rear section of each apparatus.

Illustrative embodiment 109 is the apparatus of any preceding or subsequent illustrative embodiment, wherein the first side is configured to direct the article to the front section of the apparatus.

Illustrative embodiment 110 is the apparatus of any preceding or subsequent illustrative embodiment, further comprising a two-step feature at the rear side to further direct and reorient each article entering the apparatus from a rear entry point.

Illustrative embodiment 111 is the apparatus of any preceding or subsequent illustrative embodiment, further comprising a substantially vertical section, wherein the diverter is angled away from the two-step feature.

Illustrative embodiment 112 is the apparatus of any preceding or subsequent illustrative embodiment, wherein the second side is configured to direct each article to the rear section of the apparatus.

Illustrative embodiment 113 is the apparatus of any preceding or subsequent illustrative embodiment, wherein a diverter on the second side is substantially diamond-shaped.

Illustrative embodiment 114 is the apparatus of any preceding or subsequent illustrative embodiment, further comprising a notch at the bottom of the front edge.

Illustrative embodiment 115 is a collection apparatus comprising a substantially rectangular base and walls connected to the base, wherein the base and walls define an interior volume of the apparatus and the walls comprise a front wall, a rear wall, a first side wall, and a second side wall; a top connected to the first side wall and second side wall, wherein the top comprises a first top surface and a second top surface that are substantially perpendicular to the first side wall and second side wall; a first handle connected to the first top surface and second top surface; and a second handle connected to the rear wall of the apparatus.

Illustrative embodiment 116 is the collection apparatus of any preceding or subsequent illustrative embodiment, wherein the first handle is substantially coplanar with the first top surface of the apparatus.

Illustrative embodiment 117 is the collection apparatus of any preceding or subsequent illustrative embodiment, wherein the second handle is substantially perpendicular to the first handle.

Illustrative embodiment 118 is the collection apparatus of any preceding or subsequent illustrative embodiment, wherein the first handle is connected to the second handle.

Illustrative embodiment 119 is the collection apparatus of any preceding or subsequent illustrative embodiment, further comprising a panel that defines an opening.

Illustrative embodiment 120 is the collection apparatus of any preceding or subsequent illustrative embodiment, wherein the apparatus is configured to receive a plurality of implements through the opening.

Illustrative embodiment 121 is the collection apparatus of any preceding or subsequent illustrative embodiment, wherein the implements comprise sample vessels.

Illustrative embodiment 122 is the collection apparatus of any preceding or subsequent illustrative embodiment, wherein the opening is substantially rectangular in shape and the panel is connected to the first top surface to the front wall.

Illustrative embodiment 123 is the collection apparatus of any preceding or subsequent illustrative embodiment, wherein the panel further comprises a lip at the edge of the opening, wherein the lip is configured to mate with a cap.

Illustrative embodiment 124 is the collection apparatus of any preceding or subsequent illustrative embodiment, wherein a size of the opening ranges from 5 to 25 cm in width and 5 to 25 cm in height.

Illustrative embodiment 125 is the collection apparatus of any preceding or subsequent illustrative embodiment, wherein the apparatus comprises an injection moldable polymer.

Illustrative embodiment 126 is a system for supplying a plurality of vessels, comprising: a feeding unit configured to supply a plurality of vessels to at least one exit position, wherein each of the plurality of vessels is configured to hold a sample, and wherein the feeding unit comprises: (i) a feed bin comprising a bottom surface, a substantially open top, a front side, a back side, an A-side, and a B-side, and configured to feed each of the plurality of vessels from an entry position at the top of the feed bin to at least one edge position of the bottom surface wherein the feed; (ii) at least one transporter positioned on at least one of the A-side or the B-side of the feed bin and configured to receive each of the plurality of vessels from the at least one edge position and transport each of the vessels to at least one transfer point.

Illustrative embodiment 127 is the system of any preceding or subsequent illustrative embodiment, wherein the feed bin is substantially trapezoidal in shape.

Illustrative embodiment 128 is the system of any preceding or subsequent illustrative embodiment, further comprising (iii) at least one transfer belt positioned at the exit of the at least one transporter and at or near the top of the feed bin, and configured to receive each of the plurality of vessels from at least one transfer point and individually transfer individual vessels from the at least one transfer point to a bin exit position within the system.

Illustrative embodiment 129 is the system of any preceding or subsequent illustrative embodiment, wherein the plurality of vessels comprise a biological sample tube that is cylindrical in shape and comprises a cap.

Illustrative embodiment 130 is the system of any preceding or subsequent illustrative embodiment, wherein each of the plurality of vessels ranges from 75 to about 125 mm in length and about 8 to about 16 mm in diameter.

Illustrative embodiment 131 is the system of any preceding or subsequent illustrative embodiment, wherein the at least one transfer belt comprises a rubberized material.

Illustrative embodiment 132 is the system of any preceding or subsequent illustrative embodiment, wherein the rubberized material comprises a plurality of raised elements configured to assist in the transfer of vessels.

Illustrative embodiment 133 is the system of any preceding or subsequent illustrative embodiment, wherein an operating path of the at least one transfer belt is substantially perpendicular to a direction of advancement of the at least one transporter.

Illustrative embodiment 134 is the system of any preceding or subsequent illustrative embodiment, wherein the feed bin is a trapezoidal shape wherein an area of the bottom surface is smaller than an area of the top of the feed bin.

Illustrative embodiment 135 is the system of any preceding or subsequent illustrative embodiment, wherein the feed bin further comprises an interior slope at the convergence of the A-side and B-side with the bottom surface of the feed bin, wherein the interior slope is configured to direct each of the vessels toward the transporter.

Illustrative embodiment 136 is the system of any preceding or subsequent illustrative embodiment, wherein the bottom surface of the feed bin comprises a wedge configured to direct the plurality of vessels to an edge of the bottom surface of the feed bin and onto the at least one transporter.

Illustrative embodiment 137 is the system of any preceding or subsequent illustrative embodiment, wherein the wedge is located near the center of the bottom surface of the feed bin and is configured to direct the plurality of vessels to both the A-side and B-side of the feed bin.

Illustrative embodiment 138 is the system of any preceding or subsequent illustrative embodiment, wherein a distribution of the plurality of vessels is substantially balanced, such that the feed bin directs approximately one-half of the plurality of vessels to the A-side of the feed bin and approximately one-half of the plurality of vessels to the B-side of the feed bin.

Illustrative embodiment 139 is the system of any preceding or subsequent illustrative embodiment, wherein the feed bin further comprises a front side and a rear side, wherein the feed bin is configured to receive the plurality of vessels for feeding at either the front side or the rear side.

Illustrative embodiment 140 is the system of any preceding or subsequent illustrative embodiment, wherein the feed bin further comprises at least one angled corner element positioned at a convergence of the A-side, B-side, a front side, and a back side of the feed bin, and the angled corner has a slope of at least 45 degrees relative to one of the A-side, B-side, front side, or back side.

Illustrative embodiment 141 is the system of any preceding or subsequent illustrative embodiment, wherein the at least one transporter comprises a series of steps configured to individually transfer each of the plurality of vessels from one step to the next step in the series.

Illustrative embodiment 142 is the system of any preceding or subsequent illustrative embodiment, wherein each step comprises a ledge and riser, wherein each riser is configured to: (i) lift each of the plurality of vessels from the bottom surface of the feed bin to an elevation stage adjacent to the ledge of the next step of the at least one transporter; (ii) transfer each vessel to that ledge, and (iii) return back to the bottom surface of the feed bin; and wherein a height of the elevation stage is greater than a height of the ledge of the next step the series.

Illustrative embodiment 143 is the system of any preceding or subsequent illustrative embodiment, wherein a depth of the ledges of the steps are configured to decrease through the transporter, with the ledge of a lower step being deeper than the ledge of an upper step.

Illustrative embodiment 144 is the system of any preceding or subsequent illustrative embodiment, wherein the steps are configured to align each of the plurality of vessels in a single file arrangement at the at least one transfer point.

Illustrative embodiment 145 is the system of any preceding or subsequent illustrative embodiment, wherein each ledge and each riser are each configured to hold more than one vessel in a horizontal and longitudinally tandem fashion parallel to the A-side and B-side of the feed bin.

Illustrative embodiment 146 is the system of any preceding or subsequent illustrative embodiment, wherein the ledge and the riser of each step are configured to bevel away from the feed bin toward the back of the transporter.

Illustrative embodiment 147 is the system of any preceding or subsequent illustrative embodiment, wherein an angle of the bevel is 5 to 15 degrees.

Illustrative embodiment 148 is the system of any preceding or subsequent illustrative embodiment, wherein each ledge and each riser further comprise a wavy surface configured to align each of the plurality of vessels in a substantially horizontal orientation with a longitudinal axis along the ledge or riser.

Illustrative embodiment 149 is the system of any preceding or subsequent illustrative embodiment, wherein the surface of the ledge and riser comprises a plastic material.

Illustrative embodiment 150 is the system of any preceding or subsequent illustrative embodiment, wherein the wavy surface is configured to return each of the plurality of vessels not oriented in a substantially horizontal orientation back into the feeding bin.

Illustrative embodiment 151 is the system of any preceding or subsequent illustrative embodiment, wherein the series of steps are configured to operate together as a unit, rising and lowering at the same time.

Illustrative embodiment 152 is the system of any preceding or subsequent illustrative embodiment, wherein a final step and exit of the at least one transporter is substantially aligned with the at least one transfer belt.

Illustrative embodiment 153 is the system of any preceding or subsequent illustrative embodiment, further comprising a cover panel configured to provide access to the feed bin.

Illustrative embodiment 154 is the system of any preceding or subsequent illustrative embodiment, further comprising an inspection table adjacent to the feed bin, wherein the inspection table is configured to control at least in part tubes that enter and exit the feed bin.

Illustrative embodiment 155 is the system of any preceding or subsequent illustrative embodiment, wherein the inspection table is configured to permit removal of each vessel not meeting system requirements.

Illustrative embodiment 156 is the system of any preceding or subsequent illustrative embodiment, wherein the plurality of vessels comprise a random orientation upon entry into the feed bin.

Illustrative embodiment 157 is the system of any preceding or subsequent illustrative embodiment, comprising two transporters and two transfer belts, wherein one transporter and transfer belt pair are associated with the A-side of the feed bin and the other transporter and transfer belt pair are associated with the B-side of the feed bin.

Illustrative embodiment 158 is the system of any preceding or subsequent illustrative embodiment, wherein each the plurality of vessels includes more than one identifying parameter and wherein the system is configured to feed the plurality of vessels in a random nature and balance a loading of a subsequent system being supplied.

Illustrative embodiment 159 is the system of any preceding or subsequent illustrative embodiment, wherein the system can supply up to 16,000 vessels per hour.

Illustrative embodiment 160 is a method for supplying a plurality of vessels, comprising: providing a plurality of vessels and transferring the plurality of vessels to a feeding unit.

Illustrative embodiment 161 is the method of any preceding or subsequent illustrative embodiment, wherein the feeding unit configured to: supply a plurality of vessels to at least one exit position, wherein each of the plurality of vessels is configured to hold a sample, and wherein the feeding unit comprises: (i) a feed bin, the feed bin being substantially trapezoidal in shape and comprising a bottom surface, a substantially open top, a front, a back, an A-side and a B-side, and configured to feed each of the plurality of vessels from an entry position at the top of the feed bin to at least one edge position of the bottom surface wherein the feed.

Illustrative embodiment 162 is the method of any preceding or subsequent illustrative embodiment, wherein the feed unit further comprises (ii) at least one transporter positioned on at least one of the A-side or the B-side of the feed bin and configured to receive each of the plurality of vessels from the at least one edge position and transport each of the vessels to the at least one transfer point.

Illustrative embodiment 163 is the method of any preceding or subsequent illustrative embodiment, wherein the feed unit further comprises (iii) at least one transfer belt positioned at the exit of the at least one transporter and at or near the top of the feed bin, and configured to receive each of the plurality of vessels from at least one transfer point and individually transfer individual vessels from the at least one transfer point to a bin exit position within the unit.

Illustrative embodiment 164 is the system of any preceding or subsequent illustrative embodiment, further comprising transferring the vessel via the at least one transfer belt to a downstream process or unit.

Illustrative embodiment 165 is a system for supplying a plurality of vessels, comprising: a feeding unit configured to supply a plurality of vessels to at least one exit position, wherein each of the plurality of vessels is configured to hold a sample, and wherein the feeding unit comprises: (i) a feed bin, the feed bin being substantially trapezoidal in shape and comprising a bottom surface, a substantially open top, a front side, a back side, an A-side, and a B-side, and configured to feed each of the plurality of vessels from an entry position at the top of the feed bin to at least one edge position of the bottom surface wherein the feed; (ii) at least one transporter positioned on at least one of the A-side or the B-side of the feed bin and configured to receive each of the plurality of vessels from the at least one edge position and transport each of the vessels to at least one transfer point; and (iii) at least one transfer belt positioned at the exit of the at least one transporter and at or near the top of the feed bin, and configured to receive each of the plurality of vessels from at least one transfer point and individually transfer individual vessels from the at least one transfer point to a bin exit position within the system.

Illustrative embodiment 166 is a method for supplying a plurality of vessels, comprising: providing a plurality of vessels; transferring the plurality of vessels to a feeding unit, the feeding unit configured to: supply a plurality of vessels to at least one exit position, wherein each of the plurality of vessels is configured to hold a sample, and wherein the feeding unit comprises: (i) a feed bin, the feed bin being substantially trapezoidal in shape and comprising a bottom surface, a substantially open top, a front, a back, an A-side and a B-side, and configured to feed each of the plurality of vessels from an entry position at the top of the feed bin to at least one edge position of the bottom surface wherein the feed; (ii) at least one transporter positioned on at least one of the A-side or the B-side of the feed bin and configured to receive each of the plurality of vessels from the at least one edge position and transport each of the vessels to the at least one transfer point; and (iii) at least one transfer belt positioned at the exit of the at least one transporter and at or near the top of the feed bin, and configured to receive each of the plurality of vessels from at least one transfer point and individually transfer individual vessels from the at least one transfer point to a bin exit position within the unit; and transferring the vessel via the at least one transfer belt to a downstream process or unit.

That which is claimed:

1. A system for sorting a plurality of vessels, comprising:
    (a) a sorting unit to sort the plurality of vessels, wherein each of the plurality of vessels is configured to hold a sample and comprises an identification region providing information related to a sorting group into which the sample is to be sorted, and wherein the sorting unit comprises:
    (i) a first transfer belt that individually transports each of the plurality of vessels from an entry position to a second position within the sorting unit;
    (ii) a scanning unit positioned adjacent to the second position, wherein the scanning unit comprises a reader that reads the identification region and stores the information related to the sorting group;
    (iii) an end component that receives each of the plurality of vessels from the first transfer belt and positions each of the plurality of vessels at the second position for reading by the scanning unit;
    (iv) a nesting belt that receives and individually positions each of the plurality of scanned vessels for transport to a collection point, wherein the nesting belt advances in timed intervals and comprises a plurality of stages and wherein the position of each of the plurality of scanned vessels on the nesting belt is stored by the system; and
    (v) a manipulator that individually transfers each of the plurality of scanned vessels from the scanning unit to the nesting belt; and
    (b) a runner positioned at an exit position of the sorting unit, wherein the runner transfers each of the plurality of vessels from the nesting belt to the collection point, wherein the system detects a status of the runner and stops or slows, and resumes the nesting belt accordingly.

2. The system of claim 1, wherein each of the plurality of vessels is a biological sample tube that is cylindrical in shape.

3. The system of claim 1, wherein the scanning unit rotates each of the plurality of vessels about a longitudinal axis to position the identification region for scanning by the reader.

4. The system of claim 1, wherein the sorting group is assigned based on a bar code provided on each of the plurality of vessels.

5. The system of claim 4, wherein the sorting group and the position of each of the plurality of vessels on the nesting belt are relayed to the runner.

6. The system of claim 1, wherein each of the plurality of stages comprises a nest having a slot configured to accommodate a single vessel.

7. The system of claim 6, wherein the slot is configured to hold a single vessel of the plurality of scanned vessels such that a longitudinal axis of the single vessel is substantially horizontal and aligned with an operating path of the nesting belt.

8. The system of claim 6, wherein at least one stage of the plurality of stages of the nesting belt aligns with an operating path of the runner and wherein the timed intervals of the nesting belt advancement allow the runner to remove each of the plurality of vessels from the slot prior to advancement of the nesting belt to the next stage.

9. The system of claim 1, wherein the runner comprises a pair of grippers for the individual transfer of each of the plurality of scanned vessels from the nesting belt to the runner.

10. The system of claim 9, further comprising a plurality of gripper pairs, wherein the plurality of gripper pairs operate independently to individually engage each of the plurality of scanned vessels.

11. The system of claim 1, comprising a plurality of designated collection points, wherein each collection point comprises a collection container, and wherein the sorting group is assigned to one or more collection containers.

12. The system of claim 11, wherein the runner delivers each of the plurality of vessels to the assigned collection container and individually disengages the each of the plurality of vessels when the runner is aligned with the assigned collection container as determined by the sorting group.

13. The system of claim 1, comprising:
    at least two nesting belts comprising a first nesting belt and a second nesting belt, wherein the first and second nesting belts are positioned adjacent to one another and each nesting belt advances independently of the other nesting belt, wherein each nesting belt comprises at least two active stages and each stage comprises a nest having two or more slots, each slot configured to accommodate a single vessel; and
    at least two runners comprising a first runner and a second runner, wherein the first runner physically manipulates each of the plurality of scanned vessels and transfers each of the plurality of vessels from a first active stage, the second runner to physically manipulates each of the plurality of the scanned vessels and transfers each of the plurality of vessels from a second active stage, wherein the first active stage of the nesting belts to aligns with an operating path of the first runner such that the operating path of the first runner is substantially perpendicular to the first active stage and the second active stage of the nesting belts to aligns with an operating path of the second runner where the operating path of the second runner is substantially perpendicular to the second active stage and wherein each of the nesting belts to advances at timed intervals that provide for the runners to remove each of the plurality of positioned vessels from the slots of the nest prior to advancement of the nesting belts to a next stage position, wherein the system relays the sorting group for each of the plurality of vessels and the position of each of the plurality of vessels on each nesting belt to the runners, the runners deliver each of the plurality of vessels from the slots on the nests to the collection containers, each container having an assigned sorting group, and the runners to disengage with each of the plurality of vessels when the runners are aligned with the assigned collection container.

14. The system of claim 1, further comprising a feeding system that supplies a plurality of vessels to the entry position of the sorting unit, wherein the feeding system comprises a feed bin, a transporter, and a second transfer belt.

15. The system of claim 14, wherein a timing gap between a speed of the first and second transfer belts is substantially the same as the time for reading the identification region of each of the vessels.

16. The system of claim 14, wherein the system is configured to seeks a condition state of the first transfer belt to determine an operating state of the second transfer belt.

17. A method for sorting a plurality of vessels, comprising:
providing a plurality of vessels, each of the plurality of vessels configured to hold a sample, wherein each of the plurality of vessels comprises an identification region for providing information related to a sorting group of the sample;
transferring the plurality of vessels to a sorting unit to sort the plurality of vessels, wherein the sorting unit comprises:
(i) a first transfer belt to individually transport each of the plurality of vessels from an entry position to a second position within the sorting unit;
(ii) a scanning unit comprising a reader to read the identification region on each of the plurality of vessels and store the information as each of the plurality of vessels is sorted by the sorting unit;
(iii) an end component that receives each of the vessels from the first transfer belt and positions each of the plurality of vessels at the second position for reading by the scanning unit;
(iv) a nesting belt to position each of the plurality of scanned vessels for transport to a collection point, wherein the nesting belt advances in timed intervals and comprises a plurality of stages; and
(v) a manipulator that individually transfers each of the plurality of scanned vessels from the scanning unit to the nesting belt;
reading the identification region of each of the plurality of vessels;
determining the sorting group for each of the plurality of vessels;
storing the information related to each of the plurality of vessels;
detecting a status of a runner and stopping or slowing, and resuming the nesting belt accordingly;
transferring each of the plurality of vessels to the runner, wherein the runner is positioned at an exit position of the sorting unit; and
transferring each of the plurality of vessels via the runner to the collection point determined by the sorting group information.

18. The method of claim 17, further comprising:
assigning the sorting group to each of the plurality of vessels based on the information in the identification region of each of the plurality of vessels; and
relaying the sorting group and the position of each of the plurality of vessels on the nesting belt to the runner.

19. The method of claim 17, further comprising:
feeding each of the plurality of vessels to the sorting unit; and
wherein the runner traverses the sorting unit and disengages each of the plurality of vessels at the collection point assigned according to the sorting group.

20. A computer program product comprising:
a processing device; and
a non-transitory computer-readable medium communicatively coupled to the processing device, wherein the processing device is configured to perform operations comprising:
providing a plurality of vessels, each of the plurality of vessels configured to hold a sample, wherein each of the plurality of vessels comprises an identification region for providing information related to a sorting group of the sample;
transferring each of the plurality of vessels to a sorting unit to sort the plurality of vessels, wherein the sorting unit comprises:
(i) a first transfer belt to individually transport each of the plurality of vessels from an entry position to a second position within the sorting unit;
(ii) a scanning unit comprising a reader that reads the identification region on each of the plurality of vessels and stores the information as each of the plurality of vessels is sorted by the sorting unit;
(iii) an end component that receives each of the plurality of vessels from the first transfer belt and positions each of the plurality of vessels at the second position for reading by the scanning unit;
(iv) a nesting belt that advances in timed intervals and positions each of the plurality of scanned vessels for transport to a collection point; and
(v) a manipulator that individually transfers each of the plurality of scanned vessels from the scanning unit to the nesting belt;
reading the identification region of each of the plurality of vessels;
determining the sorting group for each of the plurality of vessels;
storing the information related to each of the plurality of vessels;
detecting a status of a runner and stopping or slowing, and resuming the nesting belt accordingly;
transferring each of the plurality of vessels to the runner, wherein the runner transfers each of the plurality of vessels to the collection point; and
transferring each of the plurality of vessels via the runner to a collection container determined by the sorting group information.

* * * * *